(12) United States Patent
Yoshida et al.

(10) Patent No.: US 7,924,311 B2
(45) Date of Patent: Apr. 12, 2011

(54) CAMERA TERMINAL AND MONITORING SYSTEM

(75) Inventors: Atsushi Yoshida, Osaka (JP); Katsuji Aoki, Nara (JP); Shoichi Araki, Osaka (JP)

(73) Assignee: Panasonic Corporation, Osaka (JP)

( * ) Notice: Subject to any disclaimer, the term of this patent is extended or adjusted under 35 U.S.C. 154(b) by 1305 days.

(21) Appl. No.: 10/585,989

(22) PCT Filed: Dec. 5, 2005

(86) PCT No.: PCT/JP2005/022272
§ 371 (c)(1),
(2), (4) Date: Jul. 13, 2006

(87) PCT Pub. No.: WO2006/067947
PCT Pub. Date: Jun. 29, 2006

(65) Prior Publication Data
US 2008/0225121 A1 Sep. 18, 2008

(30) Foreign Application Priority Data

Dec. 21, 2004 (JP) ................................ 2004-369716
Aug. 1, 2005 (JP) ................................ 2005-222359

(51) Int. Cl.
*H04N 7/18* (2006.01)
(52) U.S. Cl. ........ 348/159; 348/143; 348/144; 348/145; 348/146; 348/150
(58) Field of Classification Search ........... 348/143–159
See application file for complete search history.

(56) References Cited

U.S. PATENT DOCUMENTS 6,359,647 B1 * 3/2002 Sengupta et al. ............. 348/154
(Continued)

FOREIGN PATENT DOCUMENTS

JP 7-303207 11/1995
(Continued)

OTHER PUBLICATIONS

Roger Y. Tsai, "A Versatile Camera Calibration Technique for High-Accuracy 3D Machine Vision Metrology Using Off-the-Shelf TV Cameras and Lenses", IEEE Journal of Robotics and Automation, vol. RA-3, No. 4, pp. 323-344, Aug. 1987.

*Primary Examiner* — Marsha D Banks Harold
*Assistant Examiner* — Chikaodili E Anyikire
(74) *Attorney, Agent, or Firm* — Wenderoth, Lind & Ponack, L.L.P.

(57) ABSTRACT

A camera terminal where tables where camera operations are described are not required, and that continues thoroughly imaging a monitoring subject region as a complete system even when a portion of cameras shuts down due to a failure is provided.
The present invention is a camera terminal 110A in a monitoring system for imaging a monitoring subject region by cooperatively operating multiple camera terminals, and is equipped with a camera 101A having a function to change an imaging region, a communicator 103A to transmit/receive information for identifying the imaging region to/from other camera terminals, and an adjustment unit 102 to determine a monitoring responsible region for its own camera terminal so as to is make proximate the monitoring responsible region for its own camera terminal to a monitoring responsible region for the other camera terminal or a boundary of the monitoring subject region without leaving any space, and for adjusting the imaging region for the camera 101A to image the entire monitoring responsible region.

12 Claims, 38 Drawing Sheets

U.S. PATENT DOCUMENTS

| | | | |
|---|---|---|---|
| 6,690,374 B2 * | 2/2004 | Park et al. | 345/427 |
| 2005/0078184 A1 | 4/2005 | Sakai et al. | |

FOREIGN PATENT DOCUMENTS

| | | |
|---|---|---|
| JP | 9-179984 | 7/1997 |
| JP | 9-263012 | 10/1997 |
| JP | 3043925 | 5/2000 |
| JP | 2001-94975 | 4/2001 |
| JP | 3180730 | 6/2001 |
| JP | 2002-57929 | 2/2002 |
| JP | 2003-23553 | 1/2003 |
| JP | 2004-72628 | 3/2004 |
| JP | 2005-117542 | 4/2005 |

* cited by examiner

Imaging subject

FIG. 9
(a)
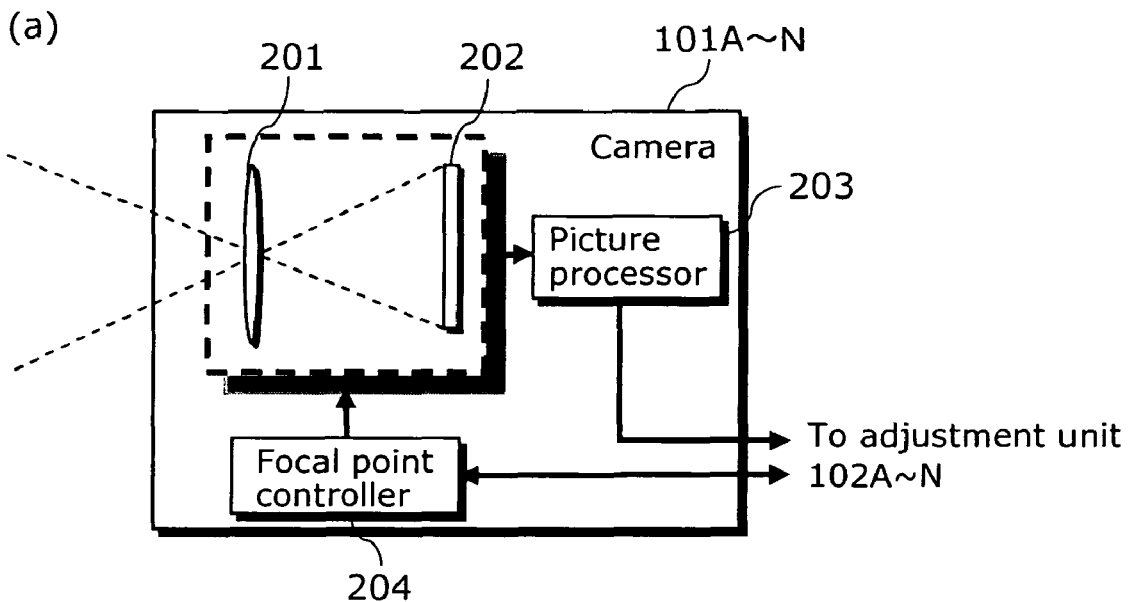
(b)
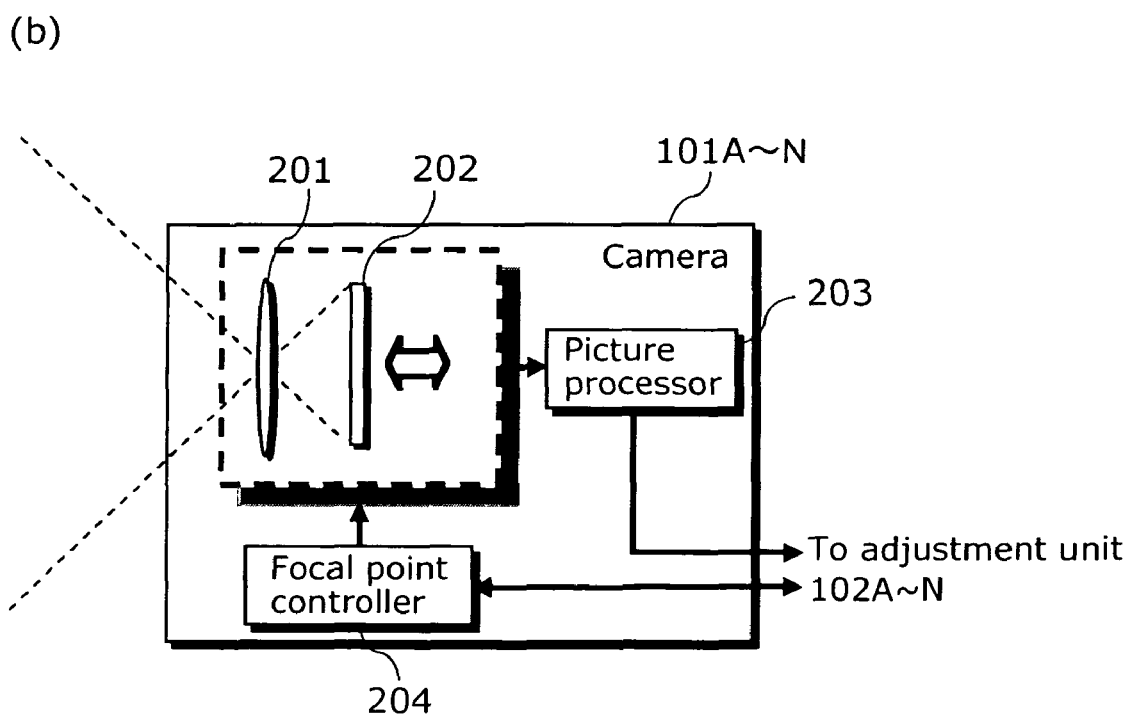

FIG. 12
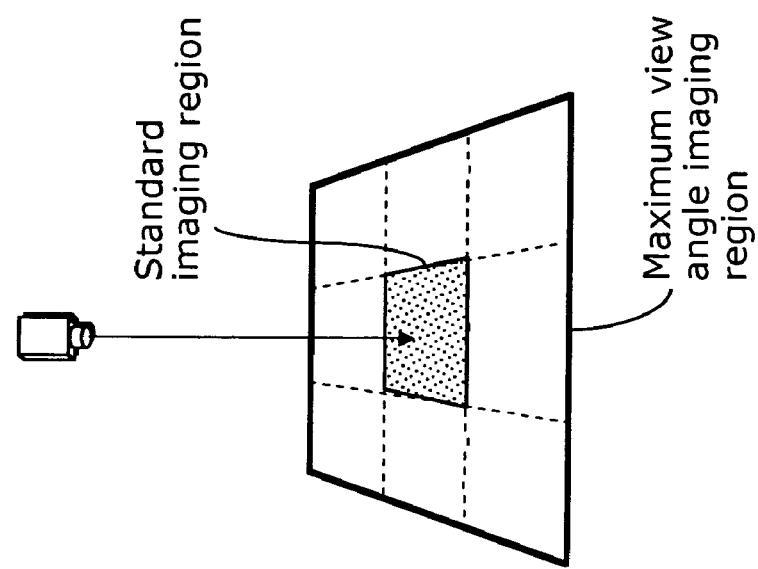
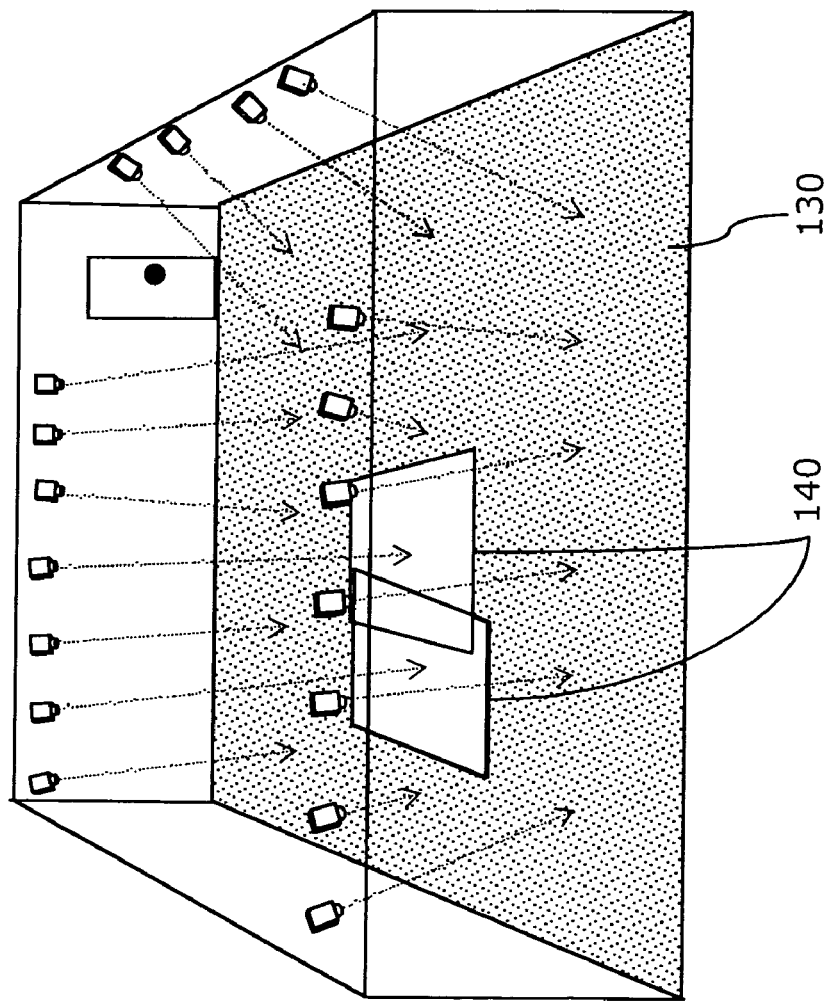

FIG. 18
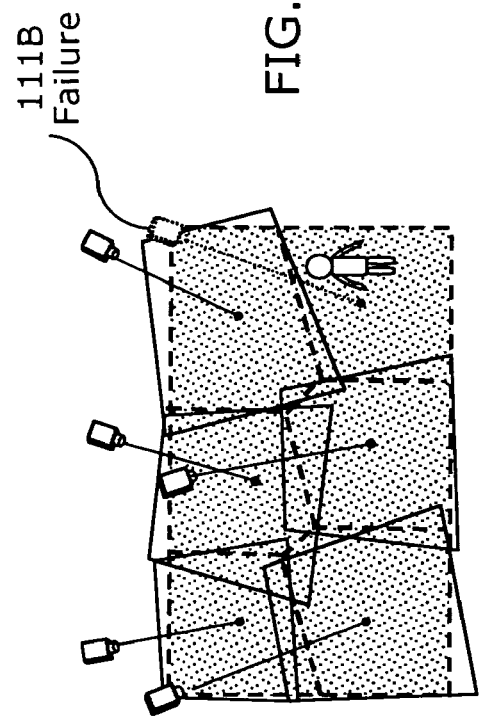
(a)
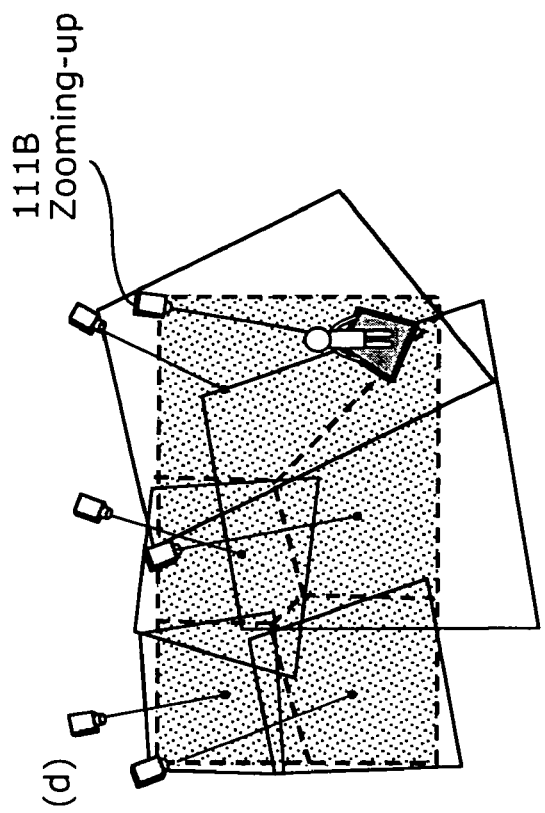
(b)
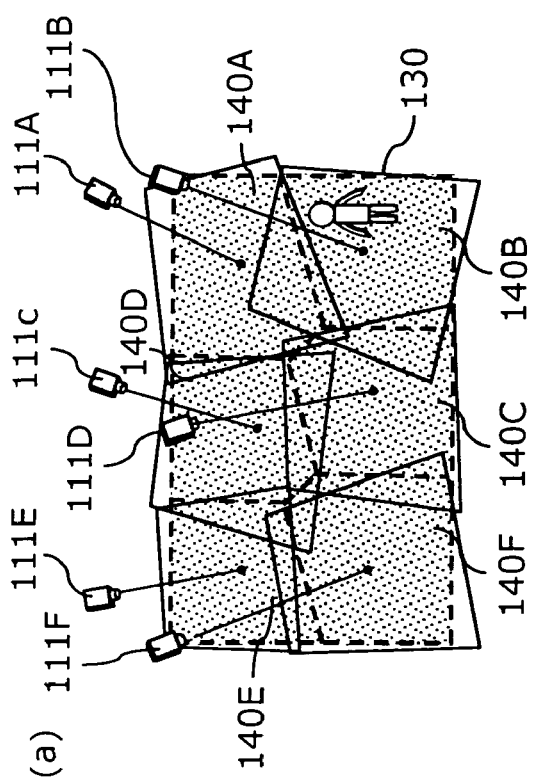
(c)
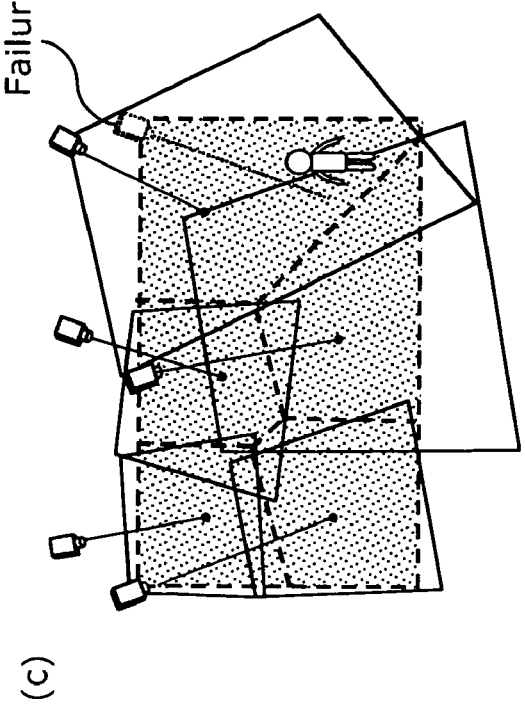
(d)

FIG. 28
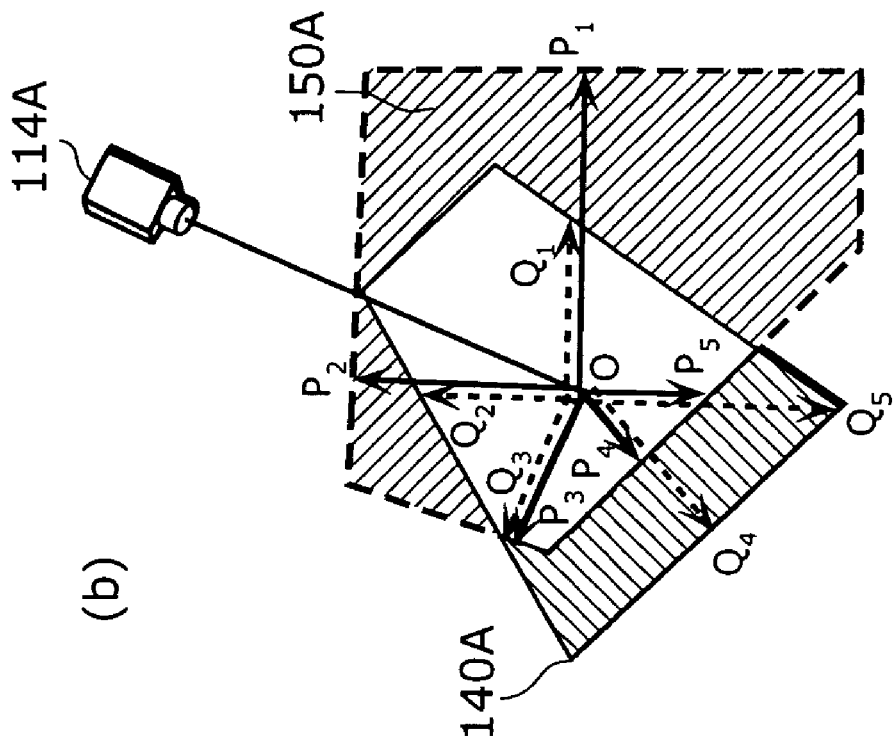
(b)
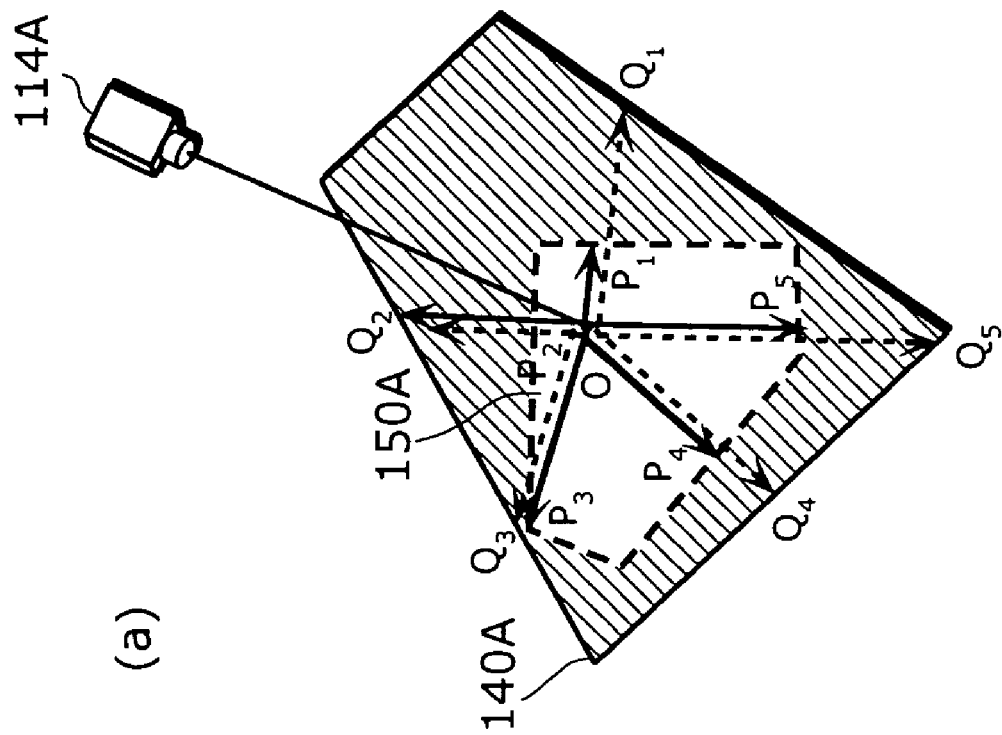
(a)

To communicator 1031

CAMERA TERMINAL AND MONITORING SYSTEM

TECHNICAL FIELD

The present invention relates to a monitoring system for imaging a monitoring subject region by multiple cameras and camera terminals composing the monitoring system, and particularly relates to a monitoring system for thoroughly imaging an entire monitoring subject region.

BACKGROUND ART

In recent years, a monitoring system using multiple cameras mainly used for monitoring use has been actively researched and developed. Monitoring with multiple cameras requires fulfilling a first requirement to maintain a state where regions which become blind spots are reduced relative to an entire subject region to be monitored (a monitoring subject region), and further a second requirement to acquire detailed imaging information concerning objects within the subject monitoring region.

In a conventional device using multiple cameras, automatic adjustment of a position of an imaging region and an imaging range for each camera fulfills the two requirements. Typical conventional devices using multiple cameras are described in Patent Reference 1 and Patent Reference 2.

First, the conventional device described in Patent Reference 1 is explained. FIG. 1 shows a device described in Patent Reference 1, that automatically adjusts the camera imaging region.

In FIG. 1, in a camera detection device 9010, a camera 9011 and a reflecting mirror 9012 image a detection subject throughout a broad imaging region; a mobile object extractor 9013 extracts the detection subject from the imaged picture; and a position information extractor 9014 extracts position information of the detection subject, so the camera detection device 9010 acquires the position information of the detection subject throughout the broad detection region. In a camera determination device 9020, a camera controller 9022 controls the traverse angle, the depression angle and the zoom ratio of the camera 9021 based on the position information of the detection subject, and the camera determination device 9020 acquires detailed information of the detection subject in order to image an enlarged image of the detected subject.

FIG. 2 shows detection regions for the camera detection device 9010 and the camera determination device 9020. In FIG. 2, black circles indicate the installation position of the camera detection device 9010, respectively, wherein the camera detection device 9010 is a secured camera. Circles or hexagons indicate respective imaging regions for the camera detection device 9010. As shown in FIG. 2, artificially installing each camera detection device 9010 with regularity enables detection on a steady basis without any blind spot within the detection subject regions comprising the subject monitoring regions.

Next, a conventional device described in Patent Reference 2 is explained. FIG. 3 shows a device that automatically adjusts the camera imaging regions, as described in Patent Reference 2.

In FIG. 3, a moving object detection camera 9211 for imaging an object throughout a broad imaging region changes its own imaging region by a posture control unit 9212, and a monitoring camera 9221 for imaging an enlarged picture of the object changes its own imaging region by a posture control unit 9222. In an image processor 9240, the imaging region for each camera is determined from the position of the detection subject extracted from the picture imaged by the moving object detection camera 9211 and the imaging region for each camera based upon information pre-stored in a camera angle of memory view unit 9231 and a camera angle of memory view unit 9232.

The imaging region determination method of each camera, for use with such conventional device, is described hereafter. FIG. 4, FIG. 5 and FIG. 6 are diagrams explaining the imaging region determination method of each camera, and respectively show pictures divided into several block pictures, imaged by the moving object detection camera 9211. First, the imaging region of the moving object detection camera 9211 is determined as follows: when a detection subject exists in the shaded blocks in FIG. 4, the postures of the moving object detection cameras 9211 are changed to the directions indicated by the arrows marked in the blocks of FIG. 5 corresponding to the block positions shown in FIG. 4, and the imaging regions for the cameras are changed, respectively. The imaging region for the moving object detection camera 9211 corresponding to each block position is individually specified, and the information is pre-set in the camera angle of memory view unit 9231. Next, the imaging regions for the monitoring cameras 9221 are determined as follows: when a detection subject exists in the block positions shown in FIG. 6, the postures of the monitoring cameras 9221 are changed to imaging regions indicated by a broken line, and the imaging regions for the cameras are changed. The imaging region for the monitoring camera 9221 corresponding to each block position is manually specified, and the information is pre-set in the camera angle of memory view unit 9232.

Characteristics of conventional devices using multiple cameras are summarized hereafter.

First, the camera detection device 9010 in the conventional device shown in Patent Reference 1 and the moving object detection camera 9211 in the conventional device shown in Patent Reference 2 play a role in detecting a detection subject within a broad range region, and the camera determination device 9020 in the conventional device shown in Patent Reference 1 and the monitoring camera 9221 in the conventional device shown in Patent Reference 2 respectively play a role in acquiring detailed information of the detection subject, such as an enlarged picture of the detected subject. As described, in the prior art, the role is specified for each camera, and a camera playing one role fulfills the first requirement, and another camera playing the other role fulfills the second requirement (characteristic 1 of the prior art).

In addition, in the conventional device shown in Patent Reference 2, for example, as the imaging region for the moving object detection camera 9211 is changed to the detection region moved to the upper left direction shown in the upper left block in FIG. 5 corresponding to the state change where the monitoring subject is on the upper left block in FIG. 4, the imaging region for each camera is determined and adjusted based on the information in a table format that defines camera behavior corresponding to a pre-assumed and manually prepared state. (characteristic 2 of the prior art).

In addition, the conventional device shown in Patent Reference 1, as shown in FIG. 2, manually installs fixed cameras at regular positions, fulfills the first requirement (characteristic 3 of the prior art).

Patent Reference 1: Japanese Laid-Open Patent Application No. 3043925 (FIG. 1 and FIG. 6)

Patent Reference 2: Japanese Laid-Open Patent Application No. 3180730 (FIG. 1 and FIG. 7 to FIG. 9)

DISCLOSURE OF INVENTION

Problem that Invention is to Solve

However, as with a conventional device, when preparation of tables where camera behavior corresponding to pre-assumed situations defined point by point results in adjusting the imaging region for each camera (characteristic 2 of the prior art), it is necessary to prepare tables where the camera behavior corresponding to all pre-assumed situations is described. In addition, the definition details depend upon the position and size of a detection subject region, assumed situation changes, and an installation position of each camera and the number of cameras. Each time these are changed, it is necessary to revise the table details. The greater the number cameras, the more complicated the task, and the cost and burden associated with the task becomes enormous. In a monitoring system using cameras installed in a building, it is common to use over 10 cameras.

In addition, in the conventional device, the manual pre-installation of fixed cameras at orderly positions fulfills the first requirement (characteristic 3 of the prior art). However, even if one camera fails, the first requirement is no longer fulfilled. As shown in FIG. 7, increasing the number of camera detection devices 9010 enables covering the detection subject regions without blind spots, even if one has failed. However, this is inefficient. In FIG. 7, the black circles indicate the installation positions of the camera detection devices 9010.

The objective of the present invention is to resolve the conventional problems, and to provide monitoring cameras and a monitoring system where it is unnecessary to describe camera behavior corresponding to any manually pre-assumed situations, and, even if some of the cameras shut down because of a failure or a maintenance inspection, the entire system will continue imaging a monitoring subject region.

Means to Solve the Problems

In order to accomplish the objective, the camera terminal according to the present invention is a camera terminal in a monitoring system for imaging a monitoring subject region by operating, in coordination with one another, multiple camera terminals. The camera terminal includes: a camera having a function to change an imaging region; a communication unit which transmits and receives information identifying the imaging region to and from other camera terminals; and an adjusting unit which, where each camera terminal has a monitoring responsible region which is an imaging region to be monitored, and based on the information received by the communication unit from another camera terminal, determines the monitoring responsible region to which the camera terminal belongs so that the monitoring responsible region to which the camera terminal belongs adjoins, without a gap, the monitoring responsible region of the another camera terminal or a boundary of the monitoring subject region, as well as to adjust the imaging region of the camera so that an entire monitoring responsible region is imaged, and in which adjusting unit determines a region surrounding a first reference point as the monitoring responsible region, according to i) at least one perpendicular bisector of a line of segment connecting the first reference point provided within the imaging region to which the camera terminal belongs and a second reference point provided within an imaging region of another camera terminal adjoining to the imaging region to which the camera terminal belongs or ii) the perpendicular bisector and a boundary of the monitoring subject region.

According to this design, since the multiple camera terminals autonomously and cooperatively operate while communicating with the other camera terminals and cover each monitoring responsible region, the entire monitoring subject region is thoroughly and simultaneously imaged. Even if a portion of the camera terminals fail and cannot image its monitoring responsible region, each camera terminal determines the monitoring responsible region by communicating with the other camera terminals, and adjusts the position and range of the imaging region to cover the monitoring responsible region, enabling the monitoring subject region may be thoroughly imaged only by the other imaging available camera terminals.

In addition, each monitoring responsible region is a region surrounded by the perpendicular bisector of a line of segment connecting the reference points within the adjacent imaging regions, so the size of each monitoring responsible region may be easily equalized and well-balanced imaging becomes possible from the viewpoint of resolution. Furthermore, the first reference point is preferably the coordinates on the monitoring subject region displayed in the center of the imaging plane of a camera belonging to its own camera terminal or the center coordinates of the imaging region.

In addition, the camera may additionally has a function to change a position of the imaging region, wherein the adjusting unit further has a monitoring responsible region comparison-evaluator to determine a position of the imaging region for adjusting the monitoring responsible region to which the camera terminal belongs closer to the size of a monitoring responsible region adjacent to said monitoring responsible region by comparing and evaluating the monitoring responsible region to which the camera terminal belongs and the monitoring responsible region adjacent to the monitoring responsible region; and the camera controller controls the camera in order to approximate to the position of the imaging region determined by the monitoring responsible region comparison-evaluator. Here, it is preferable that the monitoring responsible region comparison-evaluator determines the position of said imaging region by moving the first reference point so as to equalize the distance from the first reference point to each boundary of the monitoring responsible region This design realizes a monitoring system where the size of each monitoring responsible region is equalized and the size and minuteness of a picture imaged at each imaging region become roughly equal. At the same time, the entire monitoring subject region is thoroughly imaged and abnormal situations may be easily discovered.

In addition, the camera may further have a function to control a direction of line of sight, and the adjusting unit may further have an adjustment unit for direction of line of sight for adjusting the direction of line of sight of the camera for adjusting the configuration of the imaging region closer to the configuration of the monitoring responsible region. At this time, for example, in an evaluation function to evaluate a difference between the configurations of the imaging region and the monitoring responsible region, it is preferable that the adjustment unit for direction of line of sight determines the direction of line of sight of said camera in order to approximate an evaluated value by the evaluation function to a target value when the evaluated value at the time of coincidence of the configurations of the imaging region with the monitoring responsible region is a target value. Specifically, when a point where the line of sight by the camera intersects at the monitoring responsible region is a reference point, it is preferable that the evaluation function is a function to indicate dispersion of a ratio of the distance from the reference point to the boundary of the monitoring responsible region to the distance from the reference point to the boundary of the imaging region, and that the target value is zero This design respectively adjusts the configuration of the imaging region closer to the configuration of the monitoring responsible regions, so unnecessarily overlapping regions of each imaging region may be eliminated, and the monitoring subject region may be thoroughly imaged by the multiple camera terminals without resolution deterioration.

Furthermore, the present invention may be realized not only as a camera terminal but also as a monitoring system composed of the camera terminal, as a monitoring method using multiple camera terminals, and as a program incorporated with the camera terminals. In addition, the construction may be not only a decentralized control system provided with an adjusting unit at each camera terminal but also a centralized control type to be controlled by a common adjusting unit connected via a communication network. Needless to say, a program according to the present invention may be distributed via a recording medium such as a CD-ROM, or a transmission medium such as Internet.

Effects of the Invention

With the autonomous and cooperative type monitoring system relating to the present invention, when camera terminals the number of which is sufficient to image the entire monitoring subject region are installed at the directions enabling imaging the entire monitoring subject region, determination of each monitoring responsible region according to the positional relationship of mutual imaging regions, and in addition, the adjustment of focal length to image its own monitoring responsible region result in the automatic determination of the position of imaging region and the imaging range of each camera terminal without having blind spots within the monitoring subject region.

Because of this design, it is unnecessary to prepare tables where operations of each camera for all pre-assumed situations according to the conditions such as an installation position and an installation direction of the camera, or surrounding environments, and, even when an imaging region for a predetermined camera terminal is deleted due to a failure or a maintenance inspection, or when the position of the imaging region is changed due to the operation such as pan tilt, the change of the position of the imaging region and the imaging range in cooperation with the other camera terminals results in the maintenance of monitoring the entire monitoring subject region.

Therefore, the present invention assures imaging an entire monitoring subject region on a steady basis, and the practical value is high especially as a monitoring system for suspicious individuals at schools or buildings or a broad imaging system for monitoring of public places such as at intersections or parks, or additionally as an in-door remote monitoring system to monitor the inside of a house using multiple network cameras.

BRIEF DESCRIPTION OF DRAWINGS

FIG. 9 is a block diagram showing a camera construction.
FIG. 12 is an explanatory diagram explaining operations of the monitoring system in the First Embodiment.
FIG. 18 are diagrams showing operational examples (operation when a portion fails) of the monitoring system.
FIG. 28 are diagrams explaining an evaluation function G.

Figure 1:
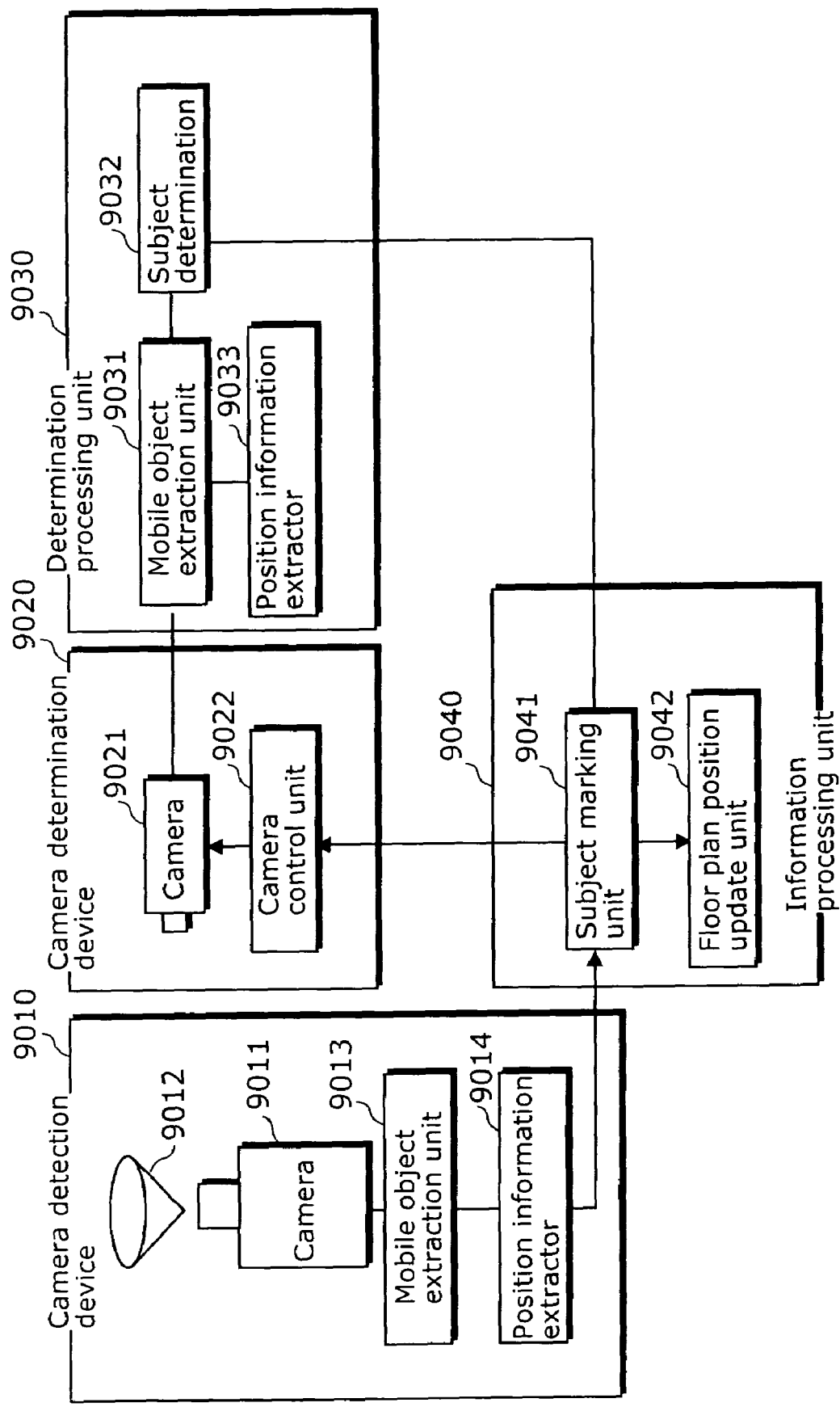
FIG. 1 is a block diagram according to the first prior art.
Figure 2:
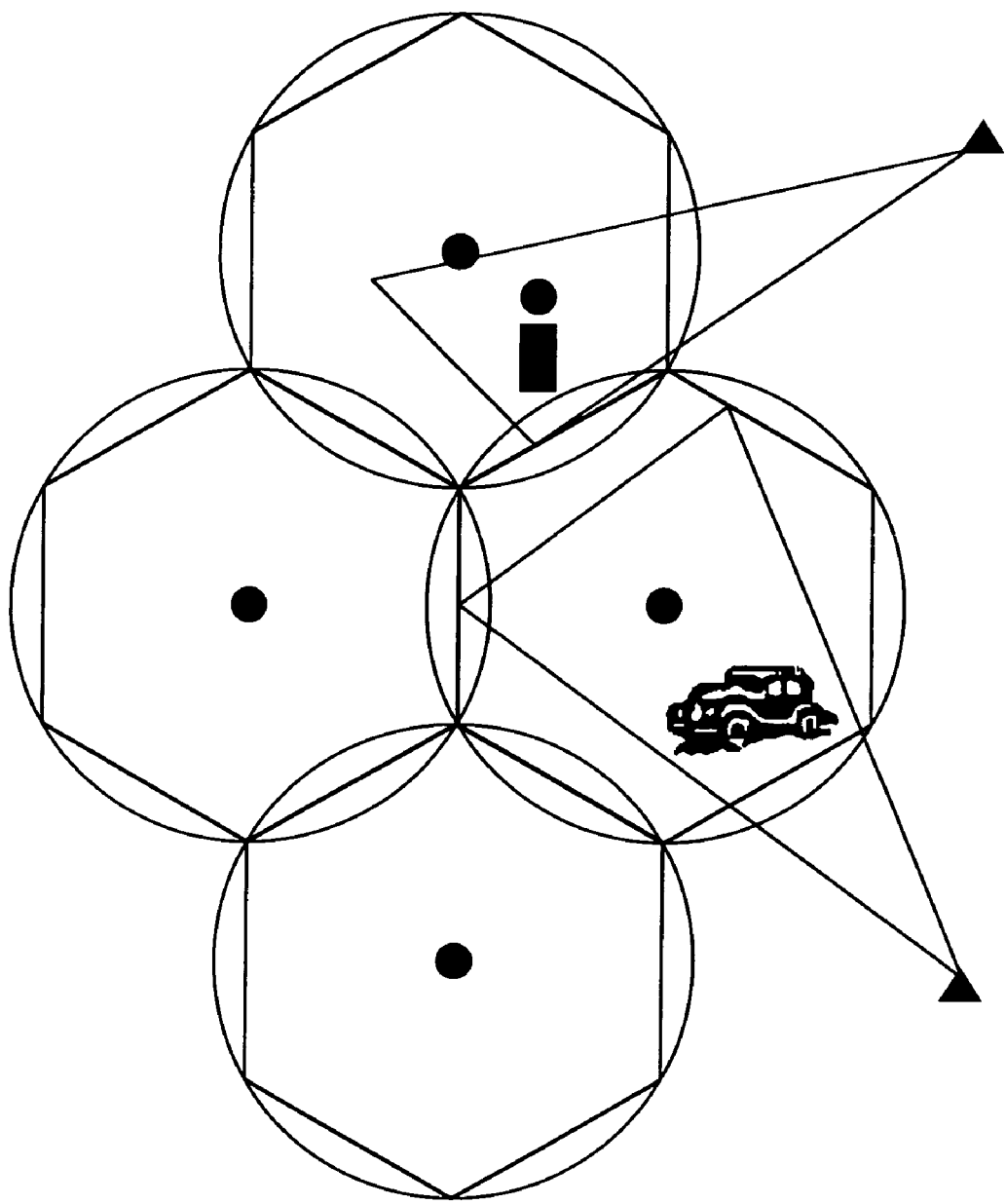
FIG. 2 is an explanatory diagram showing a range of field of vision by a camera according to the first prior art.
Figure 3:
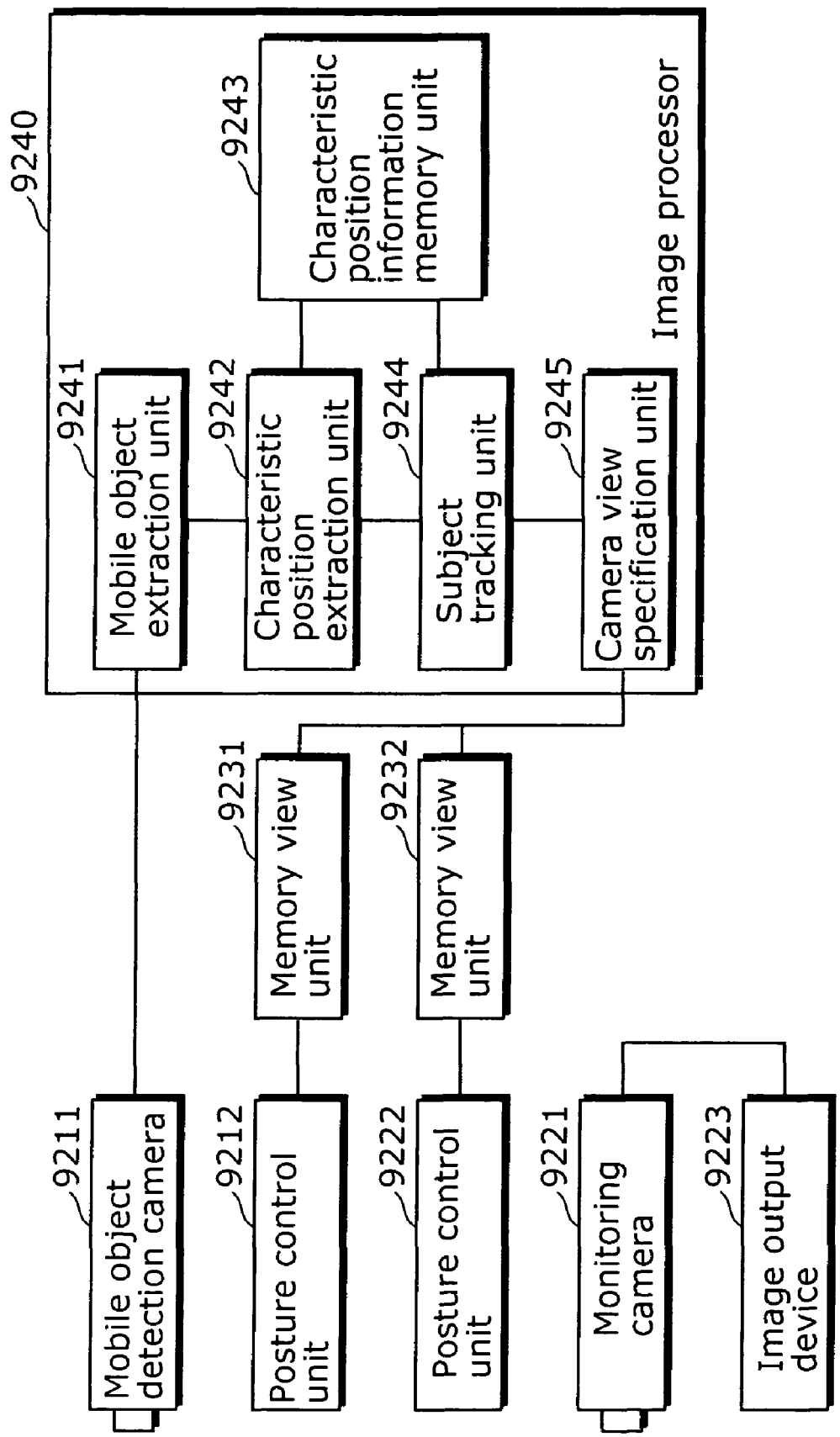
FIG. 3 is a block diagram according to the second prior art.
Figure 4:
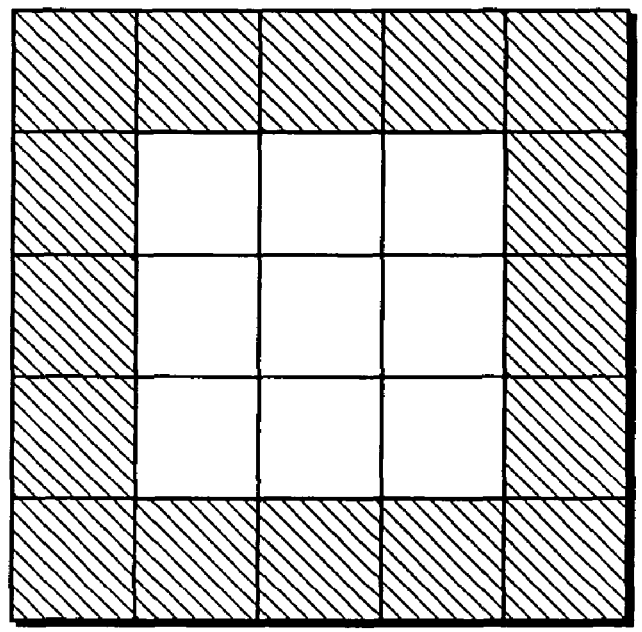
FIG. 4 is an operation explanatory diagram according to the second prior art.
Figure 5:
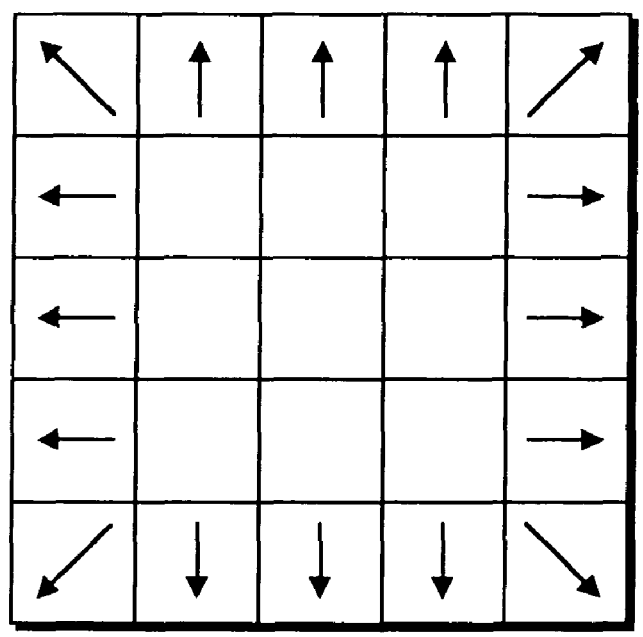
FIG. 5 is an operation explanatory diagram according to the second prior art.
Figure 6:
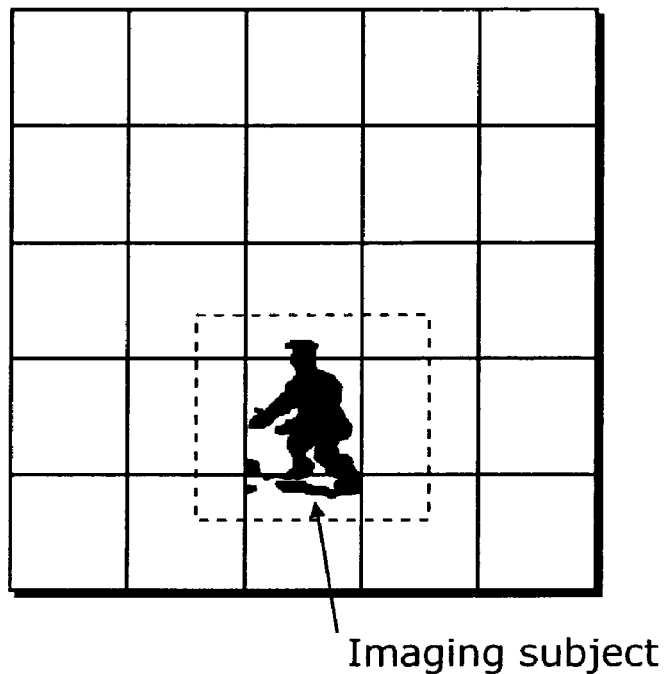
FIG. 6 is an operation explanatory diagram according to the second prior art.
Figure 7:
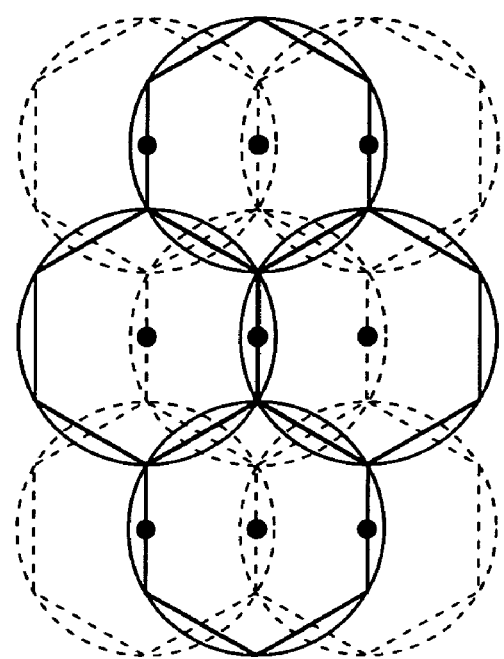
FIG. 7 is an operation explanatory diagram according to the second prior art.

NUMERICAL REFERENCES 101A to N, 104A to N and 106A to N camera
102A to N, 105A to N and 107A to N adjustment unit
103A to N: communicator
110A to N. 111A to N and 114A to N: camera terminal
112A to N: communication network
130: monitoring subject region
131: cooperative monitoring member selection range
140A to N: imaging region
150A to N: monitoring responsible region
201: lens
202: imager
203: picture processor
204: focal point controller
205: posture controller
211: cooperative monitoring member selector
212: cooperative monitoring member memory
213: monitoring subject region map memory
214: monitoring responsible region determiner
215: imaging range determiner
216: camera controller
217: monitoring responsible region comparison-evaluator
220: region configuration comparison-evaluator
222: adjustment unit for direction of line of sight

BEST MODE FOR CARRYING OUT THE INVENTION

Embodiments of the present invention are described hereafter, with reference to the drawings.

First Embodiment

First, a monitoring system according to the First Embodiment of the present invention is explained.

Figure 8:
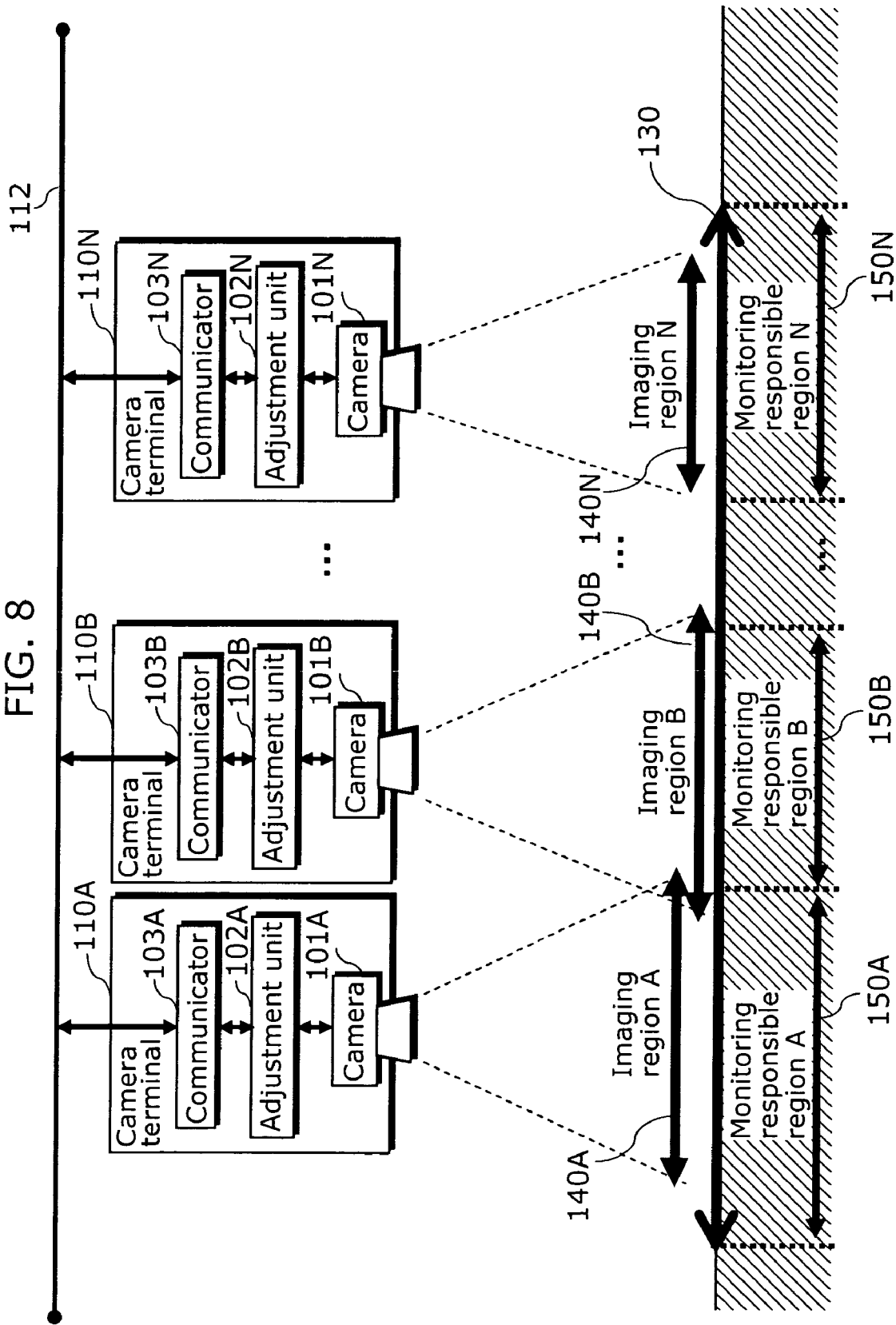
FIG. 8 is a block diagram showing a construction of the monitoring system in a First Embodiment according to the present invention.

FIG. 8 is a block diagram showing construction of a monitoring system according to the First Embodiment of the present invention. This monitoring system is a system for imaging a monitoring subject region by cooperatively operating the multiple camera terminals, and is composed of a network system 112 and multiple camera terminals 110A to N the number of which is sufficient to image an entire monitoring subject region 130 having the same function enabling zoom control. In the monitoring system, the installation position and installation direction of each of the camera terminals 110A to N are mutually pre-adjusted and fixed to arrange imaging regions 140A to N at specified intervals. The monitoring system is characterized in that each of the camera terminals 110A to N automatically adjusts a respective imaging range so as to display the entire monitoring subject region 130 in accordance with the installation position and direction of each camera terminal.

The monitoring subject region 130 is an entire region subject to monitoring by the monitoring system composed of the multiple camera terminals 110A to N. The imaging regions 140A to N are regions imaged by the camera terminals 110A to N, respectively. Monitoring responsible regions 150A to N are regions for which the camera terminals 110A to N are respectively responsible. The communication network 112 is a transmission path connecting the camera terminals 110A to N (in other words, communicators 103A to N provided in each of the camera terminals 110A to N).

Each of the camera terminals 110A to N determines an imaging region including a monitoring responsible region for its own camera terminal by communicating with the other camera terminals to image the determined imaging region. The camera terminals 110A to N are equipped with cameras 101A to N, adjustment units 102A to N and communicators 103A to N, respectively.

The cameras 101A to N are cameras having a function (such as a zoom control) to respectively change an imaging region and for example, are CCD cameras for loading an image within the monitoring subject region 130.

Communicators 103A to N are communication interfaces for the camera terminals 110A to N that transmit/receive information identifying an imaging region (a position of the imaging region and an imaging range) to/from the other camera terminals via the communication network 112.

The adjustment units 102A to N are processors for adjusting the imaging range where the cameras 101A to N determine regions of responsibility for monitoring by the cameras 101A to N (monitoring responsible regions 150A to N), respectively, and adjust the imaging regions 140A to N to incorporate the entire correspondent monitoring responsible region 150A to N, respectively. Specifically, for example, the adjustment unit 102A determines the monitoring responsible region for its own camera terminal 110A so as to make proximate the monitoring responsible region for its own camera terminal 110A to a monitoring responsible region for the other camera terminal 110B or a boundary of the monitoring responsible region for the other camera terminal 110B without leaving any interim space, based on the information from the other camera terminal 110B received by the communicator 103A, and at the same time, adjusts an imaging region for the camera 101A (an imaging range of the imaging region) in order to image the entire monitoring responsible region by the camera 101A. At this time, as a specific example of the monitoring responsible region, the adjustment unit 102A determines a region surrounded by the first reference point according to a perpendicular bisector of a line of segment connecting the first reference point provided within the imaging region of its own camera terminal 110A and the second reference point provided within the imaging region of another camera terminal adjacent to the imaging region, or the perpendicular line and the boundary of the monitoring subject region as a monitoring responsible region. Here, the first and second reference points are, for example, coordinates on the monitoring subject region displayed in the center of an image plane belonging to the camera of the camera terminal corresponding to the monitoring responsible region; in other words, a point where the line of sight by the camera of the camera terminal intersects the monitoring subject region, or center coordinates of the imaging region by the camera terminal.

In FIG. 8, in order to simplify the explanation, the monitoring subject region 130, the imaging regions 140A to N and the ranges of the monitoring responsible regions 150 A to N are respectively expressed with a one-dimensional straight line. However, a one-dimensional or greater plane, a curved surface, a three-dimensionally expressed region are also included as respectively subjects of the monitoring subject region 130, the imaging regions 140A to N and the ranges of the monitoring responsible regions 150 A to N.

FIG. 9(a) is a block diagram showing an internal configuration of each of the cameras 101A to N. Each of the cameras 101A to N is a CCD camera which allows zoom control, and has a lens 201, an imager 202, a picture processor 203 and a focal point controller 204.

The lens 201 is a lens for forming an image. The imager 202 is an element, such as a CCD, to image an image formed by the lens 201. The picture processor 203 is a processor to process a is picture imaged by the imager 202. The focal point controller 204 is a mechanism, such as a stepping motor, to change the space between the lens 201 and the imager 202, and as shown in FIG. 9(b), is a mechanism to change the imaging range of the imaging region of the camera 101A by increasing/reducing the space (focal length) between the lens 201 and the imager 202. Furthermore, a calculation method of a position of the imaging region imaged by the camera 101A is explained in the below-described Supplementary Explanation 1.

Figure 10:
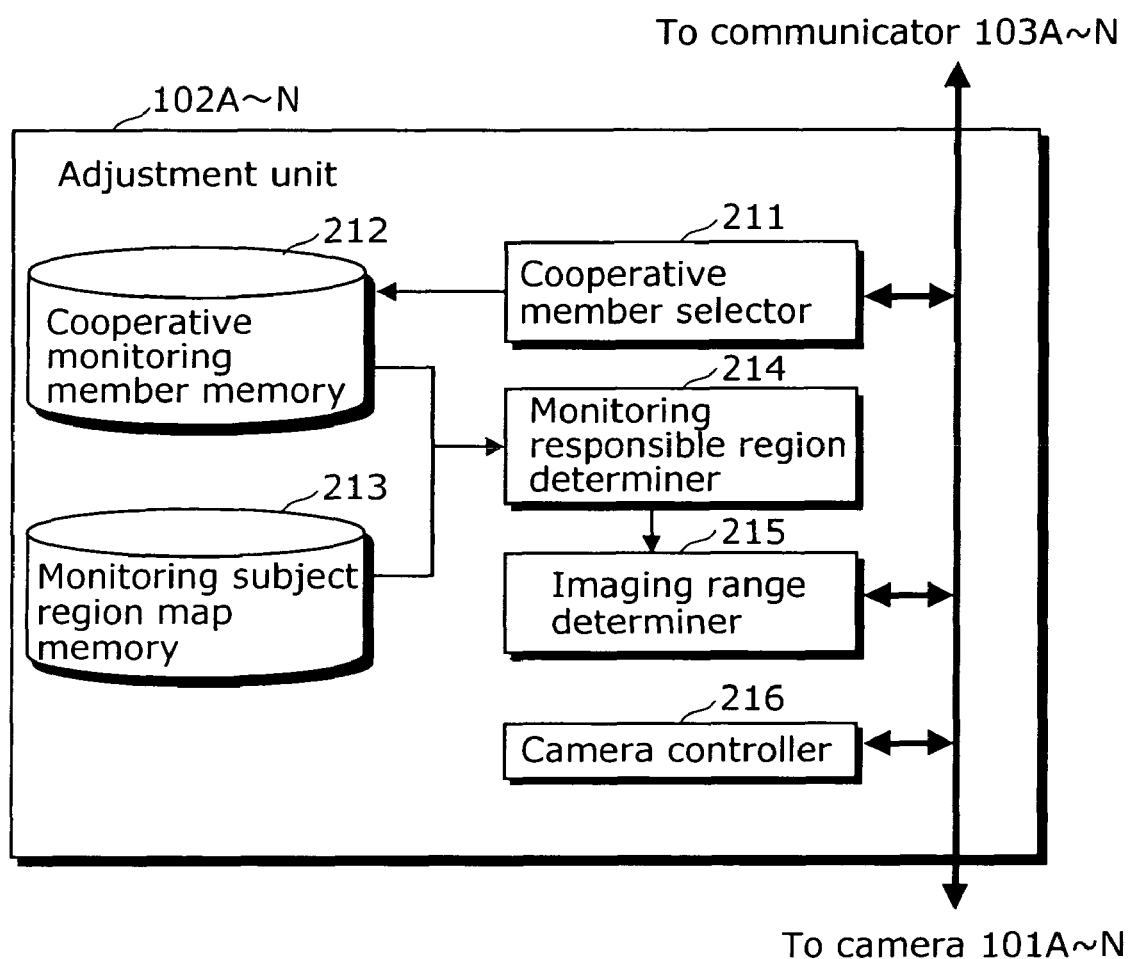
FIG. 10 is a block diagram showing a construction of the adjustment unit.

FIG. 10 is a block diagram showing an internal configuration of each of the adjustment units 102A to N. Each of the adjustment units 102A to N has a cooperative monitoring member selector 211, a cooperative monitoring member memory 212, a monitoring subject region map memory 213, a monitoring responsible region determiner 214, an imaging range determiner 215 and a camera controller 216.

The cooperative monitoring member selector 211, as a cooperative monitoring member, is a processor to select another camera terminal imaging [a region] within a specified range from the position of its own imaging region.

The cooperative monitoring member memory 212 comprises memory in which to store information (position of the imaging region and imaging range) identifying the imaging region notified by the cooperative monitoring member (another camera terminal) selected by the cooperative monitoring member selector 211.

Figure 11:
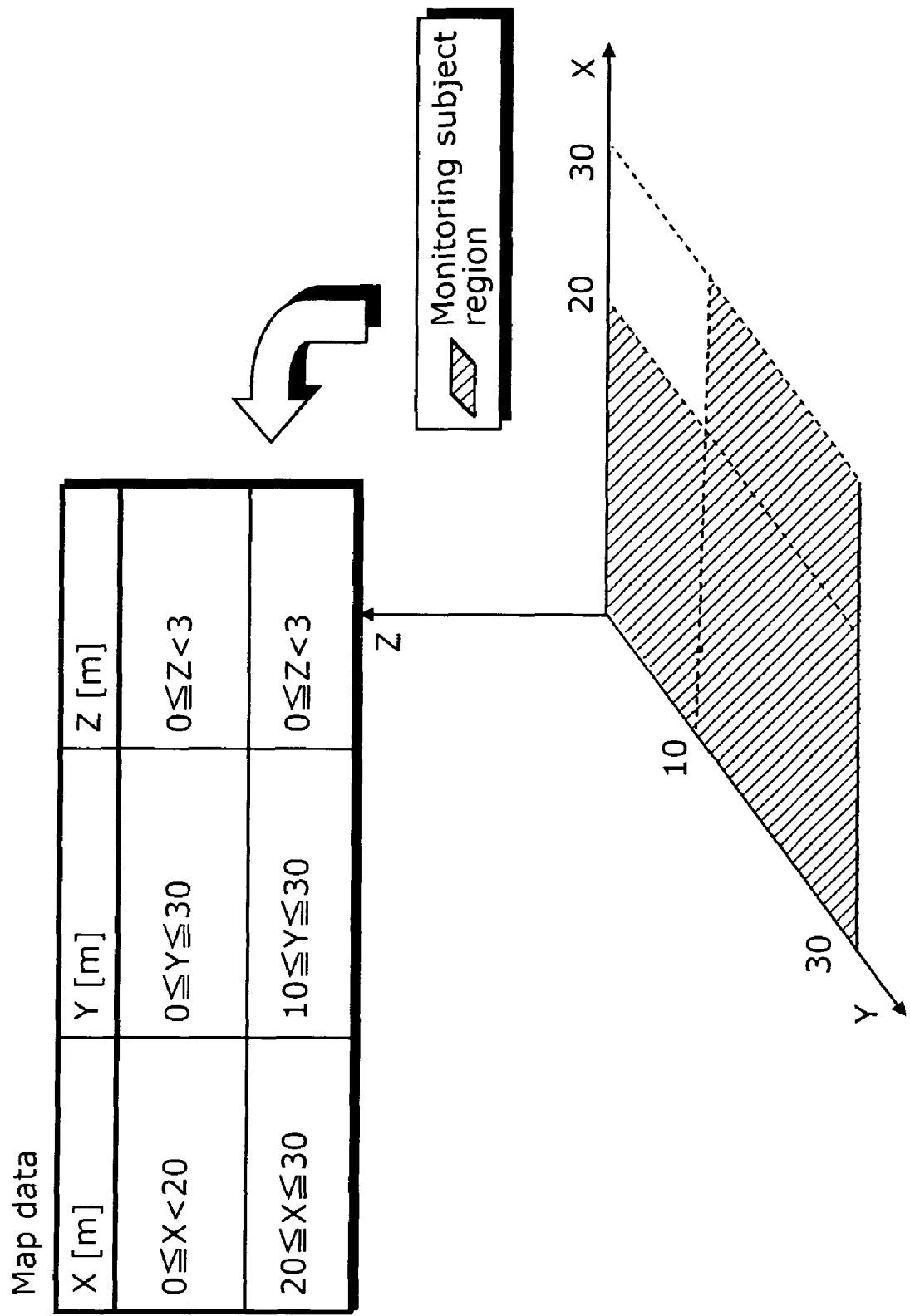
FIG. 11 is a chart showing an example of map data.

The monitoring subject region map memory 213 comprises memory in which to store map data which defines the range of the monitoring subject region 130. In addition, an example of the map data stored in the monitoring subject region map memory 213 is shown in FIG. 11. In the map data of FIG. 11, the monitoring subject region 130 is expressed by defining the range to be monitored for each coordinate axis (x, y, z) for determining the position results. Furthermore, as the map data, even a description method other than that shown in FIG. 11 is acceptable as long as it is a description method that may identify ranges to be respectively imaged by the camera terminals 110A to N. In addition, for the map data, other than the pre-provided information, map data prepared according to picture processing or recognition processing from a surrounding environmental picture imaged by the camera itself during the operation of a monitoring system is also usable.

Monitoring responsible region determiner 214 is a processor to determine a monitoring responsible region so as to make proximate a monitoring responsible region of another camera terminal or a boundary of the monitoring subject region, without any gap, based on the information about the imaging region of its own camera terminal 110A (the position of the imaging region and the imaging range), the information about the other camera terminal stored in the cooperative monitoring member memory 212 (the position of the imaging region and the imaging range) and the map data stored in the monitoring subject region map memory 213.

Specifically, the monitoring responsible region determiner 214 determines the region surrounding the first reference point according to a perpendicular bisector of a line of segment connecting the first reference point provided within the imaging region of its own camera terminal and the second reference point provided within the imaging region of another camera terminal adjacent to the imaging region, or, the perpendicular bisector and the boundary of the monitoring subject region, as a monitoring responsible region.

Imaging range determiner 215 is a processor to determine focal length for displaying the entire image of the monitoring responsible region 150A determined by the monitoring responsible region determiner 214.

Camera controller 216 is a processor to control focal length of the camera 101A in order to have the focal length determined by the imaging range determiner 215.

Next, mentioning a case where the multiple camera terminals 110A to N constructed as shown in FIGS. 8, 9 and 10 are arranged in a room having a rectangular floor surface shown in FIG. 12(a) as an example, operational procedures of each of the camera terminals 110A to N and the entire monitoring system are explained.

First, installation conditions of the camera terminals 110A to N in First Embodiment are explained.

As shown in FIG. 12(a), for the number of the camera terminals 110A to N, camera terminals 110A to N the number of which is sufficient for thoroughly imaging the monitoring subject region 130 are installed. For example, as shown in FIG. 12(b), when the image angle of the camera is maximum, if one-ninth of an area of the imaging region (maximum imaged area) imaged in a state where the imaging plane of the imager 202 is parallel to the monitoring subject region 130 is a reference imaging area, the number of the camera terminals 110A to N, which is the number where a total sum of the reference imaging areas of the camera terminals 110A to N is greater than the area of the monitoring subject region 130, should be prepared in the monitoring system.

In addition, camera terminals 110A to N are installed along the end of the ceiling, and the floor surface is the monitoring subject region 130, and in order for thoroughly imaging the region, the direction of the line of sight of each of the camera terminals 110A to N is adjusted to arrange points where each line of sight intersects the monitoring subject region 130 to form a lattice. Furthermore, points where the line of sight by the camera intersects at the monitoring subject region 130 are coordinates on the monitoring subject region 130 displayed on the center of the image plane belonging to the camera, and an example of the first and second reference points.

In the present embodiment, the reason the size of the reference region is one-ninth the maximum imaged area, is because when another camera terminal with the same performance adjacent to each of the imaging areas 140A to N fails, the expansion of the area of the imaging regions by the camera terminals 110A to N to be 9 times or greater enables supplementation by imaging the imaging region of the failed camera terminal.

As shown in FIG. 12(a), if the installation position is limited to the end of the ceiling, for the purpose of imaging the entire floor, the angles (angles of declination) of the line of sight by each of the camera terminals 110A to N become different. Consequently, even if the angle of view is the same, since the size of the imaging regions 140A to N are different for each camera terminal 110A to N, for the purpose of thoroughly imaging the monitoring subject region 130, it is necessary to adjust the imaging range associated with the positions of the imaging regions 140A to N for each camera terminal 110A to N.

Figure 13:
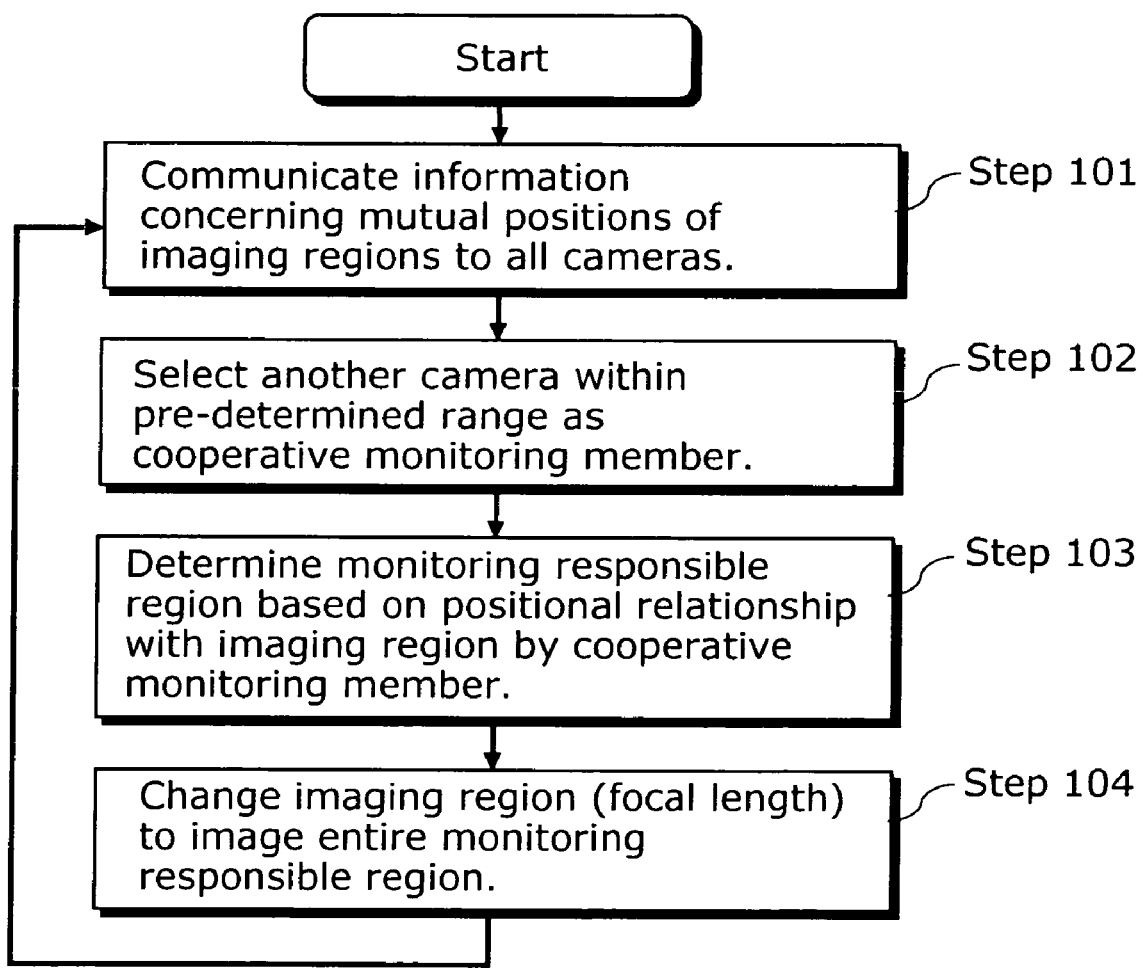
FIG. 13 is a flowchart showing operational procedures of the monitoring system in the First Embodiment.

Operation procedures of each of the camera terminals 110A to N are explained hereafter, with reference to the flowchart shown in FIG. 13.

First, the communicator 103A communicates information identifying mutual positions and the imaging ranges of the imaging regions 140A to N to all communicable camera terminals within the monitoring system (Step 101).

Next, the cooperative monitoring member selector 211 selects another camera terminal within a specified range from the imaging region 140A of the camera terminal 110A itself on the monitoring subject region 130 as a cooperative monitoring member utilizing the information of the other camera terminal received by the communicator 103A, and stores the information about the selected member in the cooperative monitoring member memory 212 (Step 102).

Figure 14:
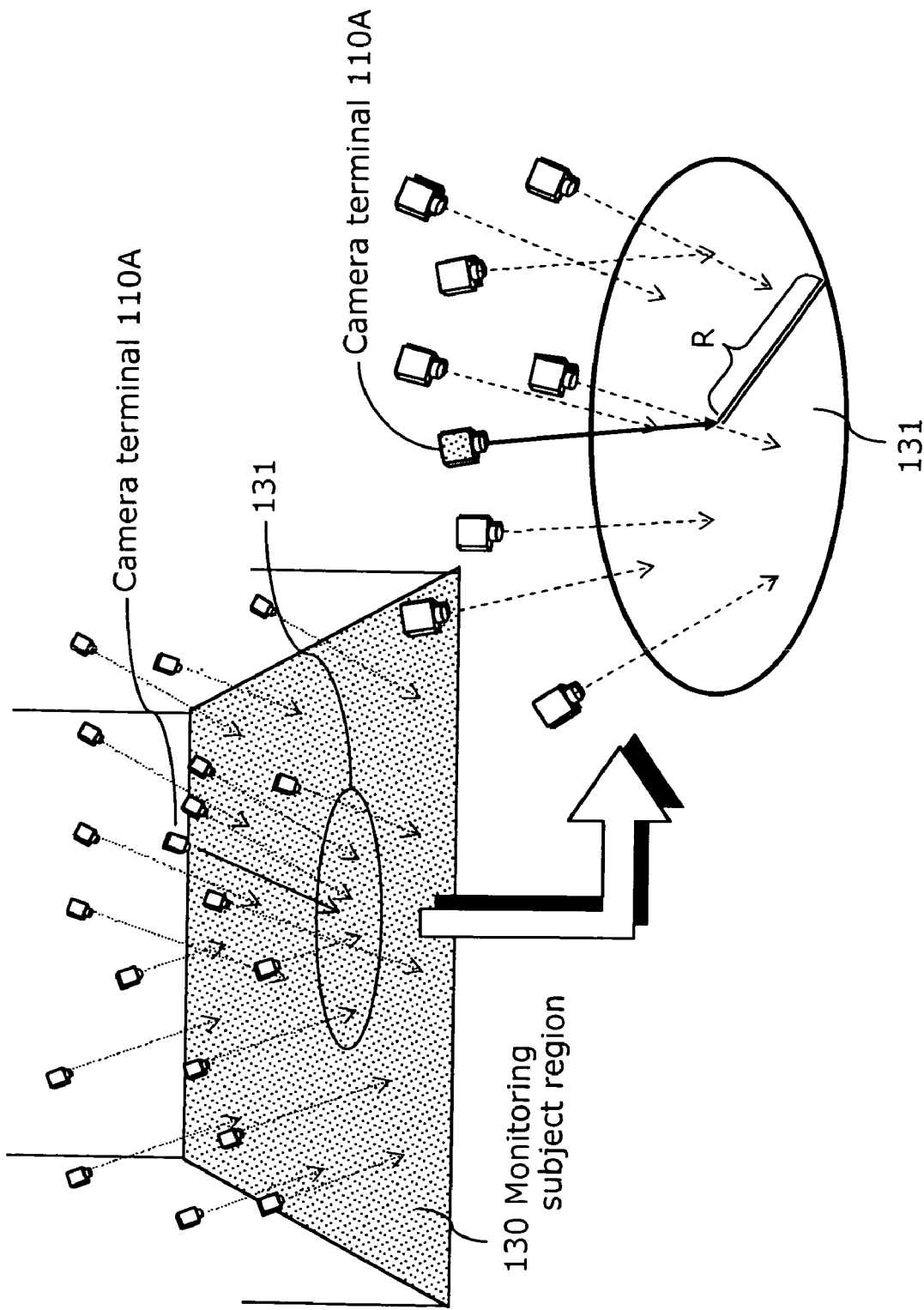
FIG. 14 is an explanatory diagram explaining operations (selection of a cooperative monitoring member) of the monitoring system.

The process for select the cooperative monitoring member is explained hereafter, with reference to FIG. 14. FIG. 14 shows a state in which the monitoring subject region 130 is imaged by the camera terminals 110A to N, among which the camera terminal 110A selects a cooperative monitoring member. In the diagram, components similar to those in FIG. 8 are marked with the same symbols, and explanations are omitted. As shown in the lower-right of FIG. 14, cooperative monitoring member selective range 131 is in a range of the region to be referenced if the camera terminals 110A to N select cooperative monitoring members.

FIG. 14, focusing on the operation of the camera terminal 110A, in the camera terminal 110A, a concentric region with a radius R using the end of the line of sight by the camera 101A (a portion displayed in the center of the imaged picture) as a center, is the cooperative monitoring member selection range 131, and selection is made of another camera terminal the end of the line of sight of which is within the cooperative monitoring member selection range 131 as a cooperative monitoring member. In this example, as the cooperative monitoring member selection range 131, the circular region using the end of line of sight by the camera 101A as center is mentioned as an example. However, other than the end of the line of sight, the center coordinates in the imaging region may be used as the center of the cooperative monitoring member selection range 131. In addition, the configuration of the cooperative monitoring member selection range 131, other than circle, may be another configuration, such as an ellipse or polygon.

Next, the monitoring responsible region determiner 214 determines the monitoring responsible region 150A using the information concerning the imaging region by the camera terminal selected as a cooperative monitoring member (Step 103).

Figure 15:
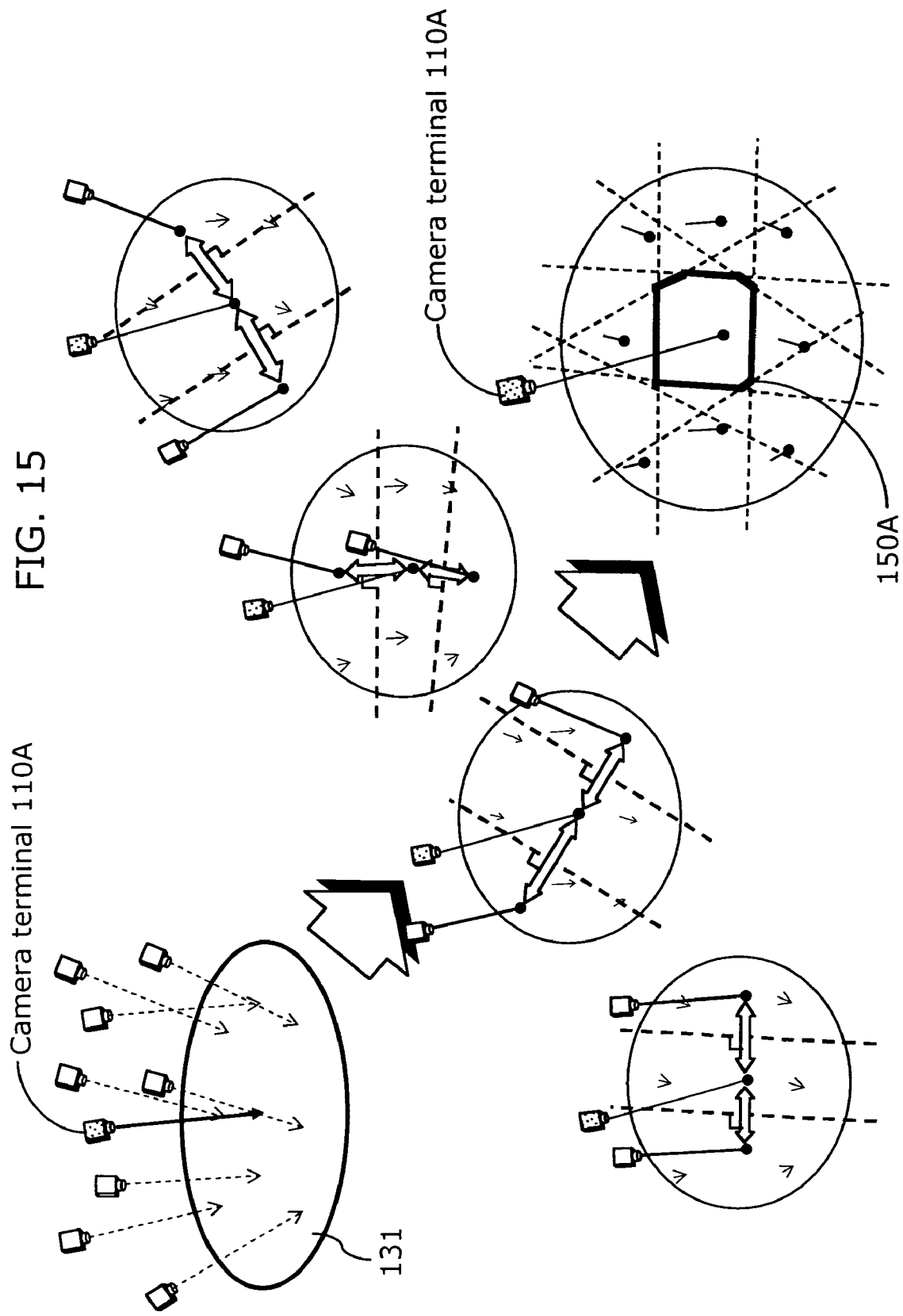
FIG. 15 is an explanatory diagram explaining operations (determination of a monitoring responsible region) of the monitoring system.

The details of the process to determine the monitoring responsible region 150A by the monitoring responsible region determiner 214 are described hereafter, with reference to FIG. 15. In FIG. 15, components which are the same as those in FIG. 8 and FIG. 14 are marked with the same symbols, and explanations are omitted. In the diagram, focusing on the camera terminal 110A, the camera terminal 110A draws a perpendicular bisector (dotted line) relative to a line of segment connecting the end of the line of sight by the other camera terminal selected in FIG. 14 (in other words, the second reference point) and the end of the line of sight by the camera terminal 110A itself (in other words, the first reference point), and determines a region determined by the perpendicular bisectors and/or the boundary of the monitoring subject region 130 surrounding the end of its own line of sight (the first reference point) as the monitoring responsible region 150A. In FIG. 15, a situation of the monitoring responsible region 150A to be determined by focusing on a camera terminal 110A is shown, and as a monitoring system, independent determination of the monitoring regions 150A to N by each of the camera terminals 110A to N results in the division of the monitoring subject region 130 into the same number as that of the camera terminals 110A to N of the monitoring responsible regions 150A to N. In FIG. 15, wherein the monitoring responsible region 150A is determined on the basis of the end of the line of sight (a portion displayed in the center of the imaged picture). However, the monitoring responsible region 150A may be determined on the basis of the center coordinates of an imaging region other than the end of the line of sight region.

Next, the imaging range determiner 215 obtains the focal length (target focal length) in a state where the entire monitoring responsible region 150A (in other words, including the monitoring responsible region) is displayed, and if the area of the imaging region 140A is the smallest, the camera controller 216 controls the camera 101A in order to approximate the focal length of the camera terminal to the target focal length (Step 104). A specific calculation method for the target focal length by the imaging range determiner 215 is explained in the Supplementary Explanation 2, described hereafter.

According to the construction and procedures in the present embodiment, the multiple camera terminals 110A to N determines the monitoring responsible region 150A to N by communicating information relating to the identification of the mutual positions of the imaging regions or the imaging ranges, respectively, and in addition, thoroughly image the entire monitoring subject region by adjusting the imaging range of the imaging regions 140A to N so as to cover their own entire monitoring responsible regions 150A to N, respectively.

Figure 16:
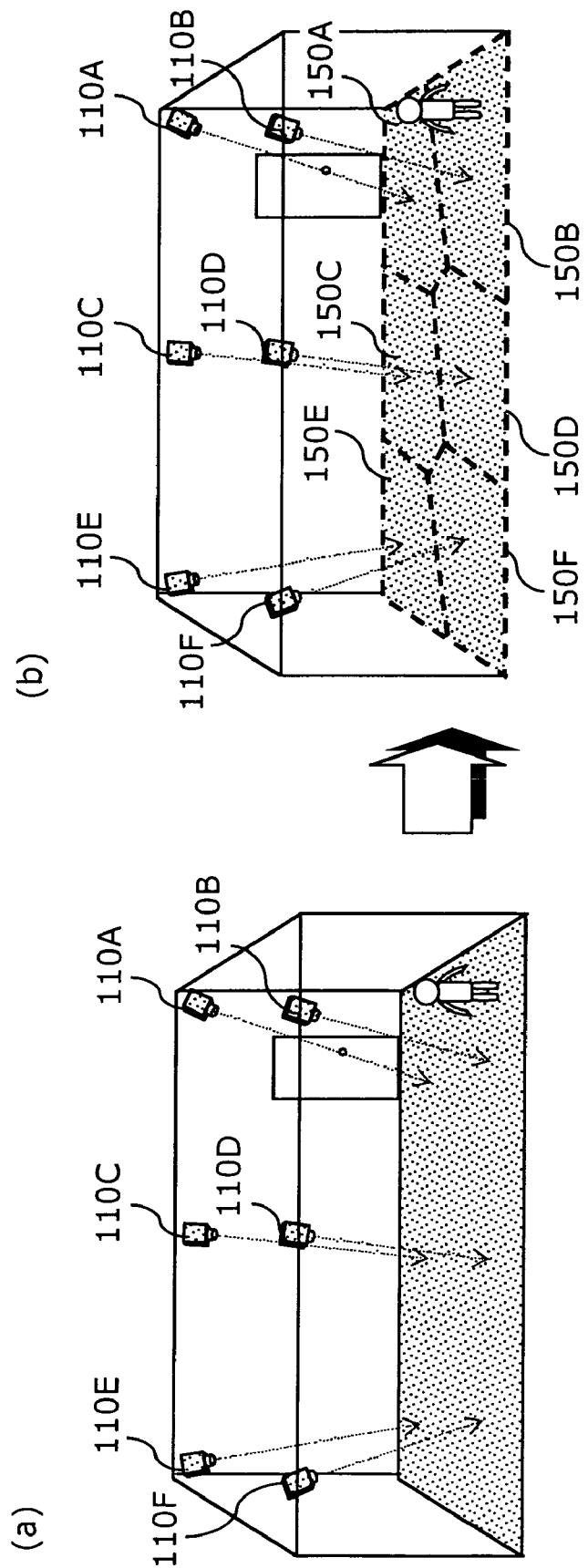
FIG. 16 is a diagram showing an operational example of the monitoring system.
Figure 17:
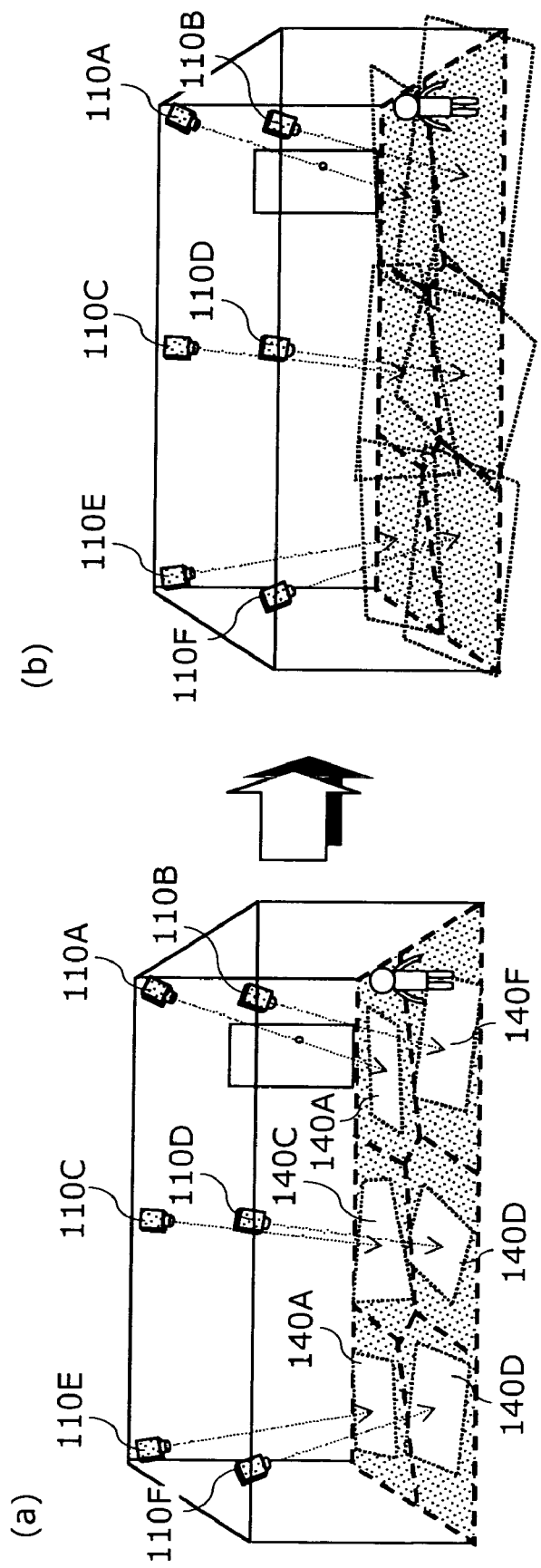
FIG. 17 is a diagram showing an operational example of the monitoring system.

FIG. 16 and FIG. 17 show operational examples of the entire monitoring system composed of multiple camera terminals 110A to N in the First Embodiment 1. In the diagrams, components which are the same as those in FIG. 8, are marked with the same symbols, and explanations are omitted.

FIG. 16(a) shows a state in which six camera terminals, 110A, 110B, 110C, 110D, 110E and 110F, are installed at random locations within a room in order to image the interior of the room, considering the floor surface of the room as the monitoring subject region 130. In addition, the six camera terminals 110A to N are sufficient to thoroughly image the monitoring subject region 130, and as shown in FIG. 12(b), if the image angle of the camera is maximum, if a size one-ninth of the area of the imaging region imaged in a state where the image plane of the imager 202 parallel to the monitoring subject region 130 is regarded as a reference imaging area, the total sum of the referenced imaging regions by the six camera terminals 110A to F should be greater than that of the monitoring subject region 130.

In addition, the direction of line of sight by each of the camera terminals 110A to F is adjusted to arrange the points where the line of sight by each of the camera terminals 110A to F intersects the monitoring subject region 130 to form a lattice.

The six camera terminals 110A to F shown in FIG. 16(a) mutually communicate information relating to the imaging regions 140A to F via the communication network 112, and the monitoring responsible region determiner 214 determines the monitoring responsible region 150, dividing the monitoring responsible regions 150A to F respectively responsible to each of the camera terminals 110A to F as shown in FIG. 16(b).

A situation where each of the camera terminals 110A to F changes the imaging region is explained hereafter, with reference to FIG. 17. Imaging regions 140A to F are the respective imaging regions of the camera terminals 110A to F. The imaging range determiner 215 obtains the focal length (target focal length) when the areas of the imaging regions 140A to F are the smallest in a state where the entire monitoring responsible region is displayed, relative to the camera terminals 110 A to F, respectively, and the adjustment of the focal length by the camera controller 216 and the focal point controller 204 results in the thorough imaging of the entire monitoring subject region (floor surface) as shown in FIG. 17(b).

As described, with the monitoring system in the present embodiment, if multiple camera terminals are installed at appropriate positions and in the appropriate installation directions relative to the specified monitoring subject region 130, even if the imaging range of each camera terminal is not pre-adjusted, the multiple camera terminals automatically adjust the imaging ranges in order to image the entire monitoring subject region in accordance with the configuration of the monitoring subject region, reducing the problems relating to adjusting the imaging regions in the installation process of the multiple camera terminals.

Next, a case is explained of when a camera terminal within the monitoring system shuts down.

FIG. 18 shows the state in which the six camera terminals 111A to F are imaging the monitoring subject region 130. In the diagram, components which are the same as those in FIG. 8, are marked with the same symbols, and their explanations are omitted.

In the monitoring system shown in FIG. 18(a), if the imaging region 140B is impaired because of a failure or maintenance inspection of one camera terminal 111B (FIG. 18(b)), the monitoring responsible regions 150A of the remaining camera terminals are re-determined in Step 103 shown in FIG. 13, and the range of each imaging region is changed in Step 104, so the monitoring subject region 130 may again be continuously and thoroughly imaged (FIG. 18(c)). Even if the positions and ranges of the imaging regions are changed due to zooming-in imaging of an object (for example, a person), excluding the camera terminal 111B from the cooperative members enables similar maintenance and continuation of the entire imaging of the monitoring subject region 130 (FIG. 18(d)). Even if the failed camera terminal 110B is restored or a new camera terminal is added to the monitoring system; the monitoring subject region is similarly re-determined according to Step 103 and Step 104 in FIG. 13 and each imaging range is changed, so redundant region(s) imaged by multiple camera terminals may be reduced.

In the present embodiment, the entire monitoring subject region is imaged only by zoom control of the cameras. However, the cameras of the present embodiment may have not only zoom control, but also pan tilt controls, in which case, the entire monitoring subject region may be imaged not only by zoom control but also by the camera control along with the pan tilt controls.

Second Embodiment

Next, a monitoring system in the Second Embodiment of the present invention is explained.

Figure 19:
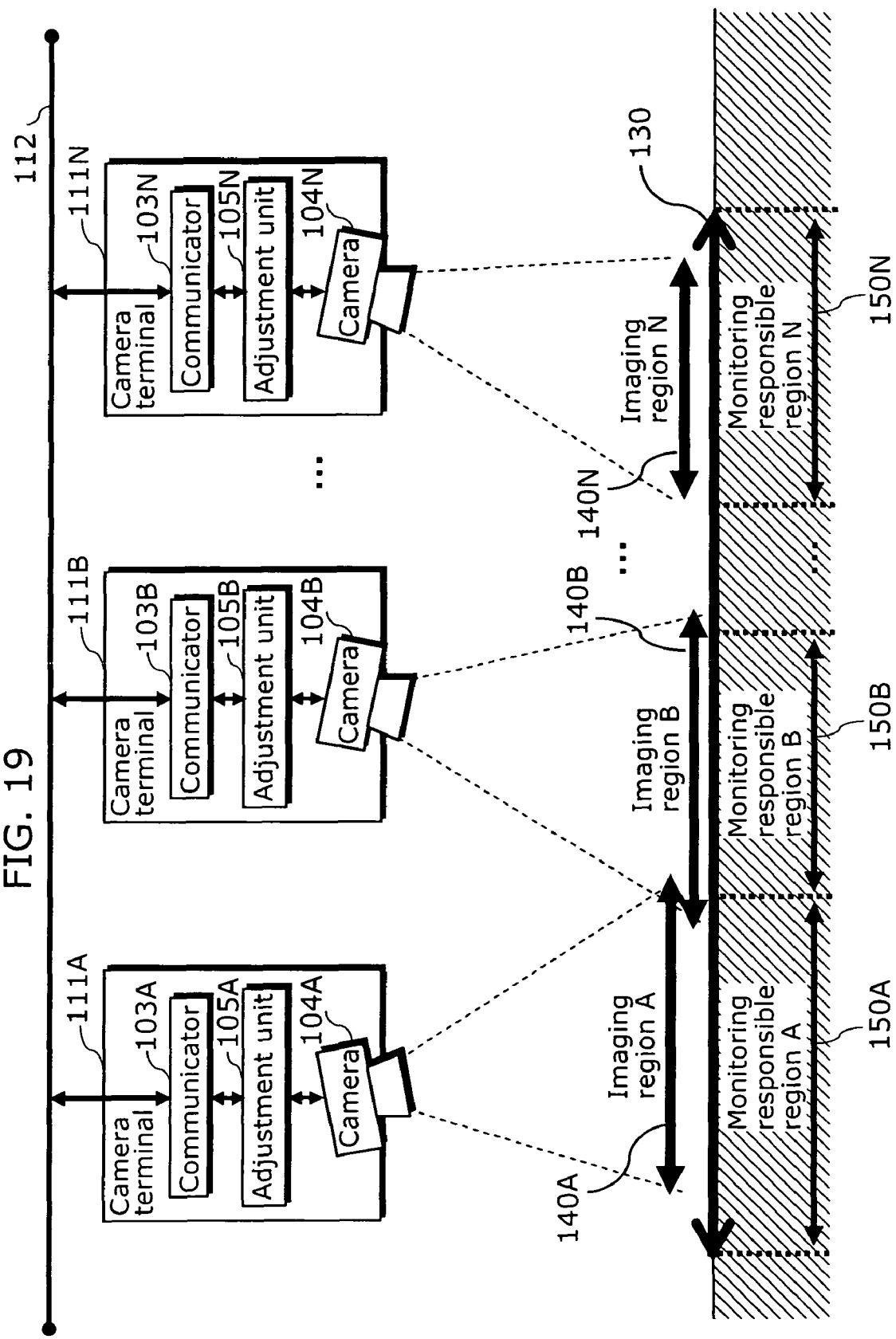
FIG. 19 is a block diagram showing a construction of the monitoring system according to a Second Embodiment according to the present invention.

FIG. 19 is a block diagram showing the construction of the monitoring system in the Second Embodiment of the present invention. The monitoring system is a system to image an entire monitoring subject region by cooperatively operating multiple camera terminals, and is composed of communication network 112 and the multiple camera terminals 111A to N, the number of which is sufficient for imaging the entire monitoring subject region 130, having the same performance enabling zoom control and the pan tilt control. Each of the camera terminals 111A to N is dispersed and secured in an installation position to image within the monitoring subject region 130 using the pan tilt controls.

In order to display the entire monitoring subject region 130, the monitoring system changes the position of the imaging regions and imaging ranges by changing the direction of the line of sight by each of the camera terminals 111A to N to equalize the size of the monitoring responsible regions 150A to N, and in addition, automatically determines the positions of the imaging regions and the imaging ranges by adjusting the focal length to display the entire monitoring responsible regions 150A to N. In particular, the present embodiment is characterized by the fact that using the camera terminals 111A to N that may adjust the positions of the imaging regions due to the pan tilt results in changing the imaging positions of the camera terminals 111A to N to roughly equalize the allocation range of each of the monitoring responsible regions 150A to N when determining the monitored responsible regions 150A to N, the number of which is the same as that of the camera terminals 111A to N, as the monitoring subject region 130, similar to the First Embodiment. In FIG. 19, components which are the same as those in FIG. 8, are marked with the same symbols and explanations are omitted.

Camera terminals 111A to N are devices to determine the imaging region including the monitoring responsible region of each camera terminal by communicating to the other camera terminals, and to image the determined imaging region, respectively, and are equipped with cameras 104A to N, adjustment units 105A to N and communicators 103A to N, respectively.

Cameras 104A to N have a function to change the position of the imaging region and the imaging range (pan tilt control and zoom control), respectively, and for example, are pan tilt cameras that may respectively change the position and range of imaging regions 140A to N.

Adjusters 105A to N are processors to respectively determine the monitoring responsible regions 150A to N of cameras 104A to N, and for adjusting the imaging directions and the imaging ranges to include the corresponding entire monitoring responsible regions 150A to N in the imaging regions 140A to N, respectively. Specifically, for example, adjustment unit 105A is equipped with a function to determine the position of an imaging region for adjusting the monitoring responsible region of its own camera terminal closer to the size of a monitoring responsible region adjacent to the monitoring responsible region by comparing and evaluating the monitoring responsible region of its own camera terminal and the monitoring responsible region adjacent to the monitoring responsible region, in addition to the function of the adjustment unit 102A in the First Embodiment. Specifically, the adjustment unit 105A determines the position of the imaging region to equalize the distance from the point where the line of sight by the camera intersects the monitoring subject region (the first reference point) to each boundary of the monitoring responsible region by moving the point (first reference point).

Figure 20:
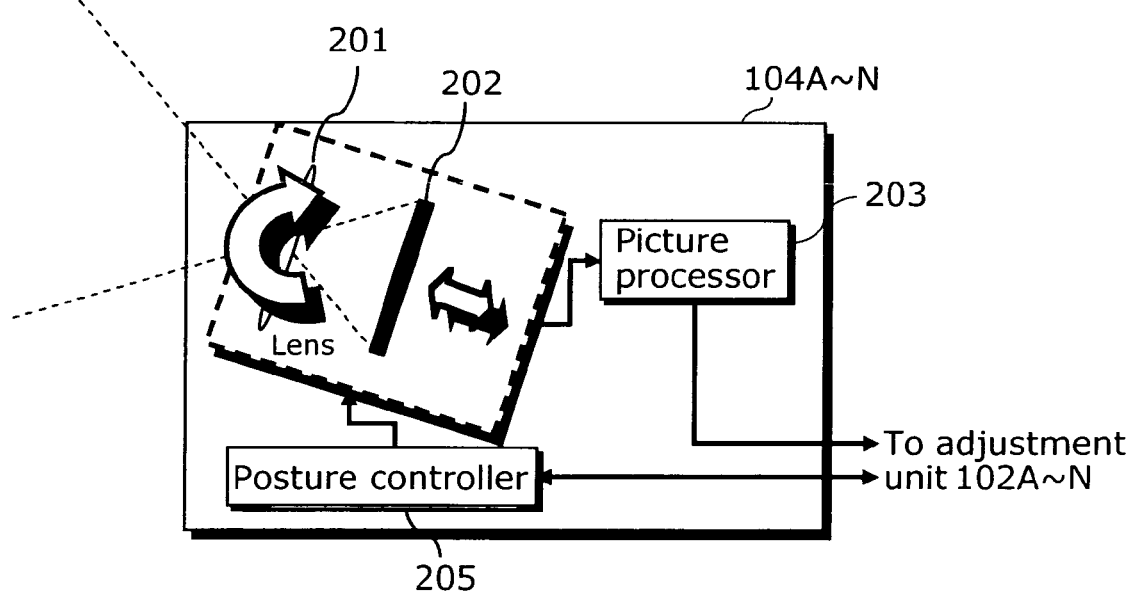
FIG. 20 is a block diagram showing a camera construction.

FIG. 20 is a block diagram showing the internal configuration of each of the cameras 104A to N. Cameras 104A to N are cameras enabling pan tilt control and zoom control, and respectively have a lens 201, an imager 202, a picture processor 203 and a posture controller 205. In the diagram, components which are the same as those in FIG. 9, are marked with the same symbols, and explanations are omitted.

The posture controller 205 is a mechanism, such as a stepping motor, to change the space between the lens 201 and the imager 202, and to additionally change the orientation of the image plane of the lens 201 and the imager 202, and as shown in FIG. 19, is a mechanism to change the position of the imaging region and the imaging range of the camera 104A by changing the space and orientation of the lens 201 and imager 202.

Furthermore, a calculation method of the position of the imaging region imaged by the camera 104A is explained in Supplementary Explanation 1, described hereafter.

Figure 21:
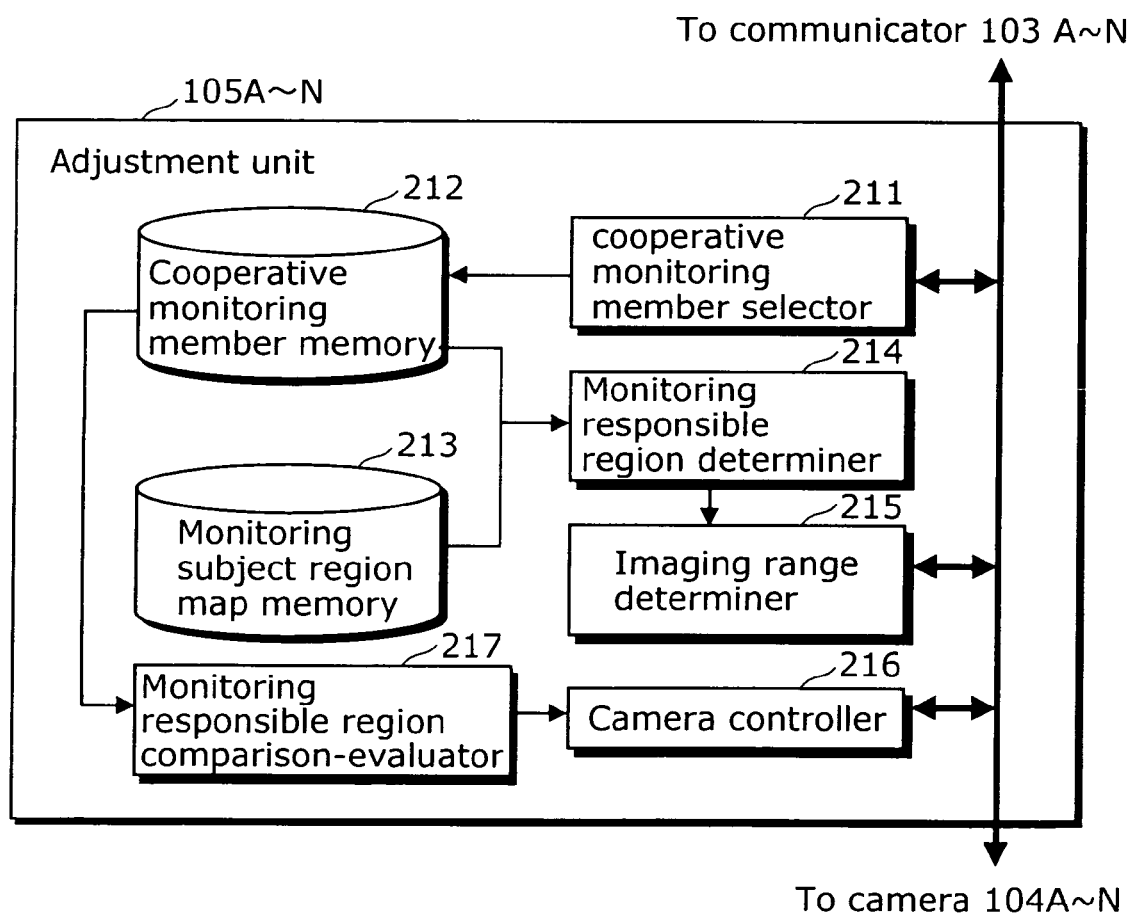
FIG. 21 is a block diagram showing an adjustment unit construction.

FIG. 21 is a block diagram showing an internal configuration of each of the adjustment units 105A to N. The adjustment units 105A to N are provided with a cooperative monitoring member selector 211, cooperative monitoring member memory 212, monitoring subject region map memory 213, a monitoring responsible region determiner 214, imaging range determiner 215, camera controller 216 and monitoring responsible region comparison-evaluator 217, respectively. In the diagram, components which are the same as those in FIG. 10, are marked with the same symbols, and explanations are omitted.

The monitoring responsible region comparison-evaluator 217 is a processor which determines the position of the imaging region for adjusting the monitoring responsible region of its own camera terminal closer to the size of the monitoring responsible region adjacent to the monitoring responsible region. In other words, the size of the closely adjacent surrounding monitoring responsible regions and that of the monitoring responsible region of its own camera terminal are compared and evaluated, and the line of sight by the camera 104A changes the approximate evaluated value to a specified target value. Specifically, the monitoring responsible region comparison-evaluator 217 determines the position of the imaging region by moving the first reference point to equalize the distance from the point where the line of sight of the camera intersects a monitoring subject region (first reference point) to each boundary of the monitoring responsible regions.

Figure 22:
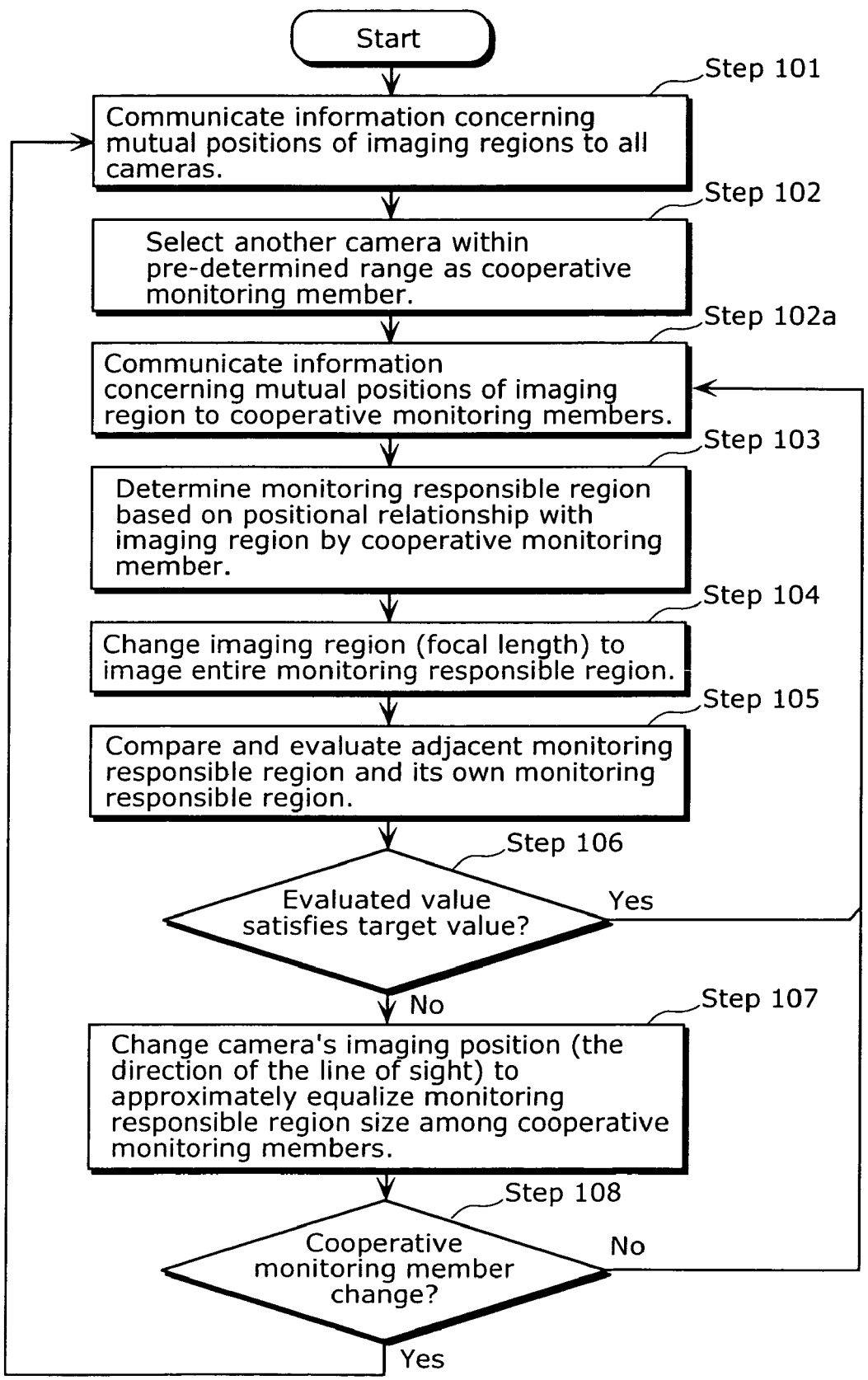
FIG. 22 is a flowchart showing operational procedures of the monitoring system according to the Second Embodiment.

Operational procedures of the monitoring system in the Second Embodiment are explained next. FIG. 22 is a flowchart showing operational procedures of camera terminals 111A to N. Here, the operational procedures of the camera terminal 111A are explained. In the flowchart, since the procedures from Step 101 to Step 102 are the same as those in FIG. 13, the same symbols are used and the explanations are omitted.

The communicator 103A communicates information relating to the identification of the position of the monitoring region and the imaging range of the camera terminals selected by the cooperative monitoring member selector 211 as a cooperative monitoring member (Step 102a). In Step 101, Step 102 and Step 102a, if the cooperative monitoring member selector 211 has already selected the cooperative monitoring member, Step 101 and Step 102 will be skipped, and communication only with the cooperative monitoring member enables preventing the increase of unnecessary traffic within the communication network 112 and reducing the data processing quantity at each processor. In addition, if the communication capacity of the communication network 112 is sufficiently great compared to the number of the camera terminals 111A to N composing the monitoring system or if the performance of each processor within the camera terminal is sufficiently high, it may be constructed by not including the cooperative monitoring member selector 211 or the operational procedures may omit a process (Step 102).

In FIG. 22, since Step 103 and Step 204 are the same procedures as those in FIG. 13, the same symbols are used and the explanations are omitted.

Next, the monitoring responsible region comparison-evaluator 217 compares and evaluates the sizes of the monitoring responsible regions of mutually surrounding camera terminals and that of its own monitoring responsible region 150A (Step 105), and determines whether the obtained evaluated value as a result of the comparison satisfies the specified target value (for example, whether a difference in the sizes of the two monitoring responsible regions is smaller than a specified threshold) (Step 106). As a result, if it is satisfied, a similar process is repeated (to Step 102a); in the meantime, if it is not satisfied, the direction of the line of sight by the camera 104A is changed to approximate the evaluated value to the specified target data (Step 107).

Figure 23:
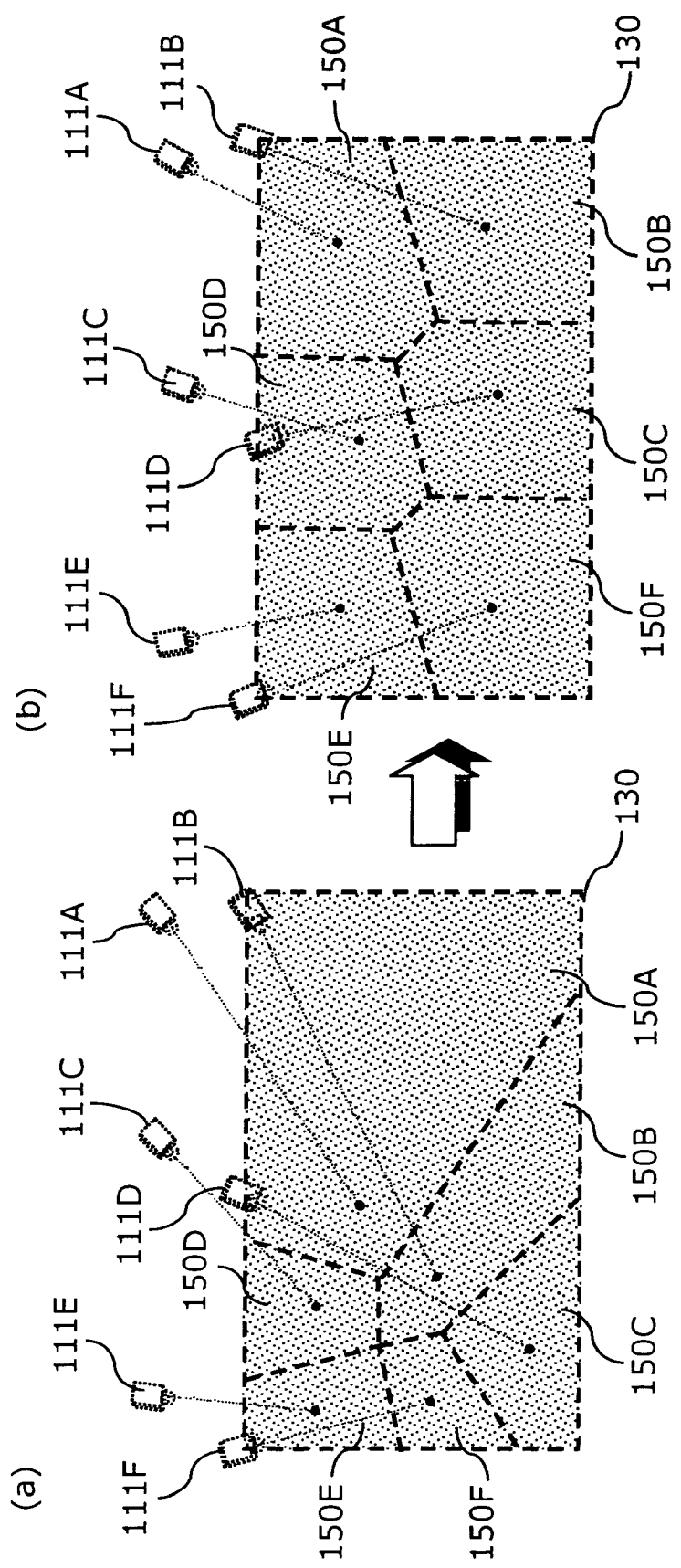
FIG. 23 is a diagram explaining operations of the monitoring system.

An example of a situation before and after adjusting the monitoring responsible regions 150A to F allocated to the six camera terminals 111A to F that are installed by orientating toward an optional direction within the monitoring subject region 130 according to the operational procedures from Step 101 and to Step 104 is shown in FIG. 23, and focusing on the camera terminal 111A, a specific operation of the camera terminal 111A in Step 107 is explained. In addition, FIG. 24 shows the distance and the positional relationship from the end of the line of sight by the camera terminal 111A (the first reference point; in other words, a portion displayed in the center of the imaged picture) to the boundary of the monitoring responsible region 150A.

Figure 24:
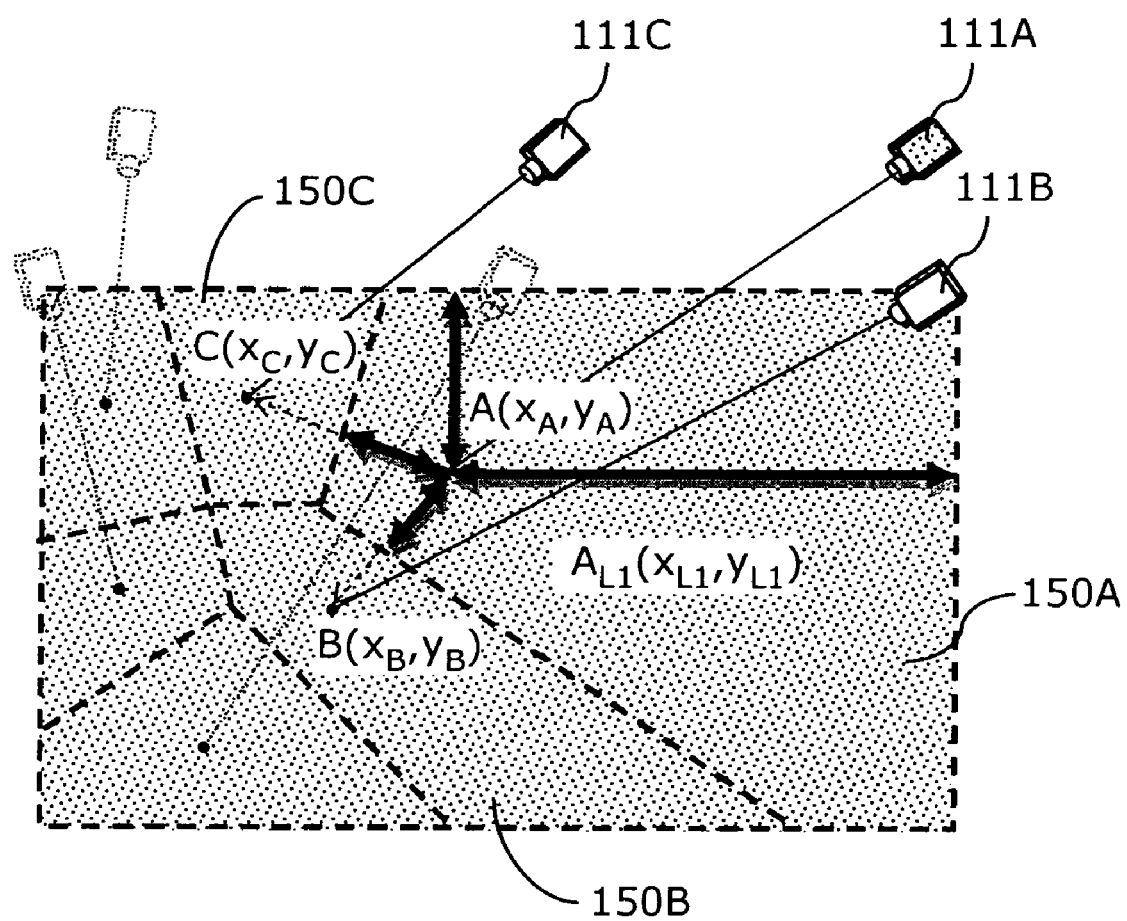
FIG. 24 is a diagram explaining an evaluation function F.

In FIG. 23 and FIG. 24, components which are the same as those in FIG. 19, are marked with the same symbols, and explanations are omitted. The monitoring responsible region comparison-evaluator 217 of the camera 104A may change the direction of the line of sight in order to approximately equalize the allocated ranges of the monitoring responsible regions 150 to F of the cameras 104A and to equalize the distance from the end of the line of sight of the camera terminal 111A shown in FIG. 24 to each boundary of the monitoring responsible region 105A.

The approximation of all of the distance from the end of the line of sight of each of the cameras 104A to F to each boundary of the monitoring responsible regions 150A to F to be a equal value also results in equalizing the distance from the end of the line of sight of cameras whose monitoring responsible regions are mutually proximate to the boundaries, so in all of the cameras 104A to F, there is the effect of equalizing the distance from the end of the line of sight to each boundary of the monitoring responsible regions 150A to F.

The monitoring responsible region comparison-evaluator 218 in each of the camera 104A to F obtains an evaluated value to the distance from the end of the line of sight to the boundary of the monitoring responsible region 150 or to the boundary of the monitoring subject region 130 using an evaluation function F where the orientation of the line of sight of the camera ($\theta_{Pan}$, $\theta_{Tilt}$) expressed by the following Formula 1 as a variable, and further controls the orientation of the line of sight of the camera toward the direction approximating the obtained evaluated value as a minimal value.

[Math 1]

$$F(\theta'_{Pan}, \theta'_{Tilt}) = \frac{1}{N} \sum_{j}^{N} (Dist_{ij} - Dist_{Ave})^2 \quad \text{(Formula 1)}$$

In the evaluation function F expressed by the Formula 1, 'N' indicates the number of boundaries of the monitoring responsible region 150, and '$DiSt_{Ave}$' indicates a mean value. In other words, the evaluation function F expressed by the Formula 1 indicates a dispersion value of the distance from the end of the camera line of sight to each boundary of the monitoring responsible region.

If an evaluated value is obtained using the case of the camera terminal 111A shown in FIG. 23(a) as an example, as shown in FIG. 24, each distance $Dist_{AL1}$, $Dist_{AL2}$, $Dist_{AB}$ and Dist$_{AC}$ to each boundary of the monitoring responsible region 150A may be respectively obtained from Formulas 2, 3, 4 and 5.

[Math 2]
$$Dist_{AB} = \frac{1}{2}\sqrt{(x_B - x_A)^2 + (y_B - y_A)^2} \quad \text{(Formula 2)}$$

[Math 3]
$$Dist_{AC} = \frac{1}{2}\sqrt{(x_C - x_A)^2 + (y_C - y_A)^2} \quad \text{(Formula 3)}$$

[Math 4]
$$Dist_{AL1} = \sqrt{(x_{L1} - x_A)^2 + (y_{L1} - y_A)^2} \quad \text{(Formula 4)}$$

[Math 5]
$$Dist_{AL2} = \sqrt{(x_{L2} - x_A)^2 + (y_{L2} - y_A)^2} \quad \text{(Formula 5)}$$

In addition, the Dist$_{Ave}$ may be obtained from the following Formula 6:

[Math 6]
$$Dist_{Ave} = \frac{1}{N}\sum_{i}^{N} Dist_i \quad \text{(Formula 6)}$$

Next, in order to orientate the line of sight by the camera toward the direction where the evaluated value provided by the evaluation function F becomes smaller, values of a pan angle θ$_{Pan}$ and a tilt angle θ$_{Tilt}$ of the camera are changed using the steepest descent method. Specifically, the posture controller 205 changes the angles of rotation (pan angle θ$_P$, tilt angle θ$_T$) of the camera 104A by an updated formula of the following Formula 7 using a function where the evaluation function F expressed by the Formula 1 is partially differentiated:

[Math 7]
$$\begin{cases} \dfrac{\partial \theta_{Pan}}{\partial t} = -\sum_{i}^{N} \alpha_i \dfrac{F(\theta_{Pan}^i, \theta_{Tilt}^i)}{\partial \theta_{Pan}^i} \\ \dfrac{\partial \theta_{Tilt}}{\partial t} = -\sum_{i}^{N} \beta_i \dfrac{F(\theta_{Pan}^i, \theta_{Tilt}^i)}{\partial \theta_{Tilt}^i} \end{cases} \quad \text{(Formula 7)}$$

(Provided that a$_i$ and β$_i$ are Coefficients)

Furthermore, the evaluation function F may be a function other than the Formula 7, and as long as it is a gradient function having a minimum value if the distance from the end of the line of sight of the camera 104A (a portion displayed in the center of the imaged picture) to the boundary of the monitoring responsible region are all equal within the range where the line of sight by the camera 104A (θ$_{Pan}$, θ$_{Tilt}$) is changeable, it is acceptable.

Finally, the cooperative monitoring member selector 211 determines the necessity of changing a cooperative monitoring member. If a change is required, there is a return to Step 101, and if not, to Step 102a. Here, as an example where the change of the cooperative monitoring member is required, a case when the adjustment of direction of the line of sight by the camera 104A results in the great change of the position of the imaging region, a case when communication with a portion of the monitoring members is disconnected due to a failure, and a case when re-selection of a cooperative monitoring member is requested from a new camera terminal newly added to the monitoring system may be mentioned.

In addition, in the repetitive processes Step 101 to Step 107, the adjustment of the line of sight (pan angle θ$_P$, tilt angle θ$_T$) by the camera terminals 111A to F in accordance to the Formula 7 results in changing the monitoring responsible regions 150A to F shown in FIG. 23(a) to the situation shown in FIG. 23(b).

As described, with the construction and the procedures of the present embodiment, in the multiple camera terminals, adjustment of the positions and the ranges of the monitoring responsible regions by changing the line of sight to be closer to the equal allocation ranges of the monitoring responsible regions, and in addition, the change of the imaging ranges within the imaging regions to display the entire monitoring responsible region result in the automatic change of the positions of the imaging regions and the imaging ranges for thoroughly imaging the entire monitoring subject region within the monitoring system.

Figure 25:
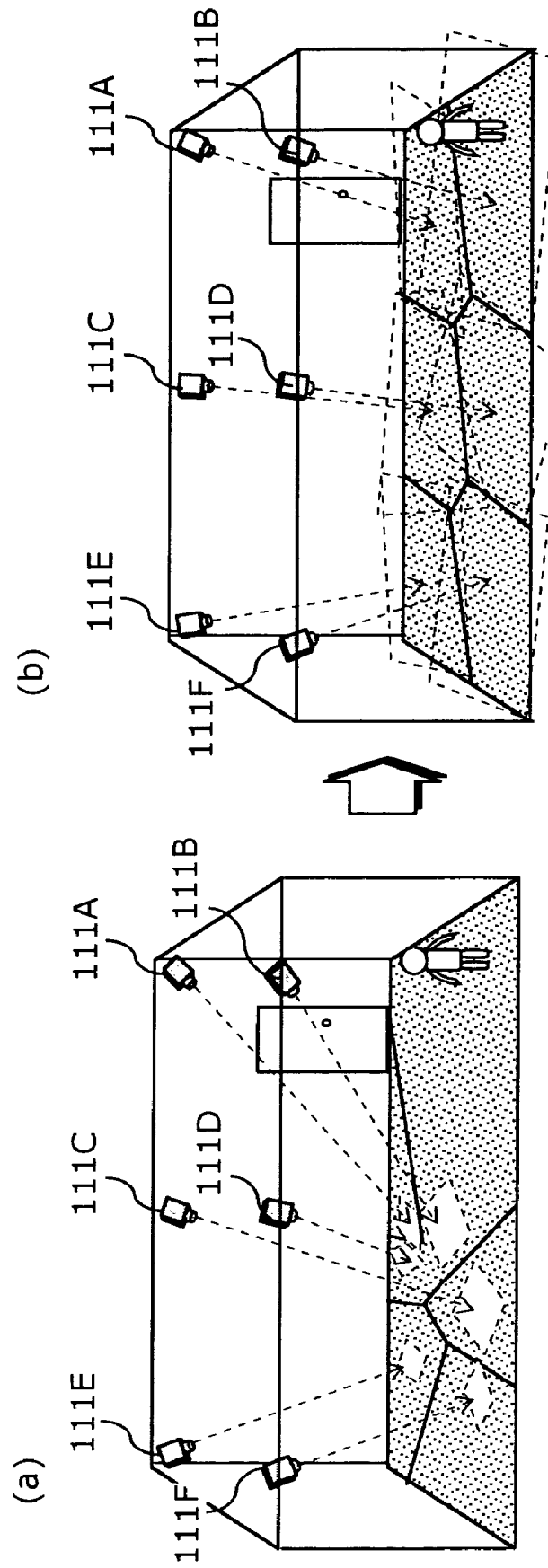
FIG. 25 is a diagram showing an operational example of the monitoring system.

FIG. 25 shows an operational example of the monitoring system of the Second Embodiment. In the diagram, components which are the same as those in FIG. 19, are marked with the same symbols, and explanations are omitted.

FIG. 25(a) shows a state in which the six camera terminals 111A to F are installed at appropriate positions within the room in order to image the interior of the room in relation to the floor surface as the monitoring subject region 130. In addition, the six camera terminals 111A to F are sufficient in number for thoroughly imaging the monitoring subject region 130, and as shown in FIG. 12(b), if the image angle of the camera is maximum, if the size of one-ninth of the area of the imaging region imaged in a state where the image plane of the imager 202 becomes parallel to the monitoring subject region 130 is a referenced imaging area, the total sum of the reference imaging areas by the six camera terminals 111A to F should be greater than the area of the monitoring subject region 130. In addition, the installation directions of the camera terminals 111A to F are respectively adjusted to those able to image the monitoring subject region 130 by means of pan tilt control.

In the camera terminals 111A to F, in addition to the similar operation of the camera terminals in the First Embodiment, the monitoring responsible region comparison-evaluator 217 determines the direction of the line of sight so as to equalize the distance from the end of the line of sight by the camera to each boundary of the monitoring subject region, and the camera controller 216 and the posture controller 205 adjust the positions of the imaging regions and the imaging ranges of the cameras, following which, as shown in FIG. 25(b), the positions and ranges of the imaging regions may be changed.

As described in the Second Embodiment, since merely installing the camera terminals, the number of which is sufficient for monitoring, at appropriate positions and in appropriate directions for imaging in the monitoring subject region enables determination of the position of the imaging region and the imaging range for thoroughly imaging the entire region in accordance with the configuration of the monitoring subject region without pre-adjusting the position of the imaging region and the imaging range for each camera terminal, and the burden of adjusting the positions of the imaging regions and the imaging ranges may be reduced during the installation process of multiple camera terminals.

In addition, in the monitoring system of the Second Embodiment, similar to the First Embodiment, even if the imaging region of any camera terminal among the multiple camera terminals is impaired due to a failure or a maintenance inspection, or if the imaging region is moved due to control, such as pan tilt control, the remaining camera terminals re-determine the monitoring responsible regions and change the range of each imaging region, maintaining and continuing the entire imaging of the monitoring subject region.

Third Embodiment

The monitoring system in the Third Embodiment of the present invention is explained next.

In the First Embodiment and the Second Embodiment of the present invention, the multiple camera terminals determine the monitoring responsible regions of each camera terminal according to the positional relationship of the mutual imaging region and, adjust the angle of view by means of zoom control so as to include the monitoring responsible regions in their own imaging regions, respectively, and the entire monitoring subject region is automatically imaged.

In the Third Embodiment, the change of the positional relationship of the imaging region for each camera terminal adjusts the configuration of the monitoring responsible region for each camera terminal to be closer to that of the imaging region, enhancing the efficacy to include the monitoring responsible region in the imaging region, as a result of which, a monitoring system with fewer unnecessary imaging of regions, such as the monitoring responsible region for the other camera terminal or a region other than the monitoring subject region, is realized.

First, it is described that the adjustment of the configuration of the imaging region to be closer to that of the monitoring responsible region efficiency enhances imaging.

In the First Embodiment and the Second Embodiment, in each camera terminal, the adjustment of the size of each imaging region (or size and position) to cover its own entire monitoring responsible region enables monitoring of the entire monitoring subject region 130. Consequently, if the configuration of the monitoring responsible region is different from that of the imaging region, and if the imaging region is adjusted to cover the monitoring responsible region, the imaging region may include a region other than the monitoring responsible region. A region other than the monitoring responsible region is the responsibility of another camera terminal or a region other than the monitoring subject region.

Specifically, as in the example of the monitoring responsible region 150A and the imaging region 140A by the camera terminal 110A shown in FIG. 26(a), imaging a region other than the monitoring responsible region 150A means redundantly imaging the imaging region by another camera terminal, or imaging an unnecessary region other than the monitoring subject region 130, so imaging efficiency is not ideal.

As shown in an example of FIG. 26(b), if the configuration of the monitoring responsible region 150A is close to that of imaging region 140A, since the ratio of a region other than the monitoring responsible region 150A in the imaging region 140A becomes smaller, the redundantly imaged or the unnecessarily imaged region may be smaller, improving imaging efficiency.

In the present embodiment, each camera terminal composing the monitoring system controls adjustment of the configuration of the imaging region closer to that of the monitoring responsible region, in a method explained hereafter.

The configuration of the monitoring responsible region, as described in the First Embodiment, is determined by the line of sight of the camera terminal. Consequently, changing the line of sight by the camera terminal enables changing the configuration of the monitoring responsible region to be closer to that of the imaging region. Consequently, first, a differentiable gradient evaluation function G to evaluate the difference between the configuration of the imaging region and that of the monitoring responsible region is provided using a parameter to determine the line of sight of the camera terminal as an independent variable. If the configuration of the imaging region coincides with that of the monitoring responsible region, an evaluated value provided from the evaluation function G is considered as a target value. In addition, the adjustment of parameters for determining the line of sight by the camera terminal in order to approximate the evaluated value of the evaluation function G to the target value results in changing the line of sight by the camera terminal, changing the configuration of the monitoring responsible region.

Furthermore, as a method for adjusting the direction of the line of sight by the camera terminal to approximate the evaluated value of the evaluation function G to the target value, the evaluation function G is designed as a function having a minimum value (minimal value) if the configuration of the imaging region coincides with that of the monitoring responsible region. In addition, updating the parameter to determine the line of sight by the camera terminal to approximate the evaluated value to the minimum value (minimal value) relative to the function, using the steepest descent method adjusts the line of sight by the camera terminal.

As explained above, establishing the evaluation function G to evaluate the difference between the configuration of the imaging region and that of the monitoring responsible region and additionally using the steepest descent method enables changing the line of sight in the monitoring responsible region for adjusting the configuration of the imaging region closer to that of the monitoring responsible region.

Next, the design of the evaluation function G to evaluate the difference of the configuration of the imaging region and that of the monitoring responsible region is explained. The evaluation function G is a function where, in order to evaluate the difference between the configuration of the imaging region and that of the monitoring responsible region, a point where the end of the line of sight by the camera terminal intersects the monitoring subject region is a reference point, and the ratio of the distance from the reference point to the boundary of the imaging region to the distance from the reference point to the boundary of the monitoring responsible region is obtained relative to multiple directions passing through the reference point, thereby obtaining dispersion. Consequently, in the evaluation function G, if the configuration of the imaging region coincides with that of the monitoring responsible region, the ratio of the distance from the reference point to the boundary of each imaging region to the distance from the reference point to the boundary of the monitoring responsible region becomes equal in all directions, making the dispersion zero, and as a result becoming a function to provide a minimum value (minimal value). In addition, the evaluation function G is a differentiable function using the pan angle $\theta_{Pan}$ and the tilt angle $\theta_{Tilt}$, which are parameters for determining the line of the sight by the camera, as independent variables.

Here, a specific example of the evaluation function G is described using the example with the monitoring responsible region 150A and the imaging region 140A for the camera terminal 114A shown in FIG. 27(a), FIG. 27(b), FIG. 28(a) and FIG. 28(b).

Figure 27:
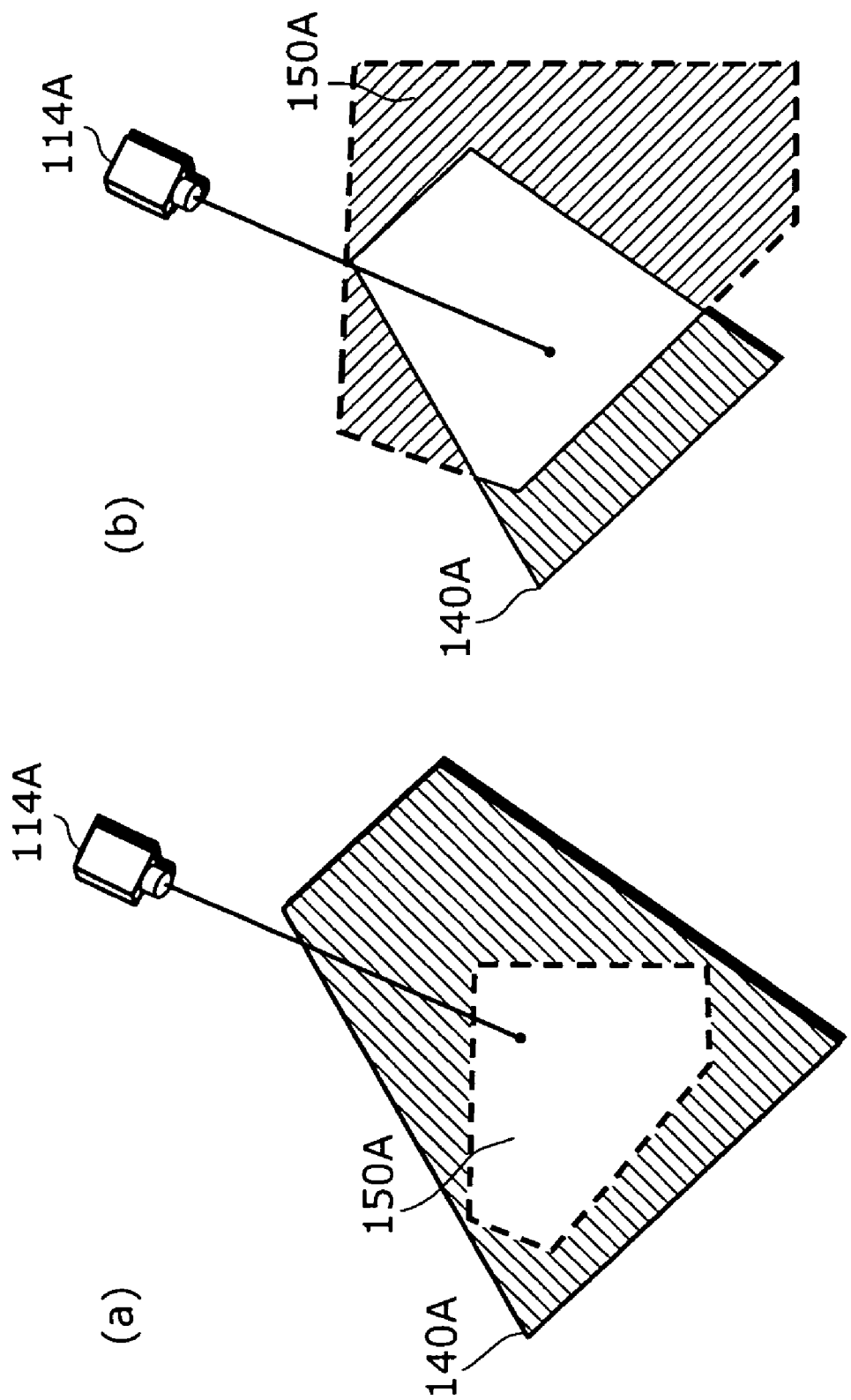
FIG. 27 are diagrams explaining a relationship between the imaging region and the monitoring responsible region according to the Third Embodiment of the present invention.

FIG. 27(a) is a diagram showing an example of a case of including the monitoring responsible region 150A in the imaging region 140A. In addition, FIG. 27(b) is a diagram showing an example of a case in the middle of including the monitoring responsible region 150A in the imaging region 140A or a case where the monitoring responsible region 150A cannot be included even though the angle of the view by the camera 106 is expanded to the maximum.

In either FIG. 27(a) and FIG. 27(b), in order to compare the difference between the configuration of the imaging region 140A and that of the monitoring responsible region 150A, as shown in FIG. 28(a) and FIG. 28(b), the point where the line of sight by the camera terminal 114A intersects the monitoring subject region 130 is a reference point O; the intersection point from the point O to the perpendicular line extending to each boundary of the monitoring responsible region 150A is a point $P_i$; and a point where the half line extended from the point O toward the point $P_i$ intersects the boundary of the imaging region 140A is a point $Q_i$; and the evaluation function G is designed as the following Formula 8 to obtain the dispersion of ratio of the line of segment $OP_i$ and the line of segment $OQ_i$.

[Math 8]

$$G(\theta_{Pan}, \theta_{Tilt}) = \frac{1}{N}\sum_{i}^{N}(R_i - R_{ave})^2 \quad \text{(Formula 8)}$$

In Formula 8, 'N' indicates the number of the monitoring responsible regions for other camera terminals adjacent to the monitoring responsible region 150A or the total number of boundaries of the monitoring subject region 130. In addition, $R_i$ and $R_{ave}$ are values defined by the following Formula 9 and the Formula 10, respectively:

[Math 9]

$$Ri = \frac{|OQ_i|}{|OP_i|} \quad \text{(Formula 9)}$$

[Math 10]

$$R_{ave} = \frac{1}{N}\sum_{i}^{N} Ri \quad \text{(Formula 10)}$$

In Formula 9, $|OQ_i|$ is the distance from the point O to the point $Q_i$. In addition, $|OP_i|$ is the distance from the point O to the point $P_i$.

As explained above, if the function expressed by the Formula 8 is defined, if the configuration of the imaging region 140A coincides with that of the monitoring responsible region 150A, since all of the ratios $R_i$ of [the distance] from the reference point to each $Q_i$ from that to each $R_i$ become equal, the evaluated value becomes zero (minimum value). In the meantime, if the configuration of the imaging region 140A is different from that of the monitoring responsible region 150A, since the ratios $R_i$ of [the distance] from the reference point to each $Q_i$ and from there to each $R_i$ vary, the evaluation function G whose evaluated value becomes greater, may be obtained.

An explanation is provided next of the adjustment of the pan angle $\theta_{Pan}$ and the tilt angle $\theta_{Tilt}$, which are parameters for determining the line of sight, in order to reduce the evaluated value provided by the evaluation function G expressed by the Formula 8. The evaluation function G is a function where the pan angle $\theta_{Pan}$ and the tilt angle $\theta_{Tilt}$ are considered as individual variables, and is a differentiable function having a minimum value if the configuration of the imaging region 140A coincides with that of the monitoring responsible region 150A, making it possible to adjust the values of the pan angle $\theta_{Pan}$ and the tilt angle $\theta_{Tilt}$ of the camera terminal in order to approximate the evaluated value to the minimum evaluated value in the evaluation function G by using the steepest descent method. Consequently, the following Formula 11 including the item where the Formula 8 is partially differentiated with the pan angle $\theta_{Pan}$ and the tilt angle $\theta_{Tilt}$ is obtained, respectively:

[Math 11]

$$\begin{cases} \dfrac{\partial \theta_{Pan}}{\partial t} = -\gamma_i \dfrac{G(\theta_{Pan}, \theta_{Tilt})}{\partial \theta_{Pan}} \\ \dfrac{\partial \theta_{Tilt}}{\partial t} = -\delta_i \dfrac{G(\theta_{Pan}, \theta_{Tilt})}{\partial \theta_{Tilt}} \end{cases} \quad \text{(Formula 11)}$$

In the Formula 11, $\gamma_i$ and $\delta_i$ are coefficients. The Formula 11 is a differential equation to update the pan angle $\theta_{Pan}$ and the tilt angle $\theta_{Tilt}$ of the camera terminal in order to reduce the evaluated value by the evaluation function G. Updating the pan angle $\theta_{Pan}$ and the tilt angle $\theta_{Tilt}$ in accordance with the Formula 11 adjusts the configuration of the imaging region 140A by the camera terminal closer to that of the monitoring responsible region 150A, resulting in the reduction of the ratio of regions other than the monitoring responsible region 150A in the imaging region 140A. As a result, the imaging of lesser monitoring responsible regions of the other camera terminals and unnecessary regions other than the monitoring subject region 130 may be automatically performed.

In the explanation, in order to evaluate the difference between the configuration of the imaging region 140A and that of the monitoring responsible region 150A, the evaluation function G using the point $P_i$ where the perpendicular line extending to each boundary of the monitoring responsible region 150A from the point O intersects each boundary; and the point $Q_i$ where the half line extending toward the point $P_i$ from the point O intersects the boundary of the imaging region 140A was designed. However, other than this function, another evaluation function G where the point $P_i$ and the point $Q_i$ are arranged in positions that may evaluate the difference of the configuration of the imaging region 140A and that of the monitoring responsible region 150A, for example, the point where the perpendicular line extending to each boundary of the imaging region 140A from the point O intersects each boundary is point $O_i$, and the point where the half line extending toward the point $Q_i$ from the point O intersects the boundary of the monitoring responsible region 150A is the point $P_i$.

In addition, the evaluation function G may be a Formula other than the Formula 8, if it is a gradient function where the configuration of the imaging region 140A coincides with that of the monitoring responsible region 150A within the range where the line of sight by the camera terminal ($\theta_{Pan}$, $\theta_{Tilt}$) is changeable, or where a minimum value may be obtained when the configurations are the closest.

In addition, in the explanation, in order to evaluate the difference between the configuration of the imaging region 140A and that of the monitoring responsible region 150A, the dispersion of the ratio $R_i$ of the distance from the point O to the point $P_i$ to the distance from the point O to the point $Q_i$ is considered as an evaluation index. However, another evaluation function G where the ratio of area of overlapped regions in the imaging region 140A and the monitoring responsible region 150A is considered as an evaluation index in a logical sum region of the imaging region 140A and the monitoring responsible region 150A may be used.

Next, the construction of the monitoring system in the Third Embodiment of the present invention composed of camera terminals equipped with a function for adjusting the configuration of the monitoring responsible region closer to that of the imaging region is described.

Figure 29:
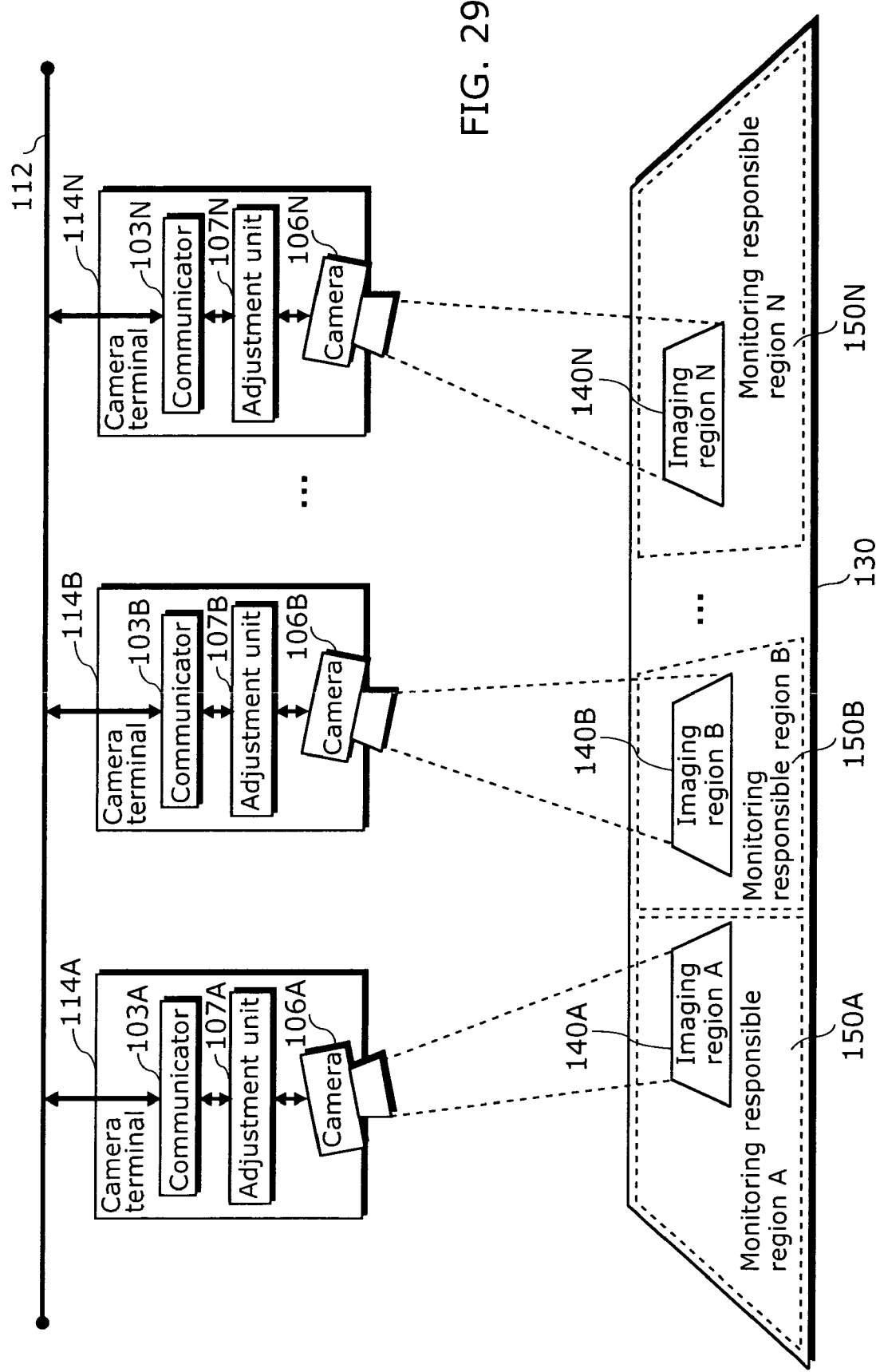
FIG. 29 is block diagram showing a construction of the monitoring system according to a Third Embodiment relating to the present invention.

FIG. 29 is a block diagram showing the construction of the monitoring system in a Third Embodiment of the present invention. The monitoring system in the Third Embodiment is a system to image the monitoring subject region by cooperatively operating the multiple camera terminals, and is composed of the communication network 112 and the multiple camera terminals 114A to N, the number of which is sufficient for imaging the entire monitoring subject region 130, having the same performance, and that may adjust the angle of view and the line of sight by zoom control and pan tilt control.

Camera terminals 114A to N are devices to determine an imaging region including a monitoring responsible region for its own camera terminal by communicating with the other camera terminals, and to image the determined imaging region, and are respectively equipped with cameras 106A to N, adjustment units 107A to N and communicators 103A to N.

In the construction of the Third Embodiment of the present invention, a point where the cameras 101A to N where the directions of the line of sight is fixed are modified to the cameras 106A to N where the angle of view and the direction of the line of sight are adjustable, such as a pan-tilt-zoom camera; and another point where the adjustment units 102A to N to determine the monitoring responsible regions 150A to N and for adjusting the imaging region 140A to N to cover the monitoring responsible regions for the cameras 101A to N are modified for adjustors 107A to N for adjusting the directions of the line of sight by the cameras 106A to N in order to reduce the ratio of any region other than the monitoring responsible regions 150A to N within the imaging region 140A to N are different.

In other words, cameras 106A to N are cameras having the function of controlling not only the angle of view but also the direction of the line of sight (pan tilt control and zoom control). Adjustors 107A to N have the function of adjusting the direction of the line of sight by the camera in order to have closer configurations of the imaging region and the monitoring responsible region. Specifically, in the evaluation function to evaluate the difference between the configuration of the imaging region and that of the monitoring responsible region, adjustment units 107A to N determine the line of sight by the cameras in order to approximate the evaluated value of the evaluation function to a target value when an evaluated value at the time of coincidence of the configuration of the imaging region with that of the monitoring responsible region is a target value. Here, for example, when a point where the line of sight by the camera intersects the monitoring subject region is a reference point, the evaluation function shows the dispersion of the ratio of the distance from the reference point to the boundary of the monitoring responsible region to the distance from the reference point to the boundary of the imaging region relative to multiple directions where the reference point passes through, and the target value is zero.

In FIG. 29, components which are the same as those in the monitoring system in the First Embodiment shown in FIG. 8, are marked with the same symbols and explanations thereof are omitted.

Figure 30:
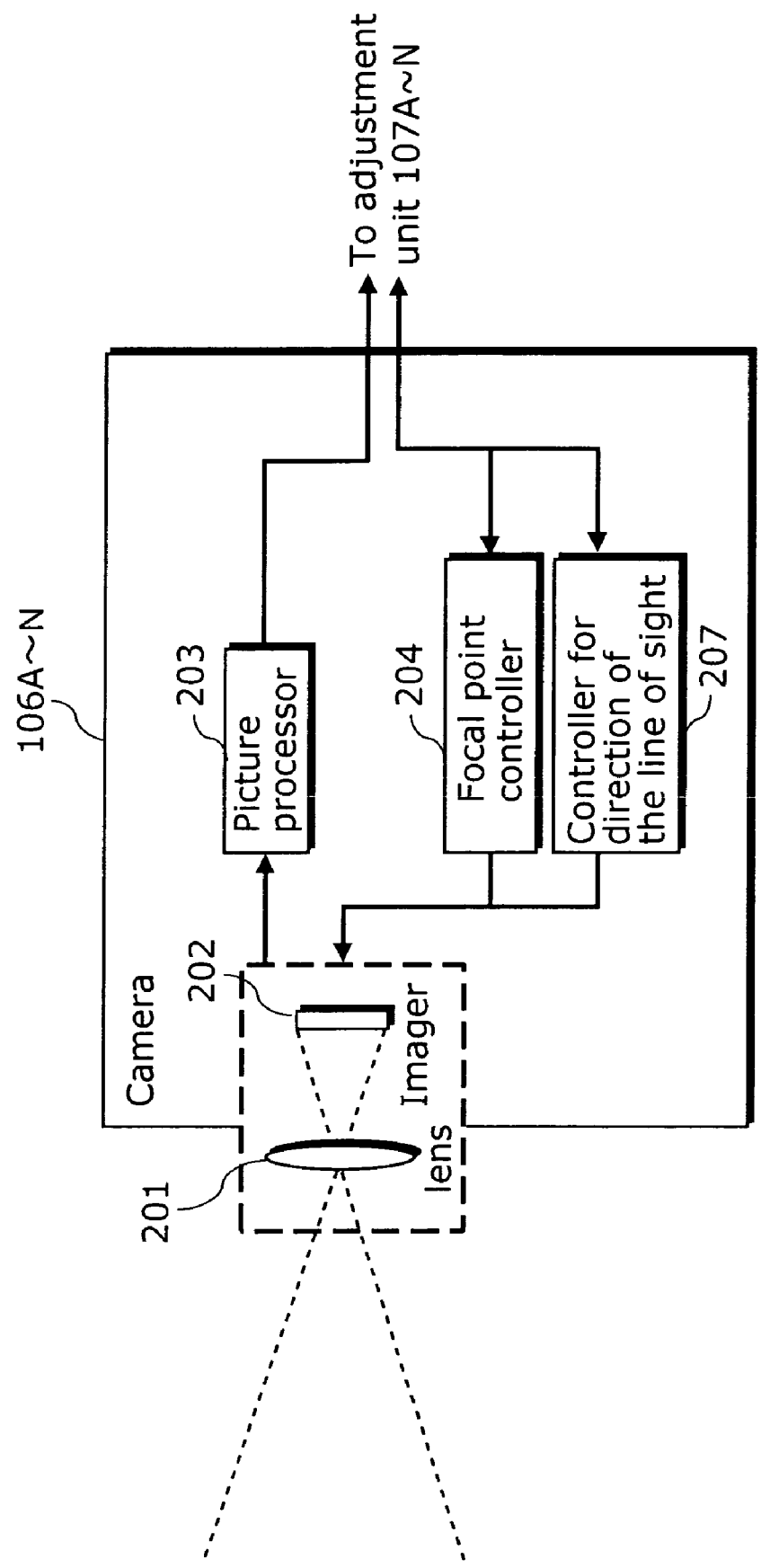
FIG. 30 is a block diagram showing a camera construction.

Next, the construction of cameras 106A to N, modified from the First Embodiment, is explained. FIG. 30 is a block diagram showing the construction of each of the cameras 106A to N in the Third Embodiment. Each of the cameras 106A to N is a pan tilt-controllable and zoom controllable CCD camera, provided with a lens 201, an imager 202, a picture processor 203, a focal point controller 204 and a controller for direction of the line of sight 207. In the construction of each of the cameras 106A to N in the present Third Embodiment, the point where the controller for direction of line of sight 207 for adjusting the line of sight by the camera is added is different compared to the construction of the cameras 101A to N in the present First Embodiment. In FIG. 30, components which are the same as those in camera 101 in the present First Embodiment shown in FIG. 9, are marked with the same symbols, and explanations thereof are omitted.

The controller for direction of line of sight 207 is a mechanism, such as a stepping motor, for adjusting the directions of the lens 201 and the imager 202 in order to pan tilt-control the direction of the line of sight by the camera.

In the First Embodiment, the focal point controller 204 is a mechanism for adjusting the range of the imaging region by controlling the focal length, which is a space between the lens 201 and the imager 202, by a stepping controller. However, it is acceptable as long as the focal point controller 204 is a generally known mechanism that may adjust the range of the imaging regions of the cameras, such as a mechanism having multiple lenses 201 for adjusting the range of the imaging region by controlling the space between each lens 201 by a stepping motor.

Figure 31:
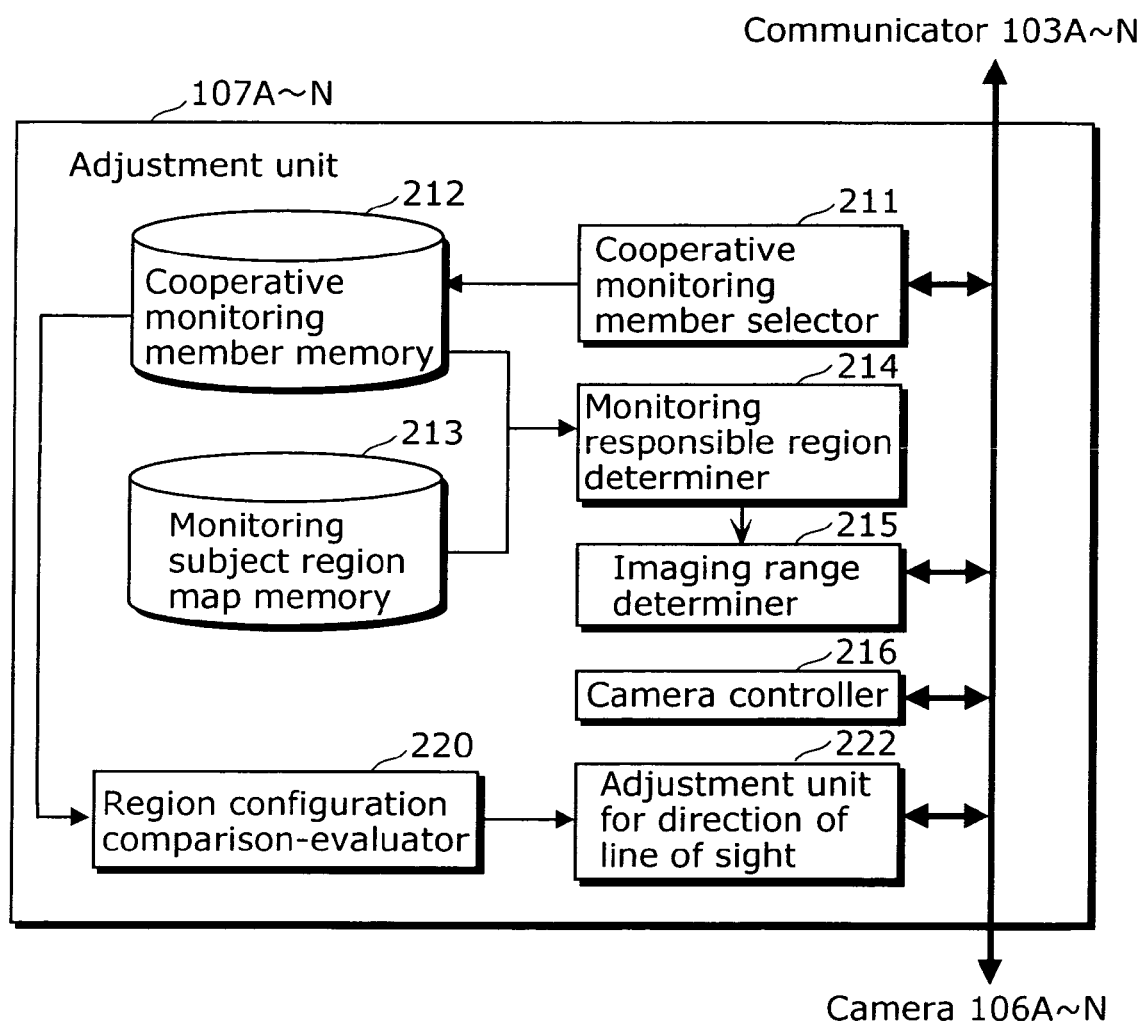
FIG. 31 is a block diagram showing an adjustment unit construction.

Next, a construction of the adjustment units 107A to N, which are modified from the First Embodiment, is explained. FIG. 31 is a block diagram showing the construction of each of the adjustment units 107A to N in the present Third Embodiment. Each of the adjustment units 107A to N is provided with a cooperative monitoring member selector 211, cooperative monitoring member memory 212, monitoring subject region map memory 213, monitoring responsible region determiner 214, imaging range determiner 215, camera controller 216, region configuration comparison-evaluator 220 and an adjustment unit for direction of line of sight 222. In the construction of each of the adjustment units 107A to N in the present Third Embodiment, the point where the region configuration comparison-evaluator 220 and the adjustment unit for direction of line of sight 222 are added is different from the construction of the adjustment units 102A to N in the present First Embodiment shown FIG. 10. In the FIG. 31, for components which are the same as those in the adjustment units 102A to N in the First Embodiment shown in FIG. 10, the same symbols are used and the explanations thereof are omitted.

The region configuration comparison-evaluator 220 is a processor to calculate a value for evaluating a ratio occupied by a region other than the monitoring responsible region within the imaging region by using the evaluation function G expressed by the Formula 8, in order to evaluate the different configurations between the imaging region and the monitoring responsible region.

The adjustment unit for direction of line of sight 222 is a processor to determine control details for adjusting the direction of line of sight by the camera 104 (pan angle $\theta_{Pan}$, tilt angle $\theta_{Tilt}$) in accordance with the equation of the Formula 11, in order to reduce the evaluated value obtained by the evaluation function G in the region configuration comparison-evaluator 220.

According to the construction, in the monitoring system of the Third Embodiment, points where the line of sight by the cameras 106A to N are also adjustable compared to the monitoring system in the First Embodiment, and the controller for direction of line of sight 207 to accomplish control relating to the adjustment of the line of sight, the region configuration comparison-evaluator 220 and the adjustment unit for direction of line of sight 222 are different. Consequently, once the line of sight is determined by the added components; in other words, when the line of sight is fixed, and it is self-evident that the monitoring system in the present embodiment having the same components as those in the First Embodiment relative to the other components may thoroughly image the monitoring subject region 130 similar to the monitoring system of the First Embodiment.

Next, the operation of the monitoring system in the Third Embodiment of the present invention is explained. Furthermore, explanations for the operations of the same components in the monitoring system in the First Embodiment are omitted.

Figure 32:
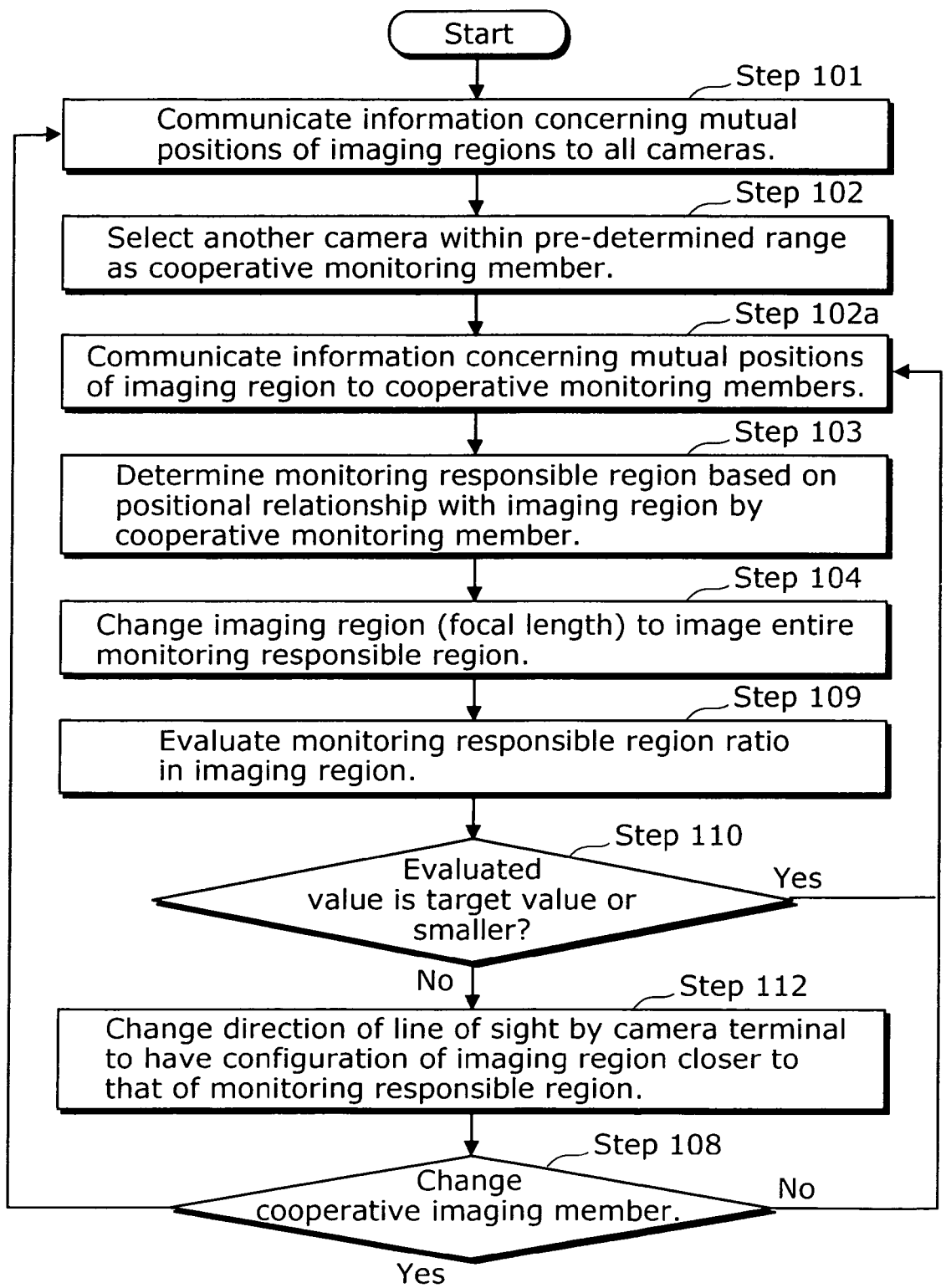
FIG. 32 is a flowchart showing operational procedures of the monitoring system according to the Third Embodiment of the present invention.

First, a series of operational procedures of the camera terminals 114A to N in the Third Embodiment are explained. FIG. 32 is a flowchart showing operational procedures of the camera terminals 114A to N. Here, the operational procedures of the camera terminal 114A are explained.

Since Step 101 and Step 102 are the same operational procedures as those in the flowchart in the First Embodiment shown in FIG. 13, the explanations are omitted.

The communicator 103A communicates information relating to the identification of the position of the monitoring region and the imaging range to the camera terminal 114B, selected as a cooperative monitoring member by the cooperative monitoring member selector 211 (Step 102a). Next, since Step 103 and Step 104 are the same operational procedures as those in the flowchart in the First Embodiment shown in FIG. 13, the explanations are omitted.

Next, the region configuration comparison-evaluator 220 evaluates a ratio of the monitoring responsible region 150A in any region other than the region within its own imaging region 140A (Step 109). Next, the adjustment unit for direction of line of sight 222 determines whether the evaluated value obtained as a result is a specified target value or smaller (Step 110).

When the evaluated value is the target value or smaller, similar processing is repeated (returning to Step 102a). In the meantime, if the evaluated value is not the target value or smaller, the line of sight by the camera 106 is changed in order to approximate the evaluated value to the specified target value (Step 112). Next, the cooperative monitoring member selector 211 determines the necessity of the change of the cooperative monitoring member (Step 108).

If a change is necessary, there is a return to Step 101, and if not, to Step 102a. Here, as an example when the change of the cooperative monitoring member is necessary, a case where the position of the imaging region has been greatly changed due to the adjustment of the direction of the line of sight by the camera; a case where the communication with a portion of the cooperative monitoring members is disconnected due to a failure; and a case where a new camera terminal newly added to the monitoring system requests for re-selection of the cooperative monitoring member may be mentioned.

As explained above, the adjustment of the direction of line of sight (pan angle $\theta_P$, tilt angle $\theta_T$) by each camera terminal in accordance with the procedures from Step 101 to Step 112 (especially Step 109 and Step 112) in the flowchart shown in FIG. 32 results in an operation to reduce the ratio of imaging regions other than the monitoring responsible region within the imaging region for each camera terminal.

In Step 101, Step 102 and Step 102a, if the cooperative monitoring member selector 211 has already selected a cooperative monitoring member(s), omission of Step 101 and Step 102 and the communication only with the cooperative monitoring member(s) enable preventing of an increase of unnecessary traffic within the communication network 112 or reducing the amount of data processing at each processor. This is realized with a flow to shift from Step 110 to Step 102a, or Step 108 to Step 102a.

In addition, if the communication capacity of the communication network 112 is sufficiently great compared to the number of camera terminals composing the monitoring system or if the performance of each processor within the camera terminal is sufficiently high, construction not containing the cooperative monitoring member selector 211 or operational procedures where the processing (Step 102) is omitted is acceptable.

Figure 26:
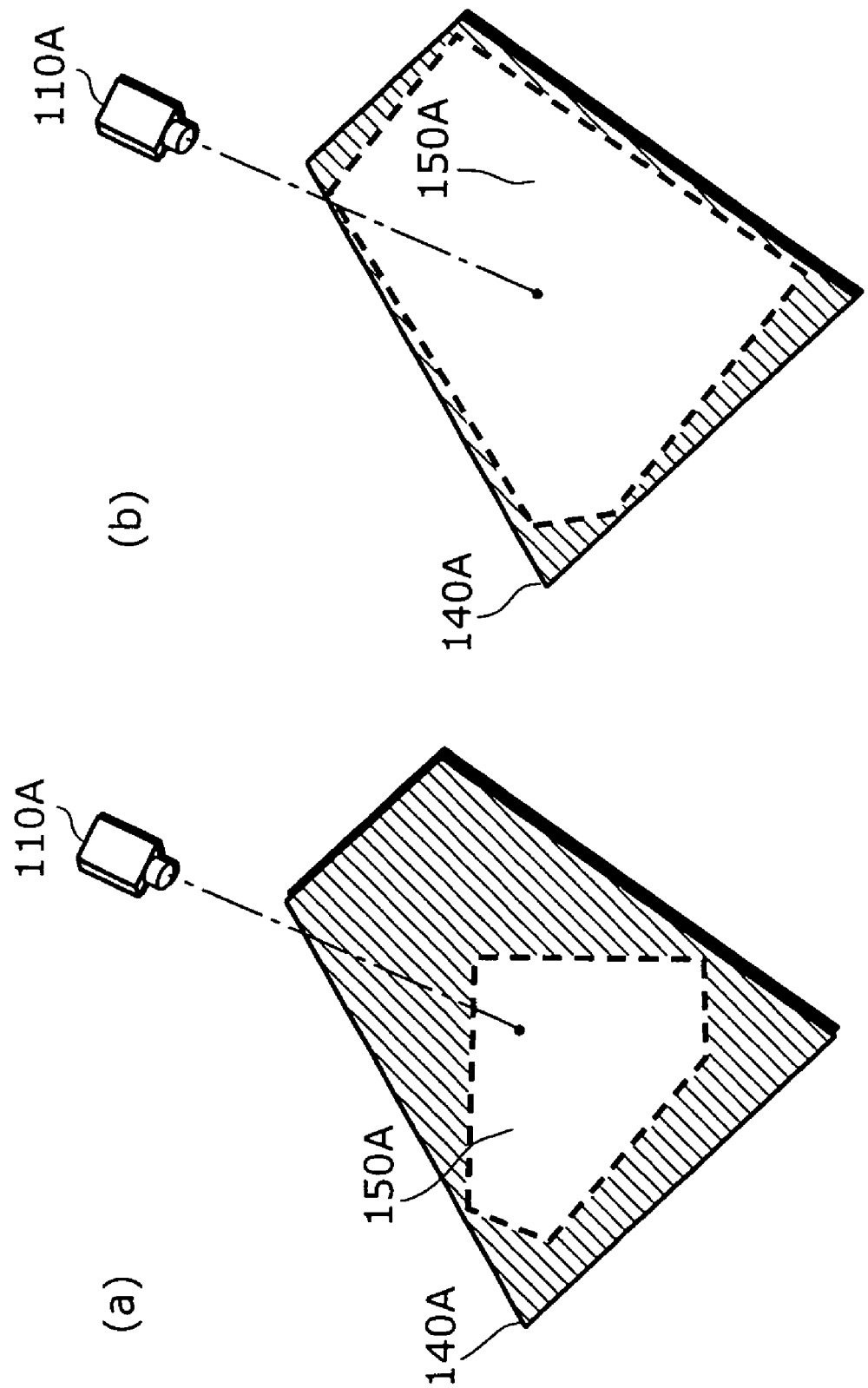
FIG. 26 are diagrams explaining a relationship between the imaging region and the monitoring responsible region in Third Embodiment of the present invention.
Figure 33:
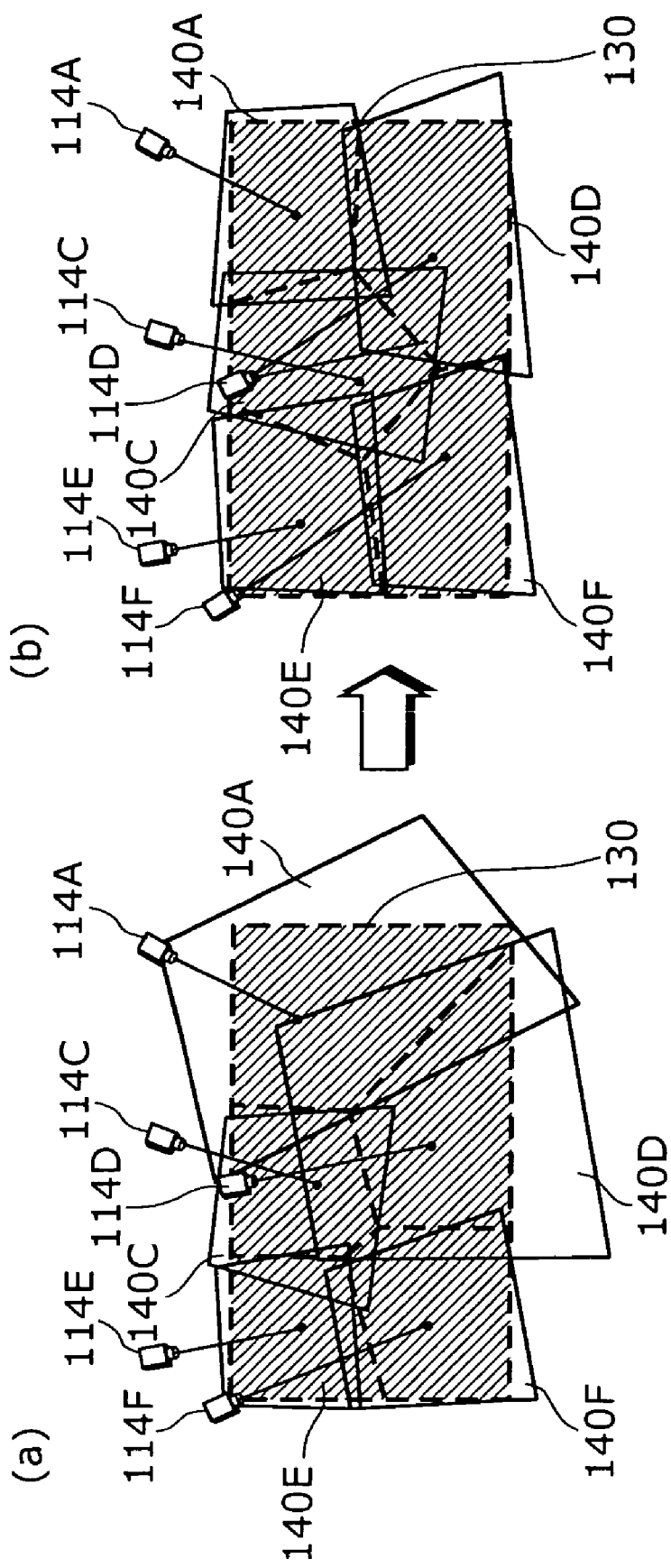
FIG. 33 is a diagram showing an operational example of the monitoring system.

Next, the operation of the entire monitoring system in the Third Embodiment is explained. FIG. 33(a) and FIG. 33(b) show the operational example of the entire monitoring system in the Third Embodiment. In FIG. 33, components which are the same as those in the monitoring system in FIG. 26, are marked with the same symbols.

FIG. 33(a) shows a state in which five camera terminals 114A, C, D, E and F are installed at appropriate positions within a room in order to image the interior of the room. In addition, the five camera terminals 114A to F are a sufficient number for thoroughly imaging the monitoring subject region 130, and as shown in FIG. 12(b), if the image angle of the camera is maximum, if the size, one-ninth of the area of the imaging region imaged in a state where the image plane of the imager 202 becomes parallel to the monitoring subject region 130 is a referenced imaging area, it is presumed that a total sum of the reference imaging areas by the five camera terminals 114A to F are greater than the area of the monitoring subject region 130. In addition, the installation directions of the camera terminals 114A to F are respectively adjusted to enable imaging within the monitoring subject region 130 by pan tilt control.

In the example shown in FIG. 33(a), for the imaging regions 140A and 140C by the camera terminals 114A and 114C, since the imaging ranges (angles of view) are expanded in order to include the monitoring responsible regions 150A and 150C, respectively, the monitoring responsible region for the other camera terminal 114 and regions other than the monitoring subject region 130 are also imaged, so imaging efficiency is poor.

However, in the monitoring system of the Third Embodiment, adjustment of the direction of the line of sight by the camera in order to have the configuration of the imaging region closer to [that of] the monitoring responsible region by the region configuration comparison-evaluator 220 and the adjustment unit for direction of line of sight 222, respectively, in addition to the similar operation to that in the monitoring system in the First Embodiment; in other words, as shown in the example showing in FIG. 33(b), the adjustment of the configurations of the monitoring responsible regions 150A and 150C within the imaging regions 140A and 140C by the camera terminals 114A and 114C by changing the direction of line of sight by each camera terminal reduces the ratio for imaging regions other than their own monitoring responsible regions, so imaging with excellent efficiency may be realized while imaging lesser unnecessary regions, such as monitoring responsible regions by the other camera terminals or regions other than the monitoring subject region 130.

As explained above, with the monitoring system in the Third Embodiment, for example, when a broad region, which cannot be imaged by one camera terminal, such as an indoor hall, a building, a street or a stadium, is thoroughly, continuously and simultaneously imaged by multiple camera terminals, even if the monitoring responsible region for each camera terminal is not accurately specified in order to image the entire monitoring subject region, only the installation of each camera terminal in a position and direction which enables imaging the monitoring responsible region enables the automatic adjustment of the direction of the line of sight and the angle of view by the multiple camera terminals for thoroughly imaging the entire monitoring subject region without deteriorating imaging efficiency due to imaging unnecessary regions, such as a monitoring responsible region for another camera terminal or regions other than the subject monitoring region. Consequently, in the installation of multiple camera terminals, the burden of adjusting each imaging region may be reduced.

Figure 34:
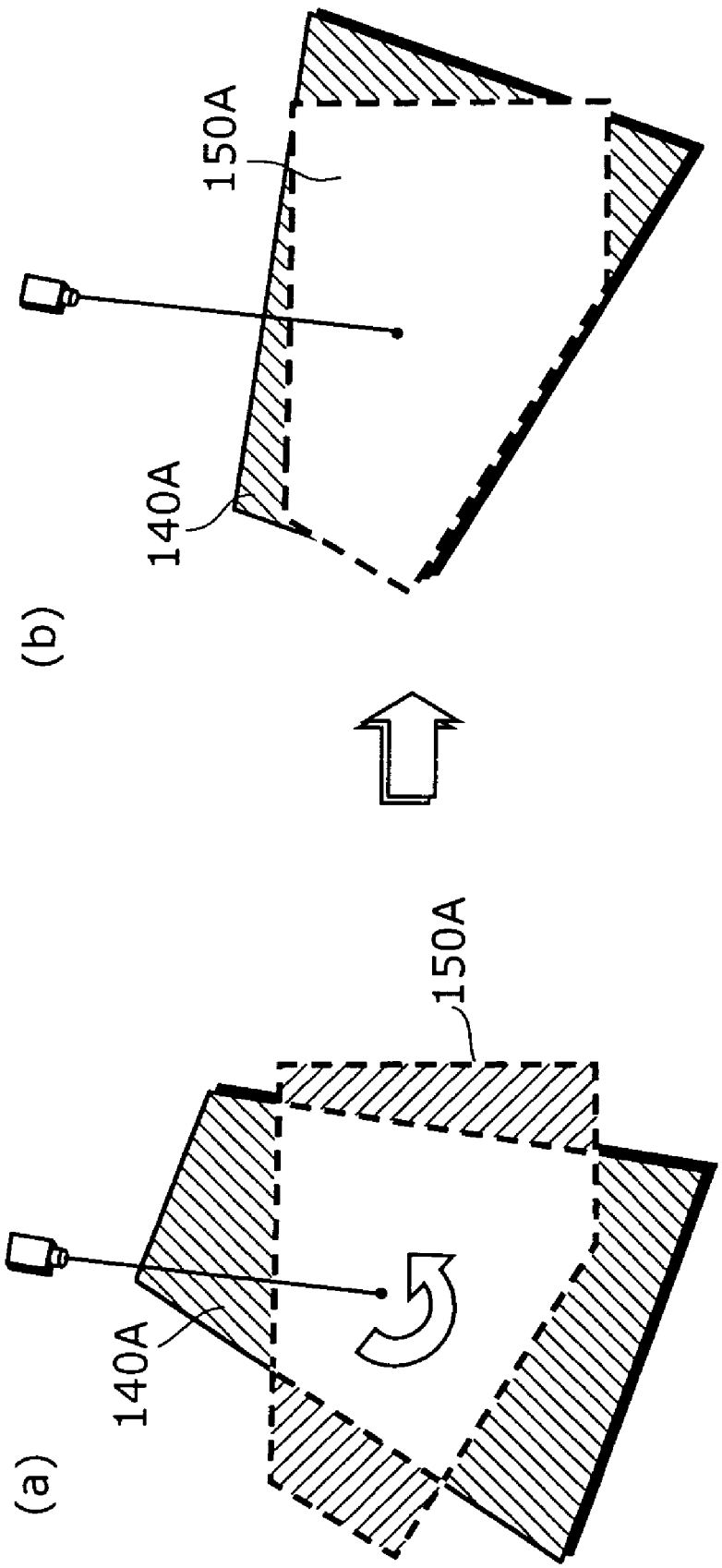
FIG. 34 is a diagram showing an operational example of the monitoring system.

In the Third Embodiment, in order to monitor the entire monitoring subject region with high efficiency while imaging lesser unnecessary regions, such as monitoring responsible regions for other camera terminals or regions other than the monitoring subject region as much as possible, pan, tilt and zoom adjustments are conducted. However, other than the pan, tilt and zoom adjustments, when camera terminals, which may adjust the roll (rotation of the camera terminal relative to an optical axis), are used, the rotation of the camera terminals using the optical axis as a center, for example, the adjustment of the imaging region 140 from the one shown in FIG. 34(*a*) to that shown in FIG. 34(*b*) enables the improvement of imaging efficiency.

For the roll control method, similar to the case of pan and tilt operations, using the steepest descent method to the evaluation function G expressed by the Formula 8 enables the realization of a method to bring the roll angle $\theta_{Roll}$ of the camera terminal to a state having excellent imaging efficiency. Specifically, the adjustment of the roll angle $\theta_{Roll}$ in accordance with the following Formula 12 containing a term where the evaluation function G expressed by the Formula 8 is partially differentiated by the roll angle $\theta_{Roll}$ enables realization of a state closer to that with lesser imaging of the monitoring responsible region for another camera terminal or unnecessary regions other than the monitoring subject region 130.

[Math 12]

$$\frac{\partial \theta_{Roll}}{\partial t} = -\varepsilon_i \frac{G(\theta_{Pan}, \theta_{Tilt}, \theta_{Roll},)}{\partial \theta_{Roll}} \quad \text{(Formula 12)}$$

In Formula 12, the evaluation function G is a function using the pan angle $\theta_{Pan}$, the tilt angle $\theta_{Tilt}$ and the roll angle $\theta_{Roll}$ as independent variables. In addition, $\varepsilon_i$ is a coefficient.

In addition, in the First Embodiment and the Third Embodiment, as shown in FIG. 15, a perpendicular bisector is drawn relative to the line of segment connecting the end of the line of sight by the another camera terminal imaging a neighboring region and the end of the line of sight by its own camera terminal, and the monitoring responsible region determiner 214 determines the monitoring responsible region 150 by the perpendicular bisector surrounding the end of its own line of sight or the boundary of the monitoring subject region 130.

Figure 35:
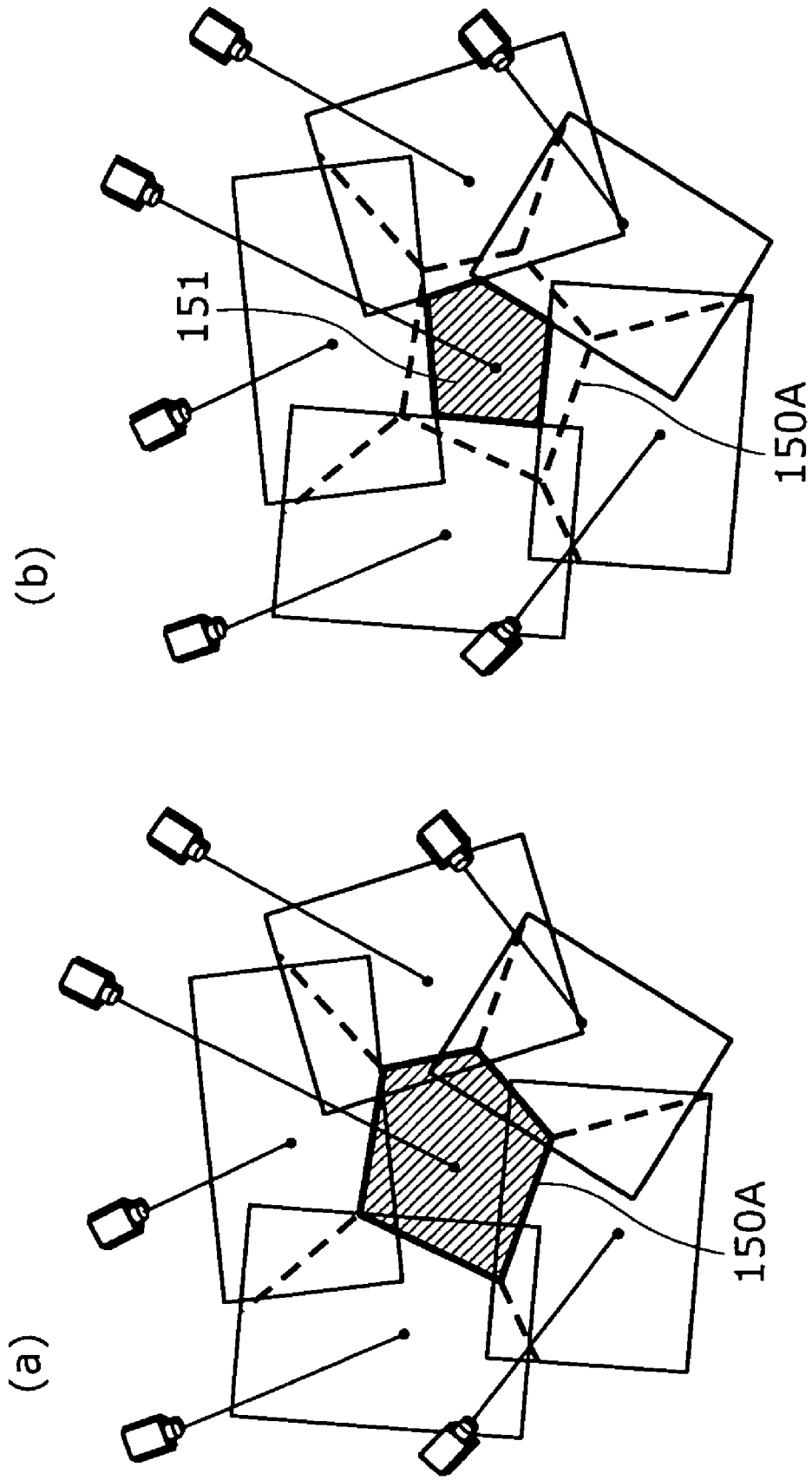
FIG. 35 are diagrams explaining a determination method for a monitoring responsible region.

In the meantime, for example, within the monitoring responsible region 150A indicated by the oblique lines shown in FIG. 35(*a*), when regions imaged by the other camera terminals exist, as in a region 151 indicated by the oblique lines shown in FIG. 35(*b*), a region which have already been imaged by the other camera terminal, and which has been eliminated may be considered as a monitoring responsible region. As described, when the region 151 where a region imaged by the other cameras has been eliminated from the monitoring responsible region 150 is determined as a monitoring responsible region, the effect is to prevent redundant imaging of unnecessary regions, because they have already been imaged by another cameras may be obtained while its own monitoring responsible region is thoroughly imaged by its own camera terminal and other camera terminals.

(Supplementary Explanation 1)

Next, as Supplementary Explanation 1 in the present embodiment, a calculation method for the imaging regions for the camera terminals 110A to N and the camera terminals 111A to N mentioned in the First and Second Embodiments is explained.

Figure 36:
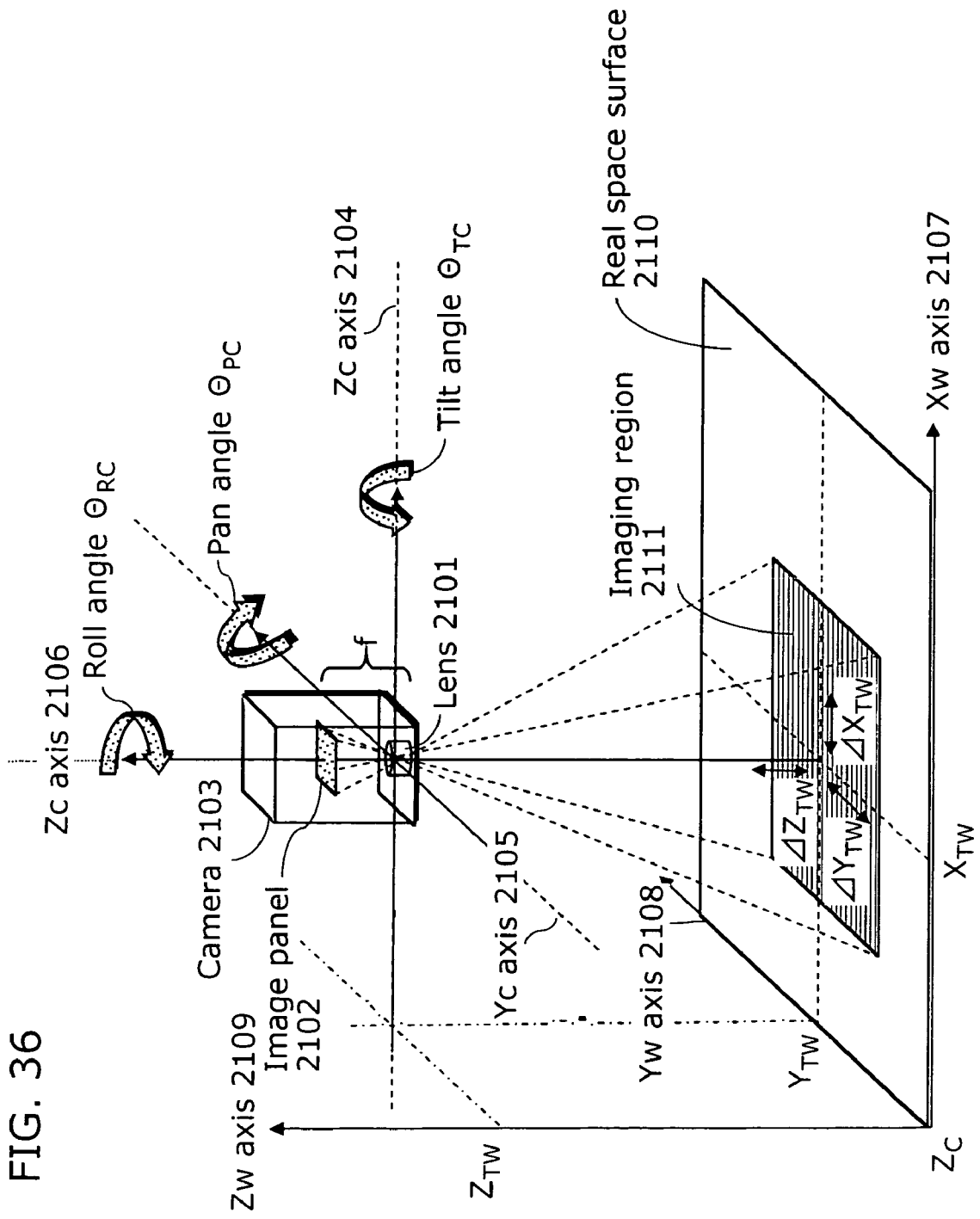
FIG. 36 is a diagram explaining a calculation method for an imaging region in Supplementary Explanation 1.

FIG. 36 is a diagram explaining a calculation method for the imaging regions for the camera terminals 110A to N and the camera terminals 111A to N. In FIG. 36, lens 2101 corresponds to the lens 201 shown in FIG. 9 and FIG. 20; image plane 2102 is an image plane of the imager 202 shown in FIG. 9 and FIG. 20; camera 2103 is the camera terminal shown in FIG. 9 and FIG. 20. $X_C$ axis 2104, $Y_C$ axis 2105 and $Z_C$ axis 2106 are crossed at right angles to each other, and compose the camera coordinate axis system using the lens 201 as an origin. The camera 2103 pan-rotates (rotation around the $Y_C$ axis 2105), tilt-rotates (rotation around the $X_C$ axis 2104) and roll-rotates (rotation around the $Z_C$ axis 2106). Each angle of rotation is indicated as $\Theta_{PC}$, $\Theta_{TC}$ and $\Theta_{RC}$, respectively. The image plane 2102 exists away from the lens 2101 along the $Z_C$ axis 2106 by 'f', and the dimension is 2 W×2 H. $X_W$ axis 2107, $Y_W$ axis 2108 and $Z_W$ axis 2109 are crossed at right angles with each other, and compose a world coordinate axis system. The camera 2103 exists at a position indicated by ($X_{TW}$, $Y_{TW}$, $Z_{TW}$) in the world coordinate axis system, and moves using the point as a base point by ($\Delta X_{TW}$, $\Delta Y_{TW}$, $\Delta Z_{TW}$).

A point on the camera coordinate axis system composed of the $X_C$ axis 2104, $Y_C$ axis 2105 and $Z_C$ axis 2106 ($X_C$, $Y_C$, $Z_C$) may be converted to a point ($X_W$, $Y_W$, $Z_W$) on the world coordinate axis composed of the $X_W$ axis 2107, $Y_W$ axis 2108 and $Z_W$ axis 2109.

[Math 13]

$$\begin{pmatrix} X_W \\ Y_W \\ Z_W \end{pmatrix} = \begin{pmatrix} R_{00} & R_{01} & R_{02} \\ R_{10} & R_{11} & R_{12} \\ R_{20} & R_{21} & R_{22} \end{pmatrix} \begin{pmatrix} M_{00} & M_{01} & M_{02} \\ M_{10} & M_{11} & M_{12} \\ M_{20} & M_{21} & M_{22} \end{pmatrix} \begin{pmatrix} X_C \\ Y_C \\ Z_C \end{pmatrix} + \begin{pmatrix} X_{TW} \\ Y_{TW} \\ Z_{TW} \end{pmatrix} + \begin{pmatrix} \Delta X_W \\ \Delta Y_W \\ \Delta Z_W \end{pmatrix} \quad \text{(Formula 13)}$$

In the Formula 13, a 3×3 matrix value having elements from $M_{00}$ to $M_{22}$ indicates a matrix value of a posture reference point of the camera 2103 (rotation angle of the posture of the camera 2103 ($\Theta_{PC}$, $\Theta_{TC}$, $\Theta_{RC}$)=(0, 0, 0)); a 3×3 matrix value having elements from $R_{00}$ to $R_{22}$ indicates a matrix value indicating the posture displacement from the posture reference point of the camera 2103; ($X_{TW}$, $Y_{TW}$, $Z_{TW}$) indicates a position of the position reference point of the camera 2103 (position displacement of the camera 2103: ($\Delta X_{TW}$, $\Delta Y_{TW}$, $\Delta Z_{TW}$)=(0, 0, 0)); and ($\Delta X_{TW}$, $\Delta Y_{TW}$, $\Delta Z_{TW}$) indicates the position displacement from the position reference point of the camera 2103.

The 3×3 matrix value having elements from $M_{00}$ to $M_{22}$ and ($X_{TW}$, $Y_{TW}$, $Z_{TW}$) may be calculated using the calibration method shown in the following Reference 1, by respectively adjusting the camera 2103 to the posture reference point and the position reference point or by using the current posture and position of the camera 2103 as a posture reference point and a position reference point, and these should be calculated before the start of operation of a detection region adjustment device of the present invention: Non-patent Reference 1: R. Tsai, A Versatile Camera Calibration Technique for High-Accuracy 3D Machine Vision Metrology Using Off-the-Shelf TV Cameras and Lenses, IEEE journal of Robotics and Automation, Vol. RA-3, No. 4, pp. 323-344, 1987

The 3×3 matrix value having elements from $R_{00}$ to $R_{22}$ may be calculated from the rotation angle ($\Theta_{PC}$, $\Theta_{TC}$, $\Theta_{RC}$), which is a posture of the camera 2103, as in the following Formula 14:

[Math 14]

$$\begin{pmatrix} R_{00} & R_{01} & R_{02} \\ R_{10} & R_{11} & R_{12} \\ R_{20} & R_{21} & R_{22} \end{pmatrix} = \begin{pmatrix} \cos\Theta_{RC} & \sin\Theta_{RC} & 0 \\ -\sin\Theta_{RC} & \cos\Theta_{RC} & 0 \\ 0 & 0 & 0 \end{pmatrix}$$
$$\begin{pmatrix} 1 & 0 & 0 \\ 0 & \cos\Theta_{TC} & \sin\Theta_{TC} \\ 0 & -\sin\Theta_{TC} & \cos\Theta_{TC} \end{pmatrix} \begin{pmatrix} \cos\Theta_{PC} & 0 & -\sin\Theta_{PC} \\ 0 & 1 & 0 \\ \sin\Theta_{PC} & 0 & \cos\Theta_{PC} \end{pmatrix} \quad \text{(Formula 14)}$$

In the First and Second Embodiments, the rotation angle ($\Theta_{PC}$, $\Theta_{TC}$, $\Theta_{RC}$) is read by the focal point controller 204 shown in FIG. 9 and by the posture controller 205 shown in FIG. 20 in the First and Second Embodiments, respectively.

If the mechanism is a mechanism to change the position of the camera 2103 by a stepping motor, the position displacement of the camera 2103 ($\Delta X_{TW}$, $\Delta Y_{TW}$, $\Delta Z_{TW}$) from the position reference point may be read by the stepping motor.

Each point ($X_{PC}$, $Y_{PC}$, $f$) on the image plane 2102 is projected onto ($X_{PW}$, $Y_{PW}$, $Z_{PW}$) on a real space surface 2110 where $Z_W = Z_C$ according to the following Formulae 15, 16 and 17:

[Math 15]

$$\begin{pmatrix} X_{PW} \\ Y_{PW} \\ Z_{PW} \end{pmatrix} = \begin{pmatrix} X_O + \frac{(Z_O - Z_C)X_D}{Z_D} \\ Y_O + \frac{(Z_O - Z_C)Y_D}{Z_D} \\ Z_C \end{pmatrix} \quad \text{(Formula 15)}$$

[Math 16]

$$\begin{pmatrix} X_O \\ Y_O \\ Z_O \end{pmatrix} = \begin{pmatrix} X_{TW} \\ Y_{TW} \\ Z_{TW} \end{pmatrix} + \begin{pmatrix} \Delta X_W \\ \Delta Y_W \\ \Delta Z_W \end{pmatrix} \quad \text{(Formula 16)}$$

[Math 17]

$$\begin{pmatrix} X_D \\ Y_D \\ Z_D \end{pmatrix} = \begin{pmatrix} R_{00} & R_{01} & R_{02} \\ R_{10} & R_{11} & R_{12} \\ R_{20} & R_{21} & R_{22} \end{pmatrix} \begin{pmatrix} M_{00} & M_{01} & M_{02} \\ M_{10} & M_{11} & M_{12} \\ M_{20} & M_{21} & M_{22} \end{pmatrix} \begin{pmatrix} X_{PC} \\ Y_{PC} \\ f \end{pmatrix} \quad \text{(Formula 17)}$$

Consequently, each of the points (−W, −H, f), (W, −H, f), (−W, H, f) and (W, H, f) on the four corners of the image plane are projected onto the real space surface where $Z_W = Z_C$ according to the following Formulae 18, 19 and 20:

[Math 18]

$$\begin{pmatrix} X_{PW0} \\ Y_{PW0} \\ Z_{PW0} \end{pmatrix} = \begin{pmatrix} X_O + \frac{(Z_O - Z_C)X_{D0}}{Z_{D0}} \\ Y_O + \frac{(Z_O - Z_C)Y_{D0}}{Z_{D0}} \\ Z_C \end{pmatrix} \quad \text{(Formula 18)}$$

[Math 19]

$$\begin{pmatrix} X_{PW1} \\ Y_{PW1} \\ Z_{PW1} \end{pmatrix} = \begin{pmatrix} X_O + \frac{(Z_O - Z_C)X_{D1}}{Z_{D1}} \\ Y_O + \frac{(Z_O - Z_C)Y_{D1}}{Z_{D1}} \\ Z_C \end{pmatrix} \quad \text{(Formula 19)}$$

[Math 20]

$$\begin{pmatrix} X_{PW2} \\ Y_{PW2} \\ Z_{PW2} \end{pmatrix} = \begin{pmatrix} X_O + \frac{(Z_O - Z_C)X_{D2}}{Z_{D2}} \\ Y_O + \frac{(Z_O - Z_C)Y_{D2}}{Z_{D2}} \\ Z_C \end{pmatrix} \quad \text{(Formula 20)}$$

[Math 21]

$$\begin{pmatrix} X_{PW3} \\ Y_{PW3} \\ Z_{PW3} \end{pmatrix} = \begin{pmatrix} X_O + \frac{(Z_O - Z_C)X_{D3}}{Z_{D3}} \\ Y_O + \frac{(Z_O - Z_C)Y_{D3}}{Z_{D3}} \\ Z_C \end{pmatrix} \quad \text{(Formula 21)}$$

Furthermore, ($X_{D0}$, $Y_{D0}$, $Z_{D0}$) in the Formula 18, ($X_{D1}$, $Y_{D1}$, $Z_{D1}$) in the Formula 19, ($X_{D2}$, $Y_{D2}$, $Z_{D2}$) in the Formula 20 and ($X^{D3}$, $Y^{D3}$, $Z^{D3}$) in the Formula 21 may be obtained from the following the Formulae 22, 23, 24 and 25, respectively:

[Math 22]

$$\begin{pmatrix} X_{D0} \\ Y_{D0} \\ Z_{D0} \end{pmatrix} = \begin{pmatrix} R_{00} & R_{01} & R_{02} \\ R_{10} & R_{11} & R_{12} \\ R_{20} & R_{21} & T_{22} \end{pmatrix} \begin{pmatrix} M_{00} & M_{01} & M_{02} \\ M_{10} & M_{11} & M_{12} \\ M_{20} & M_{21} & M_{22} \end{pmatrix} \begin{pmatrix} -W \\ -H \\ f \end{pmatrix} \quad \text{(Formula 22)}$$

[Math 23]

$$\begin{pmatrix} X_{D1} \\ Y_{D1} \\ Z_{D1} \end{pmatrix} = \begin{pmatrix} R_{00} & R_{01} & R_{02} \\ R_{10} & R_{11} & R_{12} \\ R_{20} & R_{21} & T_{22} \end{pmatrix} \begin{pmatrix} M_{00} & M_{01} & M_{02} \\ M_{10} & M_{11} & M_{12} \\ M_{20} & M_{21} & M_{22} \end{pmatrix} \begin{pmatrix} W \\ -H \\ f \end{pmatrix} \quad \text{(Formula 23)}$$

[Math 24]

$$\begin{pmatrix} X_{D2} \\ Y_{D2} \\ Z_{D2} \end{pmatrix} = \begin{pmatrix} R_{00} & R_{01} & R_{02} \\ R_{10} & R_{11} & R_{12} \\ R_{20} & R_{21} & T_{22} \end{pmatrix} \begin{pmatrix} M_{00} & M_{01} & M_{02} \\ M_{10} & M_{11} & M_{12} \\ M_{20} & M_{21} & M_{22} \end{pmatrix} \begin{pmatrix} -W \\ H \\ f \end{pmatrix} \quad \text{(Formula 24)}$$

-continued

[Math 25]

$$\begin{pmatrix} X_{D3} \\ Y_{D3} \\ Z_D \end{pmatrix} = \begin{pmatrix} R_{00} & R_{01} & R_{02} \\ R_{10} & R_{11} & R_{12} \\ R_{20} & R_{21} & T_{22} \end{pmatrix} \begin{pmatrix} M_{00} & M_{01} & M_{02} \\ M_{10} & M_{11} & M_{12} \\ M_{20} & M_{21} & M_{22} \end{pmatrix} \begin{pmatrix} W \\ H \\ f \end{pmatrix}$$ (Formula 25)

A plane composed of each of the point at the four corners of the image plane projected onto the real space surface 2110 where $Z_W = Z_C$ is an imaging region by the camera 2103.

The installation position and the installation direction of the cameras may be obtained using the calculation method explained above, and the position of the imaging region may be obtained form the rotation angle of the camera.

(Supplementary Explanation 2)

Figure 37:
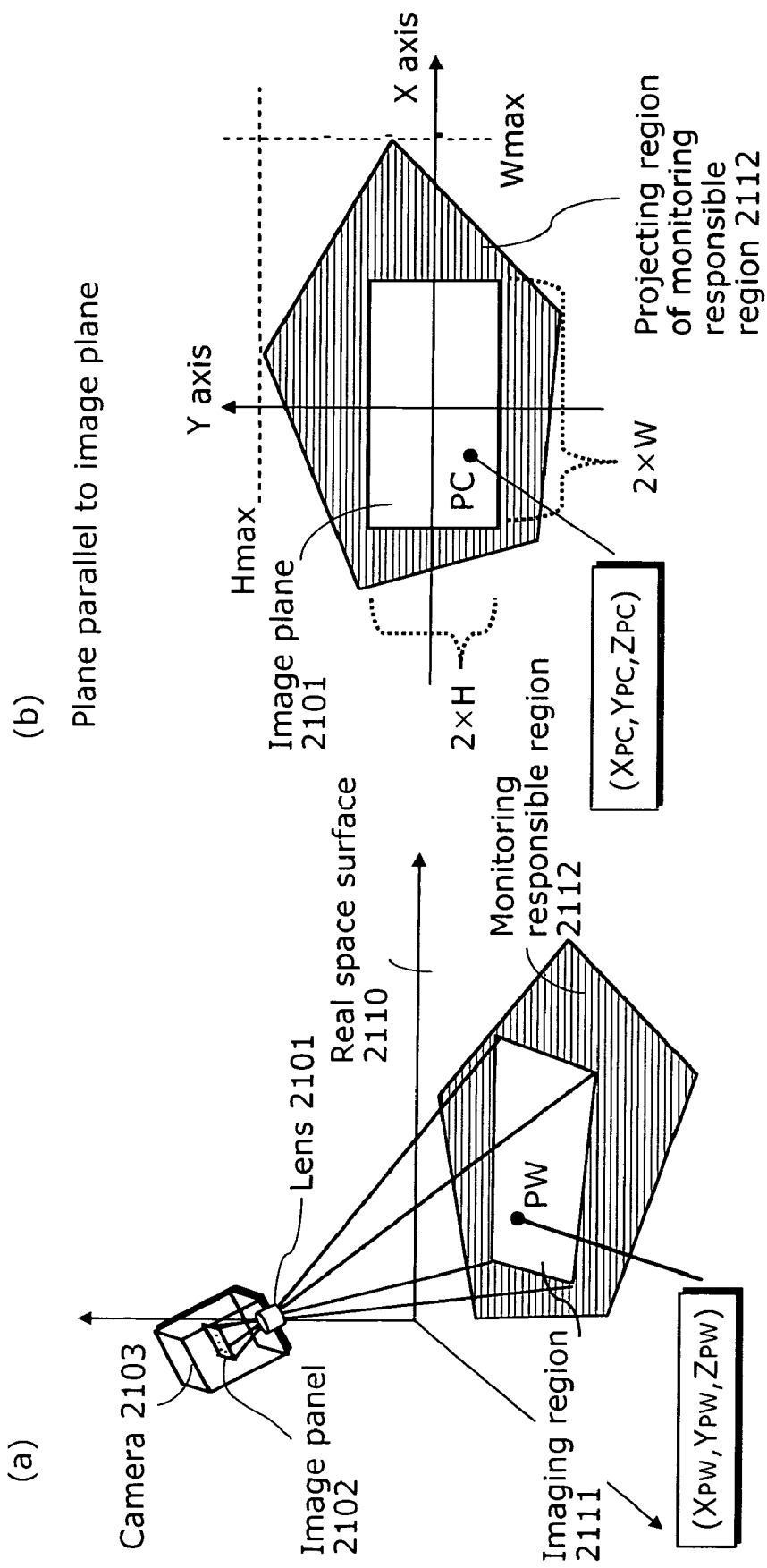
FIG. 37 is a diagram explaining a calculation method for focal length to determine an imaging region in Supplementary Explanation 2.
Figure 38:
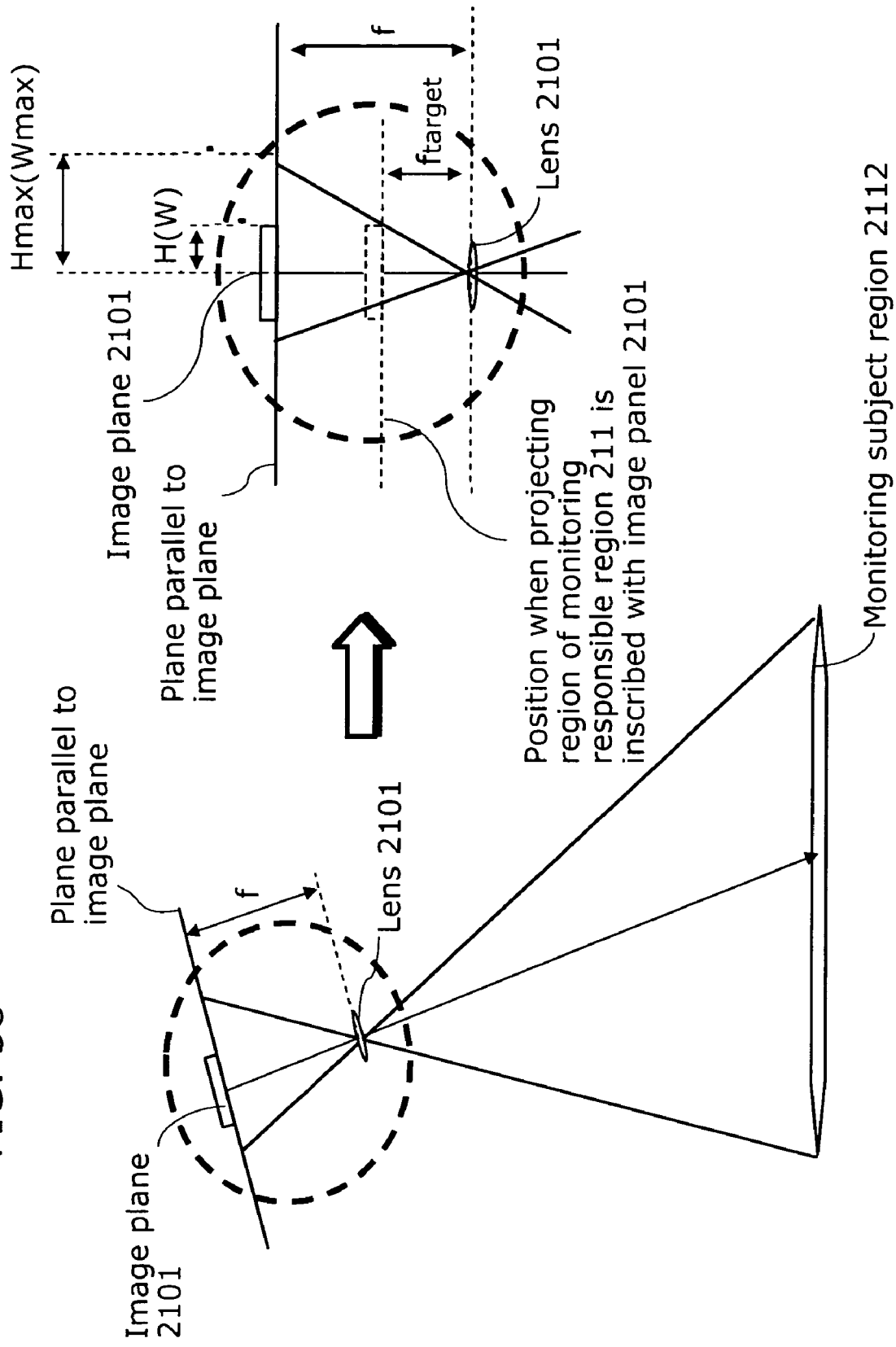
FIG. 38 is a diagram explaining a calculation method for focal length to determine an imaging region in Supplementary Explanation 2.

Next, as Supplementary Explanation 2, in the camera terminals 110A to N and 111A to N described in the First and Second Embodiments, a calculation method for focal length when the area of the imaging region may be the smallest in a state where the entire monitoring responsible region may be displayed (hereafter, referred to as target focal length $f_{taeget}$) is explained with reference to FIG. 37 and FIG. 38. In FIG. 37 and FIG. 38, and components which are used in Supplementary Explanation 1 shown in FIG. 36, are marked with the same symbols, and explanations are omitted.

FIG. 37(*a*) shows the positions of an imaging region 2111 and a monitoring responsible region 2112 on the real space surface 2110 imaged by the camera installed at an optional position.

In addition, FIG. 37(*b*) is a diagram when the imaging region 2111 and the monitoring responsible region 2112 are projected onto a plane parallel to the image plane 2101 using the center of the image plane 2101 as an origin.

Furthermore, the position coordinates PC ($X_{PC}$, $Y_{PC}$, $Z_{PC}$) at the time of projecting an optional point $P_W$ ($X_{PW}$, $Y_{PW}$, $Z_{PW}$) onto the real space surface 2110 on the plane parallel to the image plane 2102 may be calculated from the following the Formulae 26, 27, 28 and 29 using the matrix M to determine the posture reference explained in Supplementary Explanation 1 relating to ($P_X$, $P_Y$, $P_Z$) as the coordinates of the focal point by the camera terminal and ($Q_X$, $Q_Y$, $Q_Z$) as the center coordinates of the image plane 2102 and R in the Formula 14 to determine the rotation angle:

[Math 26]

$$Nx = \frac{(Px - X_{PW})\{(Py - Qy)^2 + (Pz - Qz)^2\}}{(Px - Qx)(X_{PW} - Px) + (Py - Qy)(Y_{FW} - Py) + (P_z - Q_z)(Z_{PW} - Pz)}$$ (Formula 26)

[Math 27]

$$Ny = \frac{(Pz - X_{PW})\{(Px - Qx)^2 + (Pz - Qz)^2\}}{(Px - Qx)(X_{PW} - Px) + (Py - Qy)(Y_{FW} - Py) + (Pz - Qz)(Z_{PW} - Pz)}$$ (Formula 27)

[Math 28]

$$Nz = \frac{(Pz - X_{PW})\{(Px - Qx)^2 + (Py - Qy)^2\}}{(Px - Qx)(X_{PW} - Px) + (Py - Qy)(Y_{FW} - Py) + (Pz - Qz)(Z_{PW} - Pz)}$$ (Formula 28)

-continued

[Math 29]

$$\begin{pmatrix} Xpc \\ Ypc \\ Zpc \end{pmatrix} = \begin{pmatrix} M_{00} & M_{01} & M_{02} \\ M_{10} & M_{11} & M_{12} \\ M_{20} & M_{21} & M_{22} \end{pmatrix}^{-1} \begin{pmatrix} R_{00} & R_{01} & R_{02} \\ R_{10} & R_{11} & R_{12} \\ R_{20} & R_{21} & T_{22} \end{pmatrix}^{-1} \begin{pmatrix} Nx \\ Ny \\ Nz \end{pmatrix}$$ (Formula 29)

In FIG. 37(*b*), if a distance from a vertex, which is the most greatly separated from the X axis among the vertices of the monitoring responsible region 2112, to the X axis is $W_{MAX}$, and a distance from a vertex, which is the most greatly separated from Y axis, to the Y axis is $H_{MAX}$; as shown in FIG. 38, when values of $W_{MAX}$ and $H_{MAX}$ satisfy the conditions of the following Formula 30 relative to the width of the image plane (2*W, 2*H) of the camera terminal, the entire monitoring responsible region 2112 is inscribed with the imaging region 2111.

[Math 30]

$$\{(W=W_{max}) \text{ and } (H \leq H_{max})\} \text{ or } \{(W \leq W_{max}) \text{ and } (H=H_{max})\}$$ (Formula 30)

The values of $W_{MAX}$ and $H_{MAX}$ are values to be determined by the focal length as shown in FIG. 38, and a value of the target focal length $f_{target}$ is calculated from the following Formula 31 using a value of the focal length of the camera terminal as 'f':

[Math 31]

$$f_{target} = \max\left(\frac{W_{max}}{W}f, \frac{H_{max}}{H}f\right)$$ (Formula 31)

However, the function max (a, b) in the Formula 31 is a function to return a larger value between arguments (a, b) in the Formula 31.

The adjustment of the value of the focal length 'f' of the camera 2103 to the calculated focal length $f_{target}$ results in changing the imaging region 2111 to be the smallest area while the entire monitoring responsible region 150 is displayed.

As explained above, in the First and Second Embodiments, the focal length (target focal length $f_{target}$ at the time when the imaging region is the smallest while the entire monitoring responsible region is displayed is calculated.

The camera terminals and the monitoring system relating to the present invention were explained based upon the First to Third Embodiments. However, the present invention is not limited to these embodiments. For example, an embodiment to be realized by optionally incorporating components in each embodiment and another embodiment to be obtained by modifying each embodiment by a person of the ordinary skills pertaining to the present invention are also included in the present invention.

In addition, in the First to Third Embodiments, the adjustment unit to determine the position of the imaging region and the imaging range for each camera terminal is provided within each camera terminal. However, as shown in FIG. 39 and FIG. 40, it may be constructed such that all or partial camera terminals composing the monitoring system are externally or internally arranged in a centralized manner as a common adjustment unit.

Figure 39:
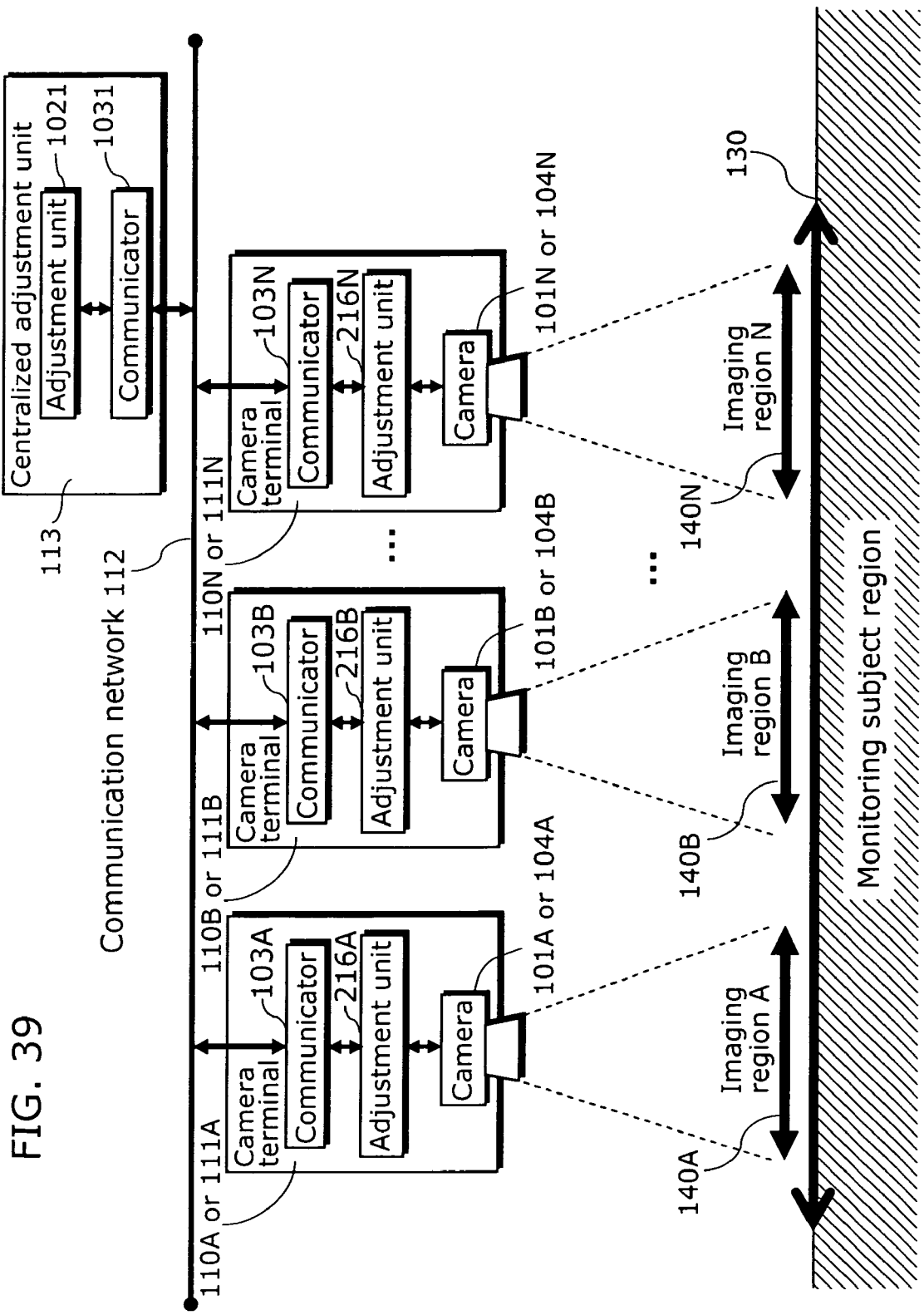
FIG. 39 is a block diagram showing a construction of the monitoring system where the adjustment unit is located outside the camera terminals.
Figure 40:
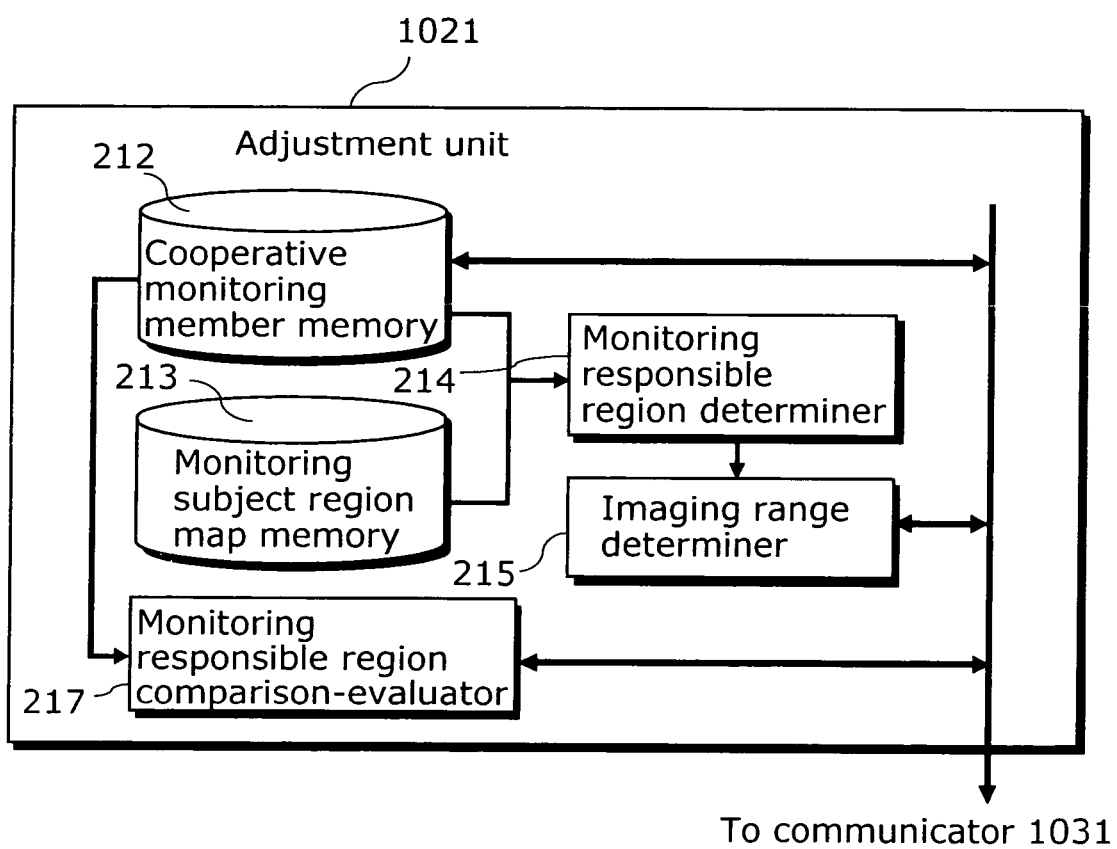
FIG. 40 is a block diagram showing an adjustment unit construction of the monitoring system where the adjustment unit is located outside the camera terminals.

FIG. 39 is a block diagram of a monitoring system equipped with an independent centralized adjustment unit 113 that centrally controls the multiple camera terminals. The centralized adjustment unit 113 is equipped with the adjustment unit 1021 and the communicator 1031. The adjustment unit 1021, as shown in FIG. 40, is composed of the components 212 to 215, which are similar to the adjustment unit 105A in the First Embodiment shown in FIG. 10, and the monitoring responsible region comparison-evaluator 217 in the adjustment unit 105A in the Second Embodiment shown in FIG. 21. The communicator 1031 has the same function as that of the communicator 103A in the First Embodiment.

In other words, as construction where the adjustment unit, which is built in the individual camera terminal in the monitoring systems of the First and Second Embodiments, is provided outside the camera terminal, a similar function to that of the First and Second Embodiments may be realized. Specifically, [the present invention] is a monitoring system for imaging a monitoring subject region using multiple camera terminals, and a system may be realized that is equipped with the multiple camera terminals, adjusting devices for adjusting positions of imaging regions or imaging ranges for the multiple camera terminals, and a communication path connecting the multiple camera terminals and the adjusting devices; the multiple camera terminals have a camera with a function to change the position of the imaging region and the imaging range and a communication unit operable to communicating with the adjusting devices, respectively; when an imaging region to be monitored by each camera terminal is a monitoring responsible region, the adjusting devices determine a monitoring responsible region for the camera terminal in order to make proximate the monitoring responsible regions for the camera terminal to the monitoring responsible regions of the other camera terminals or the boundary of the monitoring subject region without leaving any space based on the information from the multiple camera terminals received by the communication unit; at the same time, they control the positions of the imaging regions by the camera terminals or the imaging ranges in order to image the entire monitoring responsible region.

Furthermore, the correspondence of each component in the scope of claims and the components in the embodiment of the specification is as follows: In other words, an example of the camera terminal in the scope of claims is the camera terminals 110A to N in the embodiments, the camera terminals 111A to N and the camera terminals 114A to N; an example of the camera is the cameras 101A to N, the cameras 104A to N and the cameras 106A to N; an example of the communication unit is the communicator 103A to N; an example of the adjusting unit is the adjustment units 102A to N, the adjustment units 105A to N and the adjustment units 107A to N; an example of the cooperative monitoring member selector is the cooperative monitoring member selector 211; an example of the cooperative monitoring member memory is the cooperative monitoring member memory 212; an example of the monitoring subject region map memory is the monitoring subject region map memory 213; an example of the monitoring responsible region determiner is the monitoring responsible region determiner 214; an example of the imaging range determiner is the imaging range determiner 215; an example of the camera controller is the camera controller 216; an example of the monitoring responsible region comparison-evaluator is the monitoring responsible region comparison-evaluator 217; an example of the adjustment unit for direction of line of sight is a combination of the region configuration comparison-evaluator 220 and the adjustment unit for direction of line of sight 222; and an example of the communication path is the communication networks 112A to N.

INDUSTRIAL APPLICABILITY

The present invention is usable as a camera and a monitoring system using the cameras, for example, a monitoring system for a public place, such as a monitoring system for suspicious individuals at schools or buildings, or a broad imaging system, such as at intersections or parks, in addition, an indoor monitoring system to monitor conditions inside the room using multiple network cameras, and in particular, it relates to a sophisticated monitoring system, which is required to keep thoroughly imaging a monitoring subject region, even when the construction of the monitoring system is modified, such as a failure of some of the multiple cameras or addition of a new camera.

The invention claimed is:

1. A camera terminal in a monitoring system for imaging a monitoring subject region by operating, in coordination with one another, multiple camera terminals, said camera terminal comprising:
   a camera having a function to change an imaging region;
   a communication unit operable to transmit and receive information identifying the imaging region to and from other camera terminals; and
   an adjusting unit operable, where each camera terminal has a monitoring responsible region which is an imaging region to be monitored, and based on the information received by said communication unit from another camera terminal, to determine the monitoring responsible region to which the camera terminal belongs so that the monitoring responsible region to which the camera terminal belongs adjoins, without a gap, the monitoring responsible region of the another camera terminal or a boundary of the monitoring subject region, as well as to adjust the imaging region of said camera so that an entire monitoring responsible region is imaged, and
   wherein said adjusting unit is operable to determine a region surrounding a first reference point as the monitoring responsible region, according to i) at least one perpendicular bisector of a line of segment connecting the first reference point provided within the imaging region to which the camera terminal belongs and a second reference point provided within an imaging region of another camera terminal adjoining to the imaging region to which the camera terminal belongs or ii) the perpendicular bisector of the line of segment connecting the first reference point provided within the imaging region to which the camera terminal belongs and the second reference point provided within the imaging region of another camera terminal adjoining to the imaging region to which the camera terminal belongs and a boundary of the monitoring subject region.

2. The camera terminal according to claim 1, wherein said adjusting unit includes:
   a cooperative monitoring member selector which selects a camera terminal whose imaging region exists within a specified range, from among the other camera terminals;
   a cooperative monitoring memory to store information identifying the imaging region of the camera terminal selected by said cooperative monitoring member selector;
   a monitoring subject region map memory to store a position and a range of the monitoring subject region;
   a monitoring responsible region determiner which determines the monitoring responsible region to which the camera terminal belongs based on the information stored in said cooperative monitoring member memory, and the position and range stored in said monitoring subject region map memory;

an imaging range determiner which calculates focal length for displaying the entire determined monitoring responsible region onto an image plane belonging to said camera, and a camera controller which controls the focal length of said camera so as to be the focal length calculated by said imaging range determiner.

3. The camera terminal according to claim 1, wherein the first reference point is coordinates on the monitoring subject region projected in the center of the camera terminal to which the image plane belongs.

4. The camera terminal according to claim 1, wherein the first reference point is the center coordinates of the imaging region to which the camera terminal belongs.

5. The camera terminal according to claim 1, wherein said camera further has a function to change a position of the imaging region;

said adjusting unit further has a monitoring responsible region comparison-evaluator to determine a position of the imaging region for adjusting the monitoring responsible region to which the camera terminal belongs closer to the size of a monitoring responsible region adjacent to the monitoring responsible region by comparing and evaluating the monitoring responsible region to which the camera terminal belongs and the monitoring responsible region adjacent to the monitoring responsible region; and said camera controller controls said camera in order to approximate to the position of the imaging region determined by said monitoring responsible region comparison-evaluator.

6. The camera terminal according to claim 5, wherein said monitoring responsible region comparison-evaluator determines the position of the imaging region by moving the first reference point so as to equalize the distance from the first reference point to each boundary of the monitoring responsible region.

7. The camera terminal according to claim 1, wherein said camera further has a function to control a direction of line of sight, and said adjusting unit further has an adjustment unit for direction of line of sight for adjusting the direction of line of sight of said camera for adjusting the configuration of the imaging region closer to the configuration of the monitoring responsible region.

8. The camera terminal according to claim 7, wherein, in an evaluation function to evaluate a difference between the configurations of the imaging region and the monitoring responsible region, said adjustment unit for direction of line of sight is operable to determine the direction of line of sight of said camera in order to approximate an evaluated value by said the evaluation function to a target value when the evaluated value at the time of coincidence of the configurations of the imaging region with the monitoring responsible region is a target value.

9. The camera terminal according to claim 8, wherein when a point where the line of sight by said camera intersects at the monitoring responsible region is a reference point, the evaluation function is a function to indicate dispersion of a ratio of the distance from the reference point to the boundary of the monitoring responsible region to the distance from the reference point to the boundary of the imaging region, and the target value is zero.

10. A monitoring system for imaging a monitoring subject region by cooperatively operating multiple camera terminals, and said monitoring system comprising:

the multiple camera terminals according to claim 1, and a communication path connecting said camera terminals.

11. A monitoring method for a camera terminal in a monitoring system for imaging a monitoring subject region by operating, in coordination with one another, multiple camera terminals, said monitoring method comprising:

an adjusting step of determining, in the case where each camera terminal has a monitoring responsible region which is an imaging region to be monitored, and based on the information received by the communication unit from another camera terminal, the monitoring responsible region to which the camera terminal belongs so that the monitoring responsible region to which the camera terminal belongs adjoins, without a gap, the monitoring responsible region of the another camera terminal or a boundary of the monitoring subject region, as well as to adjust the imaging region of the camera so that an entirety of the monitoring responsible region is imaged, and wherein in said adjusting step, a region surrounding a first reference point is determined as the monitoring responsible region, according to i) at least one perpendicular bisector of a line of segment connecting the first reference point provided within the imaging region to which the camera terminal belongs and a second reference point provided within an imaging region of another camera terminal adjoining to the imaging region to which the camera terminal belongs or ii) the perpendicular bisector of the line of segment connecting the first reference point provided within the imaging region to which the camera terminal belongs and the second reference point provided within the imaging region of another camera terminal adjoining to the imaging region to which the camera terminal belongs and a boundary of the monitoring subject region.

12. A non-transitory computer-readable medium having a program stored thereon, the program being for a camera terminal in a monitoring system for imaging a monitoring subject region by operating, in coordination with one another, multiple camera terminals, wherein said program, when executed, causes the camera terminal to execute the steps included in the monitoring method according to claim 11.

* * * * *